US012415113B2

United States Patent
(12) United States Patent
Acosta et al.

(10) Patent No.: US 12,415,113 B2
(45) Date of Patent: Sep. 16, 2025

(54) LUNG EXERCISE MEASUREMENT DEVICE AND METHOD

(71) Applicant: Lung Trainers, LLC, Miami, FL (US)

(72) Inventors: Frank Acosta, Boca Raton, FL (US); William Rose, Boca Raton, FL (US)

( * ) Notice: Subject to any disclaimer, the term of this patent is extended or adjusted under 35 U.S.C. 154(b) by 1207 days.

(21) Appl. No.: 17/124,651

(22) Filed: Dec. 17, 2020

(65) Prior Publication Data

US 2021/0187351 A1 Jun. 24, 2021

Related U.S. Application Data

(60) Provisional application No. 62/949,852, filed on Dec. 18, 2019.

(51) Int. Cl.
*A63B 23/18* (2006.01)
*A63B 71/06* (2006.01)
*G09G 3/18* (2006.01)

(52) U.S. Cl.
CPC ............ *A63B 23/185* (2013.01); *A63B 23/18* (2013.01); *A63B 71/0622* (2013.01); *G09G 3/18* (2013.01); *A63B 2071/065* (2013.01); *A63B 2220/17* (2013.01); *A63B 2220/56* (2013.01); *A63B 2220/62* (2013.01); *A63B 2230/40* (2013.01)

(58) Field of Classification Search
CPC ... A63B 23/185; A63B 23/18; A63B 71/0622; A63B 2071/065; A63B 2220/17; A63B 2220/56; A63B 2220/62; A63B 2230/40; A63B 24/0062; A63B 2225/74; G09G 3/18
USPC ............ 482/13
See application file for complete search history.

(56) References Cited

U.S. PATENT DOCUMENTS 4,241,739 A * 12/1980 Elson .................. A61B 5/0875 482/13
4,828,257 A * 5/1989 Dyer ...................... A63B 24/00 482/901
5,052,400 A * 10/1991 Dietz .................. A61B 5/0816 128/204.26
6,165,105 A * 12/2000 Boutellier ............. A63B 23/18 600/541
10,722,748 B1 * 7/2020 Acosta .................. A63B 21/06
2010/0160118 A1 * 6/2010 Shirasaki ............ A61B 5/0816 482/13
2010/0292599 A1 * 11/2010 Oleson .............. A63B 71/0686 600/519
2015/0011906 A1 * 1/2015 Wallach ................ A61B 5/486 600/538
2015/0122261 A1 * 5/2015 Pettitt ................ A61M 16/204 128/205.24
2015/0258370 A1 * 9/2015 Arkush ................. A61B 5/087 482/8
2019/0201743 A1 * 7/2019 Meyer ...................... A63B 1/00

* cited by examiner

*Primary Examiner* — Megan Anderson
*Assistant Examiner* — Jonathan A Dicuia
(74) *Attorney, Agent, or Firm* — Assouline & Berlowe, PA; Peter A. Koziol, Esq.

(57) ABSTRACT

A lung exercise measurement device and method that utilizes one or more lift timers, rest timers and/or set counters to accurately display valuable metrics and goals for tracking and improving respiratory development using a lung trainer breathing technique device, with particular advantages for instructive, competitive, self-learning, and group training environments.

11 Claims, 77 Drawing Sheets

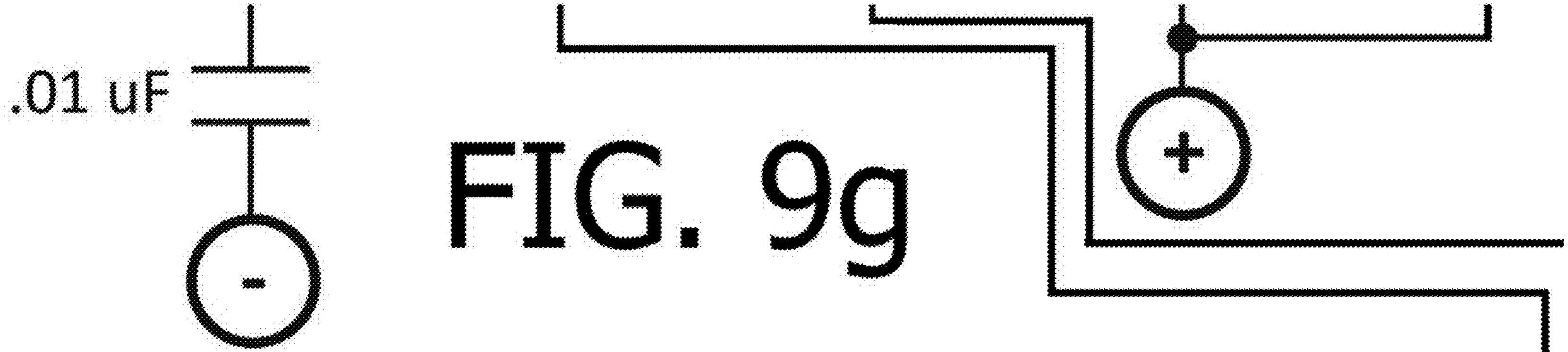

FIG. 9g

Note: When a 555 Latch initiall powers up pin 7, discharge pin, is connected to negative power. Pin 7, discharge pin, on the 555 Latch is connected to pin 7, discharge pin, of the 555 Rest Timer. The connection to negative power through the Latch interrupts the charging and discharging of the timing capacitor on the Rest Timer (*The latch privides an alternate path to ground preventing the charging of the timing capacitor on the 555 Rest Timer, thereby pausing the timer*).

LUNG EXERCISE MEASUREMENT DEVICE AND METHOD

CROSS-REFERENCE TO RELATED APPLICATIONS

This patent application claims the benefit of U.S. Prov. Ser. No. 62/949,852 filed Dec. 18, 2019 and incorporated by reference herein.

FIELD OF THE INVENTION

The invention broadly relates to lung exercises, more specifically to a device for measuring and performing exercises and related methods for strengthening lungs, the diaphragm, surrounding muscles/areas of the anatomy, more specifically the invention provides a digital display for the tracking of respiratory development and is attached to a breathing technique device.

BACKGROUND OF THE INVENTION

Wind instruments are musical instruments that typically include some type of resonator. A column of air is vibrated by a user blowing air into or over a mouthpiece located at the end of a resonator. The pitch of the vibration is determined by the length of the tube in conjunction with modifications of the effective length of the vibrating column of air. In a similar way, vocalists use air to produce pitches. Examples of common wind instruments include horns, trumpets, recorders, flutes, and saxophones.

Musicians playing wind instruments or vocalists require high levels of lung capacity and lung, diaphragm and surrounding muscles/areas of the anatomy control to hit the applicable notes and note lengths while playing a composition. Each wind instrument or voice requires different levels of air regulation and exhaling. Plus, musical compositions vary in difficulty, thereby increasing the lung demand on the musician playing the instrument.

A musician must have the lung, diaphragm, and surrounding muscles/areas of the anatomy control and capacity to breath sufficient air into the instrument to properly play or sing the musical notes and timing required in the musical composition. Although there are a myriad of exercise equipment to exercise a person's muscles or increase their cardiovascular stamina, there has been a need to develop a device and method to increase a person's lung, diaphragm and surrounding muscles/areas of the anatomy strength and capacity, and with the advent of such devices a need for devices, systems and methods of better measurement, analysis and performance.

Often, a new student, without training, can only play certain wind instruments for a limited period of time before they run out of air, i.e. they become "winded." The more the student plays the instrument over time, the student's lung capacity and strength increases due to the training. However, this takes a long time to occur as the training only occurs as the student practices with the instrument. The size of some wind instruments makes playing frequent playing difficult. Also, some environments do not allow students to practice frequently due to the loud noise emanating from the wind instrument.

There are some devices in the market that develop air capacity for users. However, until recent advent of the devices described in U.S. Pat. Nos. 10,086,230 and 9,561,399 prior apparatus, systems and methods did not properly train a person's lung, diaphragm and surrounding muscles/areas of the anatomy by regulating weight suspended in air.

With the advent of lung training and breathing technique devices, which generally broadly include at least one weighted insert, a hollow chamber having a bottom and a top, where the weighted insert is positioned within the hollow chamber, a tube or inlet, where the distal end of the tube or inlet is connected to the bottom of the hollow chamber and a user breathes into the proximal end of the tube or inlet there was still a need for improved measurement and analysis. Some embodiments of lung training and breathing technique devices included a counter/timer (digital computer) that is controlled by the user and provides the user feedback on their progress, specifically timed measurements, including counts of breaths, air pressure, duration of exercise, and intervals of rest, but those embodiments were less accurate, failed to provide feedback to the user in a simple to read, easy to understand and useful way, controlled by a more reliable system.

As such, there was a need for a lung exercise measurement device and method that improves upon lung training and breathing technique devices by creating specialized computers, systems and methods that simulate weighted inserts and provide feedback that enable novel exercises and more accurate tracking and measurement of the use of the device than provided by conventional timers or metronomes.

BRIEF SUMMARY OF THE INVENTION

The lung exercise measurement device and method is an addition to the lung training or breathing technique device, a device that teaches breathing technique to its users. The lung training or breathing technique device facilitates strength training for the respiratory muscles and teaches core breathing techniques through the use of a combination of air flow and resistance or air pressure. The lung exercise measurement device and method provides a digital display, generally initiated by an air pressure, showing the amount of time the user is exhaling through the air tube of the lung training or breathing technique device (workout period). When a user is resting, the lung exercise measurement device and method monitors and displays the amount of time not exhaling or blowing into the device (rest period between sets). The rest time between sets affects the intensity of the workout. One of the most crucial drivers in strength and muscular endurance training is the length of the rest periods between workout sets. One of the most common mistakes in a workout is not managing rest periods between sets. The lung training or breathing technique device lung exercise measurement device and method solves that issue. When exhalation and resting time is monitored, the user can build better breathing techniques and habits, through controlled exercises. LED lights are mounted above the digital display to correspond with the air pressure used to move weighted inserts in a mounted chamber. The LED lights also give the user the additional visual stimulus when exerting more psi into the chamber without having to manipulate the number of weighted inserts.

In the past developments of the lung training and breathing technique devices, the user had to manually calculate the effects of each breathing exercise. This was done through determining air pressure by adding or subtracting weighted inserts. This required proper calibration of the device and its weighted inserts, and was prone to user error. It also did not provide immediate feedback to the user and to other observers, particularly instructors who have not been observing during the entire time of use. The lung exercise measurement device and method provides the user an accurate determination of time used in exhalation and resting time between exhalation segments. LED lights are incorporated to give visual stimulation to the user in reference to psi utilized during the exercise. In some embodiments this is coupled with a digital readout of psi or other measurements of air pressure used while working on the device.

Until the advent of the lung exercise measurement device and method disclosed herein digital pressure and air flow sensors had not been previously adopted to visualize a weighted insert system. The lung exercise measurement device and methods also provides the user the ability to monitor precise resting time between exhaling and resting, not found in similar devices, particularly when the user or their instructor are distracted or unable to perform the measurements and calculations themselves. It also provides a source of independently verifiable and universal feedback for competitive and instructive environments. Monitoring exhaling time and resting time is a distinct advantage for therapy, music instruction, athletic exercises, etc. It also enables weighted inserts to be replaced with virtual inserts, reduces the need for extra moving parts, and thus provides for more compact devices. For the self-learner it provides more objective standardized feedback.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawings.

DETAILED DESCRIPTION OF THE INVENTION

Figure 1:
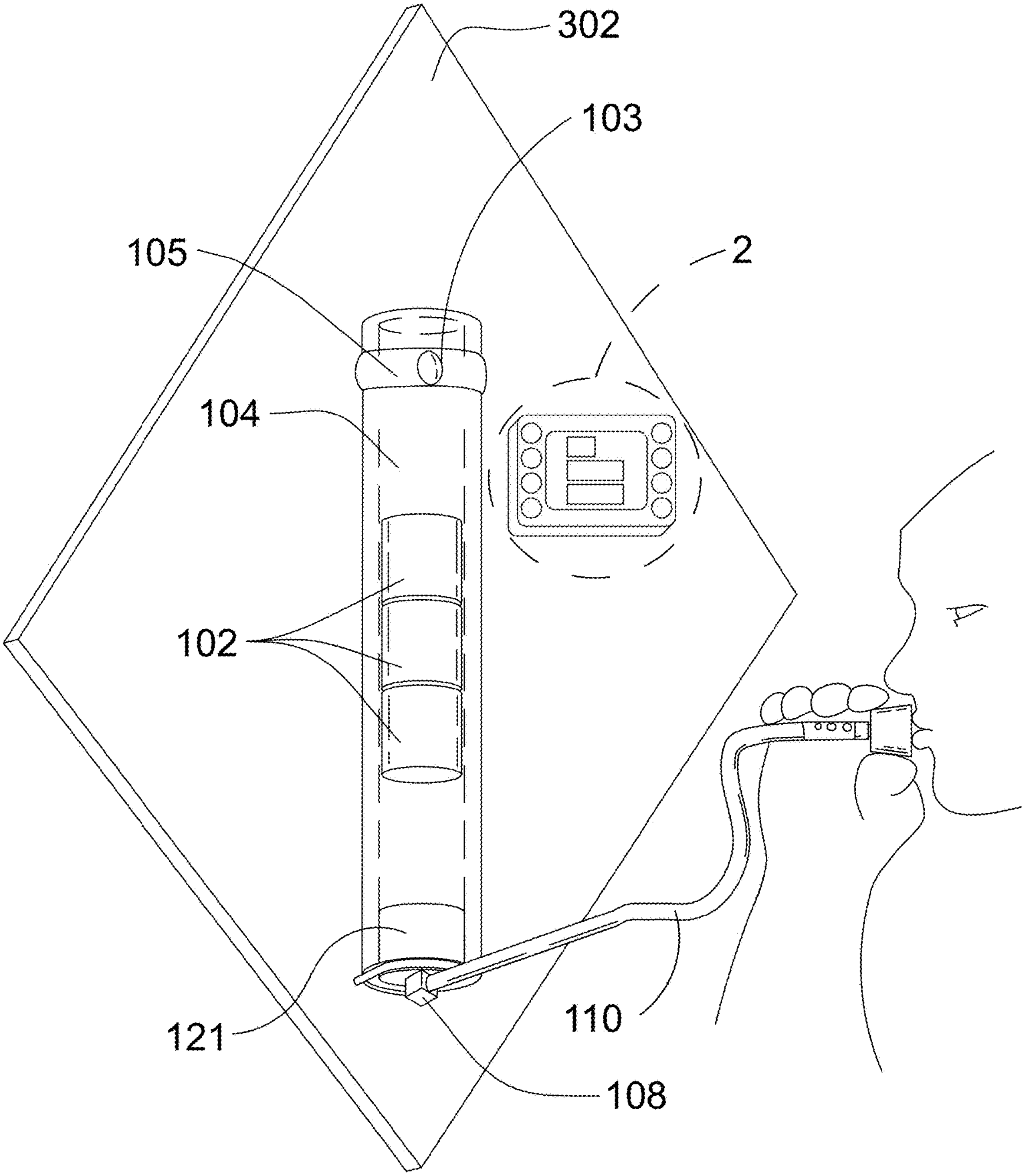
FIG. 1 is a perspective view of an embodiment of the invention attached to a mounted lung training and breathing technique device.

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that the term "breathing" is synonymous with terms such as "exhaling", "inhaling", "blowing", "gasping", "puffing", etc., and such terms may be used interchangeably as appearing in the specification and claims. Although any methods, devices or materials similar or equivalent to those described herein can be used in the practice or testing of the invention, the preferred methods, devices, and materials are now described.

Exercising a user's lungs improves a user's breathing capacity and control. As with swimming and marathon athletes, training improves oxygen intake and the cardiovascular system. The present invention is preferably used for persons seeking to improve breathing technique and capacity. However, lung exercise measurement device and methods provide support in numerous fields, including but not limited to, athletics, music, yoga, and medicine. The present invention also promotes greater lung control and strength through better measurement, feedback and analysis.

The lung exercise measurement device and method use a digital processor display connected to an air pressure sensor, which, when activated determines time in use, while a separate display determines time not in use. The air pressure is activated by the user blowing air into the air tube of the lung training or breathing technique device. When the user blows into the air tube, the weighted insert is lifted and the pressure from the air blowing or psi activates the timing display of the processor. The digital display will continue to keep time (e.g. measured in seconds, minutes, hours, milliseconds, etc.) until the user stops the air and the weights move to the original platform. Once the insert is at the bottom of the chamber or at and/or beyond a certain threshold, the pressure sensing display stops and the second non-pressure sensing digital display will then begin to monitor the time of non-movement. As the user provides positive pressure, the lifting timer keeps cumulative time. The user can determine when to reset each counter by manually pressing the flow reset switch or the resting reset switch. A schematic of the seven-segment display is attached.

In one embodiment above or within a portion of the digital display is a set of four LED lights that are preset or manually set to varied psi determinations. The first LED is set to light up at initial exhalation into the air tube/chamber, but all remaining LED lights are capable of being set to determined psi, including but not limited to ½, 1, ½, 2, etc psi.

The digital displays, when used in conjunction with the LED lights provide a precise indication for users to determine personal development. The lung exercise measurement device and method is best utilized when paired with a lung training or breathing technique device and altering the amount of resistance through addition and subtraction of inserts and changing the airflow by opening and closing air holes in the air regulator. One unique characteristic of the lung exercise measurement device and method is that the user can visually see the insert move up and down the chamber and monitor the psi utilized to move it. Another characteristic of the lung exercise measurement device and method is that the user can produce additional psi by blowing more air into the chamber and can visually monitor the additional psi by reading the LED lights above the digital display. This additional psi presents the user with a "virtual" insert. Therefore, if the user is exercising with just one weight, or resistance simulating weight, he/she can mimic a second insert by introducing more air into the chamber and monitor the LED lights in line with the chamber. This feature allows musicians to reproduce the air needed to perform a crescendo (soft to loud passages) or a runner to feel the sensation of running up a hill (when more air is needed). Further developments of the lung exercise measurement device and method also include a digital readout display of psi as well as a readout of time exhaling and resting.

The lung exercise measurement device and method is connected to a power switch which in some embodiments is located below the digital displays between the two reset switches.

The original objective of providing the lung trainer with a simple timer that would start and stop automatically by exhalation air pressure has evolved into that of providing a complete digital coach (the lung trainer lung exercise measurement device and method).

In some embodiments, the user interface consists of three (3) sets of seven-segment displays, 4 LEDs, 2 reset buttons, and an on/off switch. However, in other embodiments these features are present in a single LED, LCD, Plasma or equivalent display that may be operated by a microprocessor and/or graphical processing unit. Touch screens and haptic feedback are also compatible with the invention herein and may be substituted for the LEDs, reset buttons, and on/off switch. The on and off switch may also be operated by time, remote and/or other trigger.

Seven-Segment Displays

1) Lifting-Timer: three seven segment display [000-999]; cumulative number displaying the total seconds that air pressure was applied to the lung training or breathing technique device.
2) Rest-Timer (displays rest time between lifts): Three seven segment display [000-999]; measures the number of seconds of rest after each period of applying air pressure to the lung training or breathing technique device (rest timer resets to 000 at the start of each lift).
3) Number of Sets: Single seven-segment display; 0-9 counter, adds one to the counter after each lifting exercise.

4 LEDs [e.g. Green, Yellow, Red, and Clear] are activated by different levels of air pressure: Each LED represents the air pressure required to lift a desired number of weight adjusting inserts. The LEDs represent virtual weight adjusting inserts. The order of LEDS and colors selected may vary by embodiment. In an example embodiment:

1) The first LED [Green] is activated when minimal exhalation air pressure is applied to the lung trainer. In the exemplary embodiment, the pressure required to activate this first LED is not adjustable.
2) The second LED [Yellow]: adjustable; is activated when the air pressure applied is equivalent to lifting the desired number of weight adjusting inserts, typically it is set to the equivalent of lifting 2 weight adjusting inserts.
3) The third LED [Red]: adjustable; is activated when the air pressure applied is equivalent to lifting the desired number of weight adjusting inserts, typically it is set to the equivalent of lifting 3 weight adjusting inserts.
4) The fourth LED [Clear]: adjustable; is activated when the air pressure applied is equivalent to lifting the desired number of weight adjusting inserts, typically it is set to the equivalent of lifting 4 weight adjusting inserts.

The three adjustable LEDs [Yellow, Red, and Clear] can be adjusted to represent any number of weight adjusting inserts. For example, they can be set to activate at the equivalent of lifting 3, 4, and 5 weight adjusting inserts instead of the typical 2, 3, and 4 weight adjusting inserts. Also, the color orders or colors selected may change, other colors and/or a multi-color LEDS used.

Providing LEDs to represent a number of virtual weight adjusting inserts adds flexibility to exercise routines. For example an exercise that requires lifting one (1) weight adjusting insert, holding, and then increasing to three (3), holding, and then decreasing back to two (2) and holding, all in one breath can now be accurately performed. While that type of exercise has always been possible with the lung trainer by using only one weight adjusting insert and exhaling greater pressure than needed to lift only one weight adjusting insert, the change in air pressure applied has been subjective. The LEDs eliminate the uncertainty in the exercise performance, and enable more precise setting of goals, better measuring, and more consistent monitoring of the same. This is particularly true in a classroom, competitive or instructor based evaluation.

Operation of timer for Lung Trainer Lung exercise measurement device and method:

1) On and off Switch—When power is applied
   a. Lifting Timer displays 000 (another number or equivalent) and is paused
   b. Rest Timer displays 000 (another number or equivalent) and is paused
   c. Set Counter displays 0 (another number or equivalent). (This display is a counter not a timer and increases by one at the start of each lift)
   d. All LEDs are off
2) When air pressure is applied
   a. Lifting Timer starts
   Lift Timer is cumulative. It continues counting from the previous set. It represents the total lifting time while exercising. It can be reset manually to 000 (another number or equivalent) at any time via a push button.
   b. Rest Timer automatically resets to zero [000] (another number or equivalent) and is paused (rest timer resets to 000 (another number or equivalent) at the start of each lift)
   c. Set Counter: 1 is added to the previous count. The count [1] is displayed on the first lift.
   d. LEDs corresponding to the air pressure applied are activated.

e. In some embodiments the lift, rest and set counters may count backwards from a pre-specified count, or may initiate at specific count.

3) When exhalation air pressure is no longer applied a. Lifting Timer is paused: continues to display the total seconds that positive air pressure was maintained.

b. The Rest Timer starts automatically from [000] (another number or equivalent). measuring the time of each individual period of rest.

c. No change is made to the Set Counter, continues to display previous count.

d. All LEDs are off

4) If air pressure is again applied, the Lift Timer continues from the previously displayed time. The Rest Timer is reset to 000 (another number or equivalent) and is paused, 1 (another number or equivalent) is added to the Set Counter displaying the total number sets completed, and LEDs corresponding to the air pressure applied are activated.

5) When the reset button of the Rest Counter is pressed, Rest counter is Reset to 000 (another number or equivalent) and is paused 6) When the reset button of the Lifting Timer is pressed, Set Counter and Lifting Timer resets to zero (another number or equivalent).

7) In some embodiments, lifts, rests and sets may cumulative to or subject from prior lifts, rests and sets. These can be used for example to monitor free practice or to measure achievement of a certain number of lifts, rests and sets throw a countdown of set objectives.

Circuit consists of:

1) Pressure Sensor Honeywell (basic amplified board mounted pressure sensor, ABP series) ABPDANT005PGAA5 [0-5 PSI, Liquid media applications where condensation can occur]. The ABPDANT005PGAA5, provides a compensated/amplified, gage, DIP AN: single axial barbed port, liquid media, no diagnostics, 0 psi to 5 psi, 10% to 90% of Vsupply, no temperature output, no sleep mode, 5.0 Vdc. The ABPDANT005PGAA5 are piezoresistive silicon pressure sensors offering a ratiometric analog or digital output for reading pressure over the specified full scale pressure span and temperature range. ABPDANT005PGAA5 are calibrated and temperature compensated for sensor offset, sensitivity, temperature effects and accuracy errors (which include non-linearity, repeatability and hysteresis) using an on-board Application Specific Integrated Circuit (ASIC). Calibrated output values for pressure are updated at approximately 1 kHz for analog and 2 kHz for digital. The liquid media option, includes an additional silicone-based gel coating to protect the electronics under port P1, which enables use with non-corrosive liquids (e.g. water and saline) and in applications where condensation can occur. Port P2 is designed for use with non-corrosive liquids.

2) Lifting Timer:

a. NE555P Timer and external RC network. 555 Timer-Running: a-stable mode (Timed pulses with timed gaps between them). In a-stable mode, the 555 timer acts as an oscillator that generates a square wave. Generally, the frequency of the wave can be adjusted by changing the values of two resistors and a capacitor connected to the chip. NE555P are timing circuits capable of producing time delays or oscillation. In the time-delay or mono-stable mode of operation, the timed interval is controlled by a single external resistor and capacitor network. In the a-stable mode of operation, the frequency and duty cycle can be controlled independently with two external resistors and a single external capacitor. The threshold and trigger levels normally are two-thirds and one-third, respectively, of Vcc. These levels can be altered by use of the control-voltage terminal. When the trigger input falls below the trigger level, the flip-flop is set, and the output goes high. If the trigger input is above the trigger level and the threshold input is above the threshold level, the flip-flop is reset and the output is low. The reset (RESET) input can override all other inputs and can be used to initiate a new timing cycle. When RESET goes low, the flip-flop is reset, and the output goes low. When the output is low, a low-impedance path is provided between discharge (DISCH) and ground. The output circuit is capable of sinking or sourcing current up to 200 mA. Operation is specified for supplies of 5 V to 15 V. With a 5-V supply, output levels are compatible with TTL inputs.

b. 3 (CD4026BE decade counter decoder), connected to 3 LED seven-segment displays. The CD4026 is an integrated circuit that can perform the function of both a counter and 7-segment Driver. One single CD4026 can be used to count form zero (0) tonine (9) directly on a Common Cathode type 7-segment display. The count can be increased by simply giving a high clock pulse; also more than one digit (0-9) can be created by cascading more than one CD4026. A CD4026 consists of a 5-stage Johnson decade counter and an output decoder which converts the Johnson code to a 7-segment decoded output for driving one stage in a numerical display. Other similar devices and equipment, including for example virtual counters may be substituted and used with or in place of CD4026.

c. Reset button.

3) Rest Timer a. NE555P Timer and external RC network. 555 Timer-Running: a-stable mode (Timed pulses with timed gaps between them)

b. 3 (CD4026BE decade counter decoder), connected to 3 LED seven-segment displays.

c. Reset button.

4) Set Counter: 1 (CD4026BE decade counter decoder), connected to 1 LED seven-segment display and reset circuit.

5) NE555P Timer, 555 Timer-Running: Bistable mode [Latch]

6) 2 Quad Differential Comparators, e.g. Texas Instruments LM339N, which were designed specifically to operate from a single power supply over a wide range of voltages. Operation from split power supplies is also possible and the low power supply current drain is independent of the magnitude of the power supply voltage. These comparators also have a unique characteristic in that the input common-mode voltage range includes ground, even though they are operated from a single power supply voltage. Equivalent and similar comparators may be used as are combinations of virtual comparators, processors, computer readable memory and/or non-transitory computer readable medium.

7) Operation of the device is controlled by exhalation air pressure acting on an analog, amplified pressure sensor. The pressure sensor selected has an input pressure range of 0-5 PSI and was designed for applications where condensation can occur.

8) The output of the pressure sensor is applied to 2 low voltage quad comparator LM339-N providing a total of 8 independent voltage comparators. 4 comparators are used to activate 4 LEDs at different air pressures and 4 comparators are used to control the operation of the seven-segment displays ("display" comparators).

9) Each of the 4 display comparators is reacting to either 0 pressure being applied to the pressure sensor or positive pressure being applied to the pressure sensor. Each comparator compares the two inputs and delivers an output. The output of each comparator is either HIGH or LOW. The output of a comparator is HIGH when the voltage on the non-inverting input (+IN) is greater than the inverting input (−IN), (+IN)>(−IN). The output of a comparator is LOW when voltage on the non-inverting input (+IN) is less than the inverting input (−IN), (+IN)<(−IN). The same voltage divider is used for all 4 display comparators as input and a pressure sensor is used as the other input on all comparators. The pressure sensor will be used as either non-inverting (+IN) or inverting (−IN) depending on the desired output.

10) COMPARATOR INPUTS:

a) Pressure Sensor (PS) output voltage:

a. Approximate Output (V)=(0.8×V supply/5)×pressure applied+0.1×V supply b. At 0 pressure applied approximate output voltage=0.1×V supply b) Voltage divider (V DIV):

a. A 110K ohm and a 750K ohm resistors used to establishes a voltage slightly higher than the zero-pressure voltage output of the pressure sensor.

b. 110/(110+750)=0.128×V supply c) At V supply=6 v, Voltage divider=0.77 v, Pressure sensor at 0 pressure=0.57 v. Minimal exhalation air pressure applied to the pressure sensor increases the output voltage of the pressure sensor above the voltage of the voltage divider and inverts the output results of the 4 comparators.

d) The 4 comparators used to control the seven-segments displays will use as the voltage divider (V DIV) and the pressure sensor (PS) as input. The voltage divider and pressure sensor will be connected to the comparators as indicated the following chart.

| | Voltage Divider V DIV and Pressure Sensor PS Connected At | | Voltage at 0 Pressure, and V Supply = 6 V | | | |
|---|---|---|---|---|---|---|
| Comparator | PS | V DIV | PS | V DIV | | RESULT |
| Latch | (−IN) | (+IN) | 0.57 | 0.77 | (+IN) > (−IN) | HIGH |
| Rest Timer | (−IN) | (+IN) | 0.57 | 0.77 | (+IN) > (−IN) | HIGH |
| Lift Timer | (+IN) | (−IN) | 0.57 | 0.77 | (+IN) < (−IN) | LOW |
| Set Counter | (+IN) | (−IN) | 0.57 | 0.77 | (+IN) < (−IN) | LOW |

e) The results above are based on 0 exhalation air pressure applied to the pressure sensor.

The results will invert when slight exhalation air pressure is applied.

Latch:

The Rest Timer keeps track of the rest time between sets. It is therefore expected to run during periods where the pressure sensor is at 0 PSI, rest. However, when the unit is first turned on, but before any exercise begins the rest timer should remain paused at zero (000) even though air pressure at the pressure sensor is 0 PSI. Therefore, two results are needed for the rest timer at 0 PSI; normally running, but at start-up stopped at 000. This is accomplished with the Latch.

[Latch] NE555P timer, running in Bi-stable mode: Receives input from latch comparator on Pin 2, trigger pin, provides output from Pin 7, discharge pin to Rest Timer (note: the Output Pin, pin 3, of the 555 Latch will not be used). The output used will be the connection to ground through pin 7, discharge pin. Positive air pressure at the pressure sensor will be detected by the comparator. The comparator will change the status of the Latch, disconnecting Pin 7 from ground. On power up with 0 PSI on pressure sensor, output of Latch comparator is HIGH. (On latch Comparator the voltage divider is the non-inverting input. At 0 PSI, V DIV>PS=comparator output HIGH)

In one embodiment the Latch comparator output HIGH has no effect on the latch. Output of the latch Comparator is connected to pin 2, trigger pin, on the 555 Latch. Pin 2, latch trigger pin, is activated by LOW input; ⅓ of the supply voltage or lower. Therefore, output HIGH has no effect on the Latch.

When a 555 initially powers up pin 7, discharge pin, is connected to negative power. This pin will continue negative until a drop in voltage on pin 2, the trigger pin, to ⅓ of the supply voltage or lower triggers the 555 and disconnects the negative power from pin 7. Pin 7, discharge pin, on the 555 Latch is connected to pin 7, discharge pin, of the 555 Rest Timer. The connection to negative power through the Latch interrupts the charging and discharging of the timing capacitor on the Rest Timer (The latch provides an alternate path to ground preventing the charging of the timing capacitor on the 555 Rest Timer).

The Rest Timer continues paused at 000, until positive exhalation air pressure on the pressure sensor changes the output on the latch Comparator from HIGH to LOW. (The air pressure sensor is connected to the latch Comparator at (−IN,) the voltage divider is connected to the latch Comparator (+IN), When exhalation air pressure is applied to the pressure sensor the voltage output of the pressure sensor increases and becomes greater than the voltage divider, when (+IN)<(−IN) output on the latch Comparator changes to LOW.) Low voltage on pin 2, trigger pin, on the 555 Latch, disconnects negative power to 555 latch pin 7 and allows the charging of the timing capacitor of the 555 Rest Timer.

[At positive PSI, V DIV<PS=comparator output LOW—Output LOW on latch comparator triggers the Latch and disconnects the negative power from 555 latch pin 7 allowing the 555 Rest Timer to run.]

Once the latch is triggered the status of the Latch is no longer influenced by the output of HIGH or LOW in the comparator. Pin 7 on the Latch will continue to be disconnected from negative power. The Latch will reset when the system is powered up again. This enables the Rest Timer to function independently after the first exhalation of air pressure into the pressure sensor.

[In bi-stable operation: The 555 Latch, (once triggered by low voltage on pin 2, trigger pin), will only change state with either Low input on pin 4, reset pin, or High input, ⅔ of input voltage or higher, on pin 6, threshold pin. Therefore, after initial low voltage on pin 2, trigger pin, future changes, high or low on pin 2, trigger pin, have no impact on the state of the 555 Latch] Latch can be reset using the rest counter push button. Rest counter push button applies 100% supply voltage to pin 6, threshold pin, of latch. This pauses the rest timer.

Rest Timer:

When the device is turned on the Rest Timer displays 000 until the Latch is released as explained above.

The Rest Timer uses NE555 and external resistor capacitor network running in astable mode (timed pulses with timed gaps between them). Output of the 555 timer is connected to 3 CD4026BE decade counter decoder driving 3 seven-segment displays.

NE555P operation in a-stable mode:

1) Initially 555 timer powers up;
   a Pin 3, output pin, is low and Pin 7, the discharge pin is connected to negative power.
2) Initial low voltage on the luF capacitor (Timing Capacitor), connected to Pin 2, trigger pin, tells the chip to trigger itself.
3) Pin 3 output pin, changes to high and Pin 7, discharge pin, disconnects from negative power allowing the luF Timing Capacitor to start charging through the 698K resistor, (Timing Resistor).
4) When the luF Timing Capacitor reaches ⅔ of supply voltage Pin 6, threshold pin, is activated by this input high.
5) Pin 3, output pin, changes to low, Pin 7, the discharge pin is connected to negative power thereby discharging the 1 uF Timing Capacitor through the 698K Timing Resistor.
6) At ⅓ of supply voltage Pin 2, trigger pin, is activated by low input.
7) Pin 3 output pin, changes to high and Pin 7, discharge pin, disconnects from negative power allowing the luF Timing Capacitor to start charging through the 698K Timing Resistor.
8) 555 timer continues running in a-stable mode.

Output of the NE555P timer with luF Timing capacitor and 698K Timing resistor provides a pulse at 1 second intervals to Pin 1, clock pin, on the first of 3 CD4026BE decade counter decoder, driving the 3 seven-segment displays of the Rest Counter.

Pausing the Rest timer: The Rest Timer should be paused and reset when exhalation air pressure is applied to the pressure sensor.

Output of rest timer Comparator is connected to Pin 7, discharge pin, on the 555 Rest Timer. On power up with 0 PSI output from comparator is HIGH. (Note: output HIGH has no effect on the timer LOW input will pause the timer). The air pressure sensor is connected to the resting timer Comparator at (−IN) the voltage divider connected to the comparator (+IN). With (+IN)>(−IN) output of the rest timer Comparator is HIGH. When exhalation air pressure is applied to the pressure sensor the voltage output of the pressure sensor increases and becomes greater than the voltage divider; when (+IN)<(−IN), output on the resting timer Comparator changes to LOW. This LOW connected to pin 7, discharge pin, prevents the charging of the Timing Capacitor regardless of the status of pin 7 on the 555 Rest Timer and the timer is paused.

Resetting the Rest timer: The rest timer keeps track of the rest interval between lifts and must be reset at the start of each lift.

The seven-segment displays receive their input from the 4026B chip known as a decade counter. The 4026B has seven output pins that that it powers in patterns that corresponds to the seven-segment display. Pin 15 of the 4026B is the reset pin which will reset the counter to 000. Pin 15 is active-high.

To reset the Rest Timer, some embodiments use the set counter Comparator. For many of these embodiments, this comparator will also be used as the input for the Set Counter display.

The set counter Comparator output through a 2K ohm resistor is connected to pin 15, reset pin, on the first 4026B of the Rest Timer. On power up with 0 PSI output from comparator is LOW. (note: HIGH input on pin 15 will reset the timer) The air pressure sensor is connected to the set counter Comparator at (+IN). The voltage divider is connected to the comparator (−IN). When exhalation air pressure is applied to the pressure sensor the voltage output of the pressure sensor increases and becomes greater than the voltage divider, when (+IN)>(−IN) output on the Set Counter comparator changes to HIGH. This HIGH connected to pin 15, reset pin, resets the display to 000.

Lifting Timer:

When the device is turned on, the Lifting Timer is paused displaying 000. When air pressure is applied the lifting timer starts.

Output of lifting timer Comparator is connected to Pin 7, discharge pin, on the 555 Lifting Timer. On power up with 0 PSI, output from comparator is LOW. (Note: LOW output from comparator will pause the timer, HIGH output starts the timer)

The air pressure sensor is connected to the lifting timer Comparator at (+IN) the voltage divider is connected to the comparator (−IN). At start up with 0 PSI applied, output voltage from the pressure sensor is lower than the voltage at the voltage divider; (+IN)<(−IN) therefore, output from comparator is LOW. This LOW connected to pin 7, discharge pin, prevents the charging of the Timing Capacitor regardless of the status of pin 7 on the 555 lifting timer. Interrupting the charging of the timing capacitor pauses the Lifting Timer.

When exhalation air pressure is applied to the pressure sensor the voltage output of the pressure sensor increases and becomes greater than the voltage divider, when (+IN)>(−IN), output on the lifting timer Comparator changes to HIGH. This HIGH connected to pin 7, discharge pin, allows the normal charging and discharging of the 555 timer timing Capacitor, allowing the timer to run.

The Lifting Timer uses NE555 and external resistor capacitor network running in astable mode (timed pulses with timed gaps between them). Output of the 555 timer is connected to 3 CD4026BE decade counter decoder driving 3 seven-segment displays. Output of the NE555P timer with luF Timing capacitor and 698K Timing resistor provides a pulse at 1 second intervals to Pin 1, clock pin, on the first of 3 CD4026BE decade counter decoder, driving the 3 seven-segment displays of the Lifting Counter.

The Set Counter:

The Set counter displays the number of sets. One is added to the counter each time the pressure sensor goes from 0 to positive pressure.

The set counter Comparator output is connected to Pin 1, clock pin, on the 4026B of the Set Counter. On power up with 0 PSI, output from comparator is LOW. (Note: HIGH input on pin 1, clock pin, will add one to the counter) The air pressure sensor is connected to the set counter Comparator at (+IN). The voltage divider is connected to the comparator at (−IN). When exhalation air pressure is applied to the pressure sensor the voltage output of the pressure sensor increases and becomes greater than the voltage divider when (+IN)>(−IN); [(PS)>(V DIV)] output on the Set Counter comparator changes to HIGH. This HIGH connected to pin 1, clock pin, will add one to the counter.

The Set Counter:

The Set counter displays the number of sets. One is added to the counter each time the pressure sensor goes from 0 to positive pressure.

The set counter Comparator output is connected to Pin 1, clock pin, on the 4026B of the Set Counter. On power up with 0 PSI, output from comparator is LOW. (Note: HIGH input on pin 1, clock pin, will add one to the counter) The air pressure sensor is connected to the set counter Comparator at (+IN). The voltage divider is connected to the comparator at (−IN). When exhalation air pressure is applied to the pressure sensor the voltage output of the pressure sensor increases and becomes greater than the voltage divider when (+IN)>(−IN); [(PS)>(V DIV)] output on the Set Counter comparator changes to HIGH. This HIGH connected to pin 1, clock pin, will add one to the counter.

Pin 4 Reset Pin and Pin 2 Trigger Pin: The output of the Latch comparator is connected to the Trigger Pin, pin 2. Low input on Trigger Pin, pin 2, will trigger the latch allowing the Rest timer to run. The Latch is intended to trigger by applying positive air pressure at the pressure sensor causing the comparator to change from output high to output low. Inadvertently however, when power is first applied to the circuit, the comparator sends a low pulse to the Latch Trigger Pin and triggers the Latch. This unintended result is prevented by the luF capacitor between the Reset Pin, pin 4, and ground. The capacitor sinks current from the Reset Pin when power is first turned on, and holds the pin low for a fraction of a second just long enough to prevent the inadvertent low pulse by the comparator from triggering the Latch. After initiation the comparator stabilizes with 0 psi output high. The luF capacitor on pin 4, reset pin, needs to discharge quickly contemplating that a user, with the intent of resetting the device, will turn the device off and on again without any wait. This is accomplished through the 100K ohm resistor connecting the capacitor to the voltage divider on the Trigger Pin, pin 2. Note that the trigger pin will trigger the Latch when detecting ⅓ of the supply voltage or less. The voltage divider pulls up the output voltage of the comparator and holds the voltage at ½ the supply voltage at pin 2 until the comparator switches to output LOW and drops the voltage at pin 2 to near 0 triggering the Latch allowing the Rest Timer to run.

Output pin, Pin 3: is not used.

Pin 5 control pin: A .01 uF capacitor is attached to pin 5 the control pin. Applying voltage to the control pin provides control of the sensitivity of the 555 [Latch]. The capacitor on pin 5 protects from voltage fluctuations and prevents the control pin from interfering with normal 555 functions.

Pin 6 threshold pin: Latch Reset is triggered by a voltage of ⅔ of the supply voltage or higher applied to the Latch threshold pin. In bi-stable operation: The 555 Latch, (once triggered by low voltage on pin 2, trigger pin), will only change state with either Low input on pin 4, reset pin, or High input, ⅔ of input voltage or higher, on pin 6, threshold pin. After initial low voltage on pin 2, trigger pin, by the 1 uF capacitor to ground, pin 2 is held high through 100 k Ohm resistor connected to the voltage divider. After the latch is triggered changes from the comparator, high or low on pin 2, trigger pin, have no impact on the state of the 555 Latch. The Latch is reset via the Latch via the Rest Timer push button. The Rest Timer push button connects manually pin 6, Threshold pin, to the supply voltage triggering a reset of the latch.

Pin 7 Discharge Pin: Latch discharge pin, pin 7 is connected to the Rest Timer discharge pin, pin 7 of the 555 Rest Timer. On start up the discharge pin of the Latch is connected to negative power pausing the Rest Timer by interrupting the charging and discharging of the Rest Timer timing capacitor. Positive air pressure at the pressure sensor causes the comparator to output low and drops the voltage at the trigger pin to near 0. Output low on trigger pin 2 triggers the latch disconnecting Latch Pin 7 from negative power allowing the Rest Timer to run.

4 LEDs

In some embodiments, the 4 LEDs (or equivalent) are controlled by exhalation air pressure acting on an analog, amplified pressure sensor. The pressure sensor selected has an input pressure range of 0-5 PSI. The output of the pressure sensor is applied to a low voltage quad comparator LM339-N providing a total of 4 independent voltage comparators. The 4 comparators are used to activate 4 LEDs at different air pressures. Generally, the first LED is activated when minimal air pressure is applied. The air pressure required to activate the other 3 LEDs is adjustable.

Each comparator compares the two inputs and delivers an output. The output of each comparator is either HIGH or LOW. The output of a comparator is HIGH when the voltage on the non-inverting input (+IN) is greater than the inverting input (−IN), (+IN)>(−IN). The output of a comparator is LOW when voltage on the non-inverting input (+IN) is less than the inverting input (−IN), (+IN)<(−IN).

Output High on the comparator turns on the LED and output Low turns off the LED. The output of the comparator will be used as a simple SPST switch to ground. The comparator can sink a maximum current of 16 mA.

Non-inverting (+IN) input: On all 4 comparators the pressure sensor is connected at (+IN):

Pressure Sensor (PS) output voltage:

Approximate Output (V)=(0.8×V supply/5)×pressure applied+0.1×V supply

At 0 pressure applied approximate output voltage=0.1×V supply

Assuming V supply of 5 v:

1 PSI=(0.8)+(0.5)=1.3V; 2 PSI=(0.8)×2+0.5=2.1V; 3 PSI=(0.8)×3+0.5=2.9V; 4 PSI=3.7V; 5 PSI=4.5V

The inverting input (−IN) (1) For the first LED a voltage divider will be used to establishes a voltage slightly higher than the zero-pressure voltage output of the pressure sensor. (the first LED is activated when minimal air pressure is applied) (2) The air pressure required to activate the other 3 LEDs is adjustable. A trimmer potentiometer can be used to set a target inverting input voltage (−IN).

At 0 PSI (+IN)<(−IN), (PS v)<(voltage divider or the trimmer potentiometer) the comparator will sink the power connected to the LED preventing it from turning on. As greater air pressure is applied the voltage output of the pressure sensor increases. When it exceeds the target voltage established by (voltage divider or the trimmer potentiometer) (+IN)>(−IN) output of the comparator switches to HIGH and the LED turns on.

Adverting now to the FIGS., FIG. 1 illustrates a lung training and breathing technique device for a user to exercise their lungs. FIG. 1 illustrates three weighted inserts 102 enclosed within chamber 104. The chamber may be any shaped chamber as long as the weights are able to move freely within the chamber while blocking or substantially restricting the airflow.

Generally, chamber 104 has a hollow center in which weighted inserts 102 are inserted through chamber opening at the top of chamber 104. As shown in FIG. 1, the bottom portion of chamber 104 is enclosed. Tube connector 108, located underneath the enclosed bottom of chamber 104, connects to the distal end of tube 110.

To use the lung exercise measurement device 12000, a user places mouthpiece to the user's mouth. The user then exhales, or blows air, from the user's lungs into mouthpiece. Depending on the training program selected, a user chooses to take a deep breath prior to engaging mouthpiece to the user's mouth. The air exhaled from the user's lungs enters mouthpiece, travels through tube 110, and enters tube connector 108.

The air then flows from tube connector 108 into chamber 104, filling the internal chamber of chamber 104 exerting pressure on weighted inserts 102. As the user increases the force of air exhaled into mouthpiece, the force exerted onto weighted inserts 102 increases. When the force of the air within chamber 104 exceeds the weight of weighted inserts 102, the weighted inserts 102 move along the length of chamber 104. If enough air is exhaled into mouthpiece, weighted inserts 102 travel through chamber 104 and stop at the weight stop or set screw. The weighted stop may be a set screw, cotter pin or other stop adjustable from the front of the device.

An objective of a lung training and breathing technique device is for a user to regulate the air being exhaled from his lungs, into mouthpiece, to suspend weighted inserts 102 within chamber 104. The user regulates the exhaling of air from his mouth into lung instrument training device 100 to regulate the travel of weighted inserts 102 within chamber 104.

Regulation of the air the user breathes into mouthpiece keeps weighted inserts 102 suspended within chamber 104. The user increases the air flow/pressure output to move the weighted inserts 102 higher within the chamber 104. Conversely, the user decreases the airflow/pressure and pressure output to move the weighted inserts 102 lower within the chamber 104. In the context of the present invention, airflow output is the amount of air a user constantly exhales from his lungs into the mouthpiece, tube 110, or other entry point of the present device.

Maintaining the appropriate regulation of pressure and airflow output by the user into the input of the lung training and breathing technique device exercises the user's lungs. The user who started with diaphragm strength and lung capacity to play a recorder, after training with a lung training and breathing technique device, can now play an instrument that requires more lung capacity and breathing regulation. The instant invention improves upon lung training and breathing technique devices.

As with any training program, the number of weighted inserts 102 and the weight themselves are variable based on the needs of the user. Medical patients, such as those recovering from surgery or cancer rehabilitative treatments, will use the present invention to improve their lung, diaphragm and surrounding muscles/areas of the anatomy capacity and strength. The ability to adjust the number of weighted inserts and/or monitor/measure virtual inserts of a lung training and breathing technique device provides a variable solution to improve a user's lung capacity, strength and control. The ability to use virtual inserts further enhances that capability.

In an example embodiment, one or more contacts at the base of the chamber complete or break a circuit to engage and disengage the computerized and/or analog display. The placement of raised contacts or a rough surface at the bottom of the chamber where the weighted inserts contact the stopper rest 121 helps to prevent the inserts from becoming stuck against the stopper rest 121, but the contacts may also be used to complete a circuit for the counter, timer, metronome, sensor, probe, or integrated computer. The stopper rest 121 is preferred to be made of rubber, or silicone, but may be made of any suitable material. Using a soft material reduces noise when the weighted inserts contact the stopper rest 121. Instead of contacts, the pressure sensor, and/or other sensors may be used for keeping track of the various counts discussed herein. Also shown in FIG. 1 are 2 display, stop 103, chamber bracket 105, backboard 302.

Figure 2:
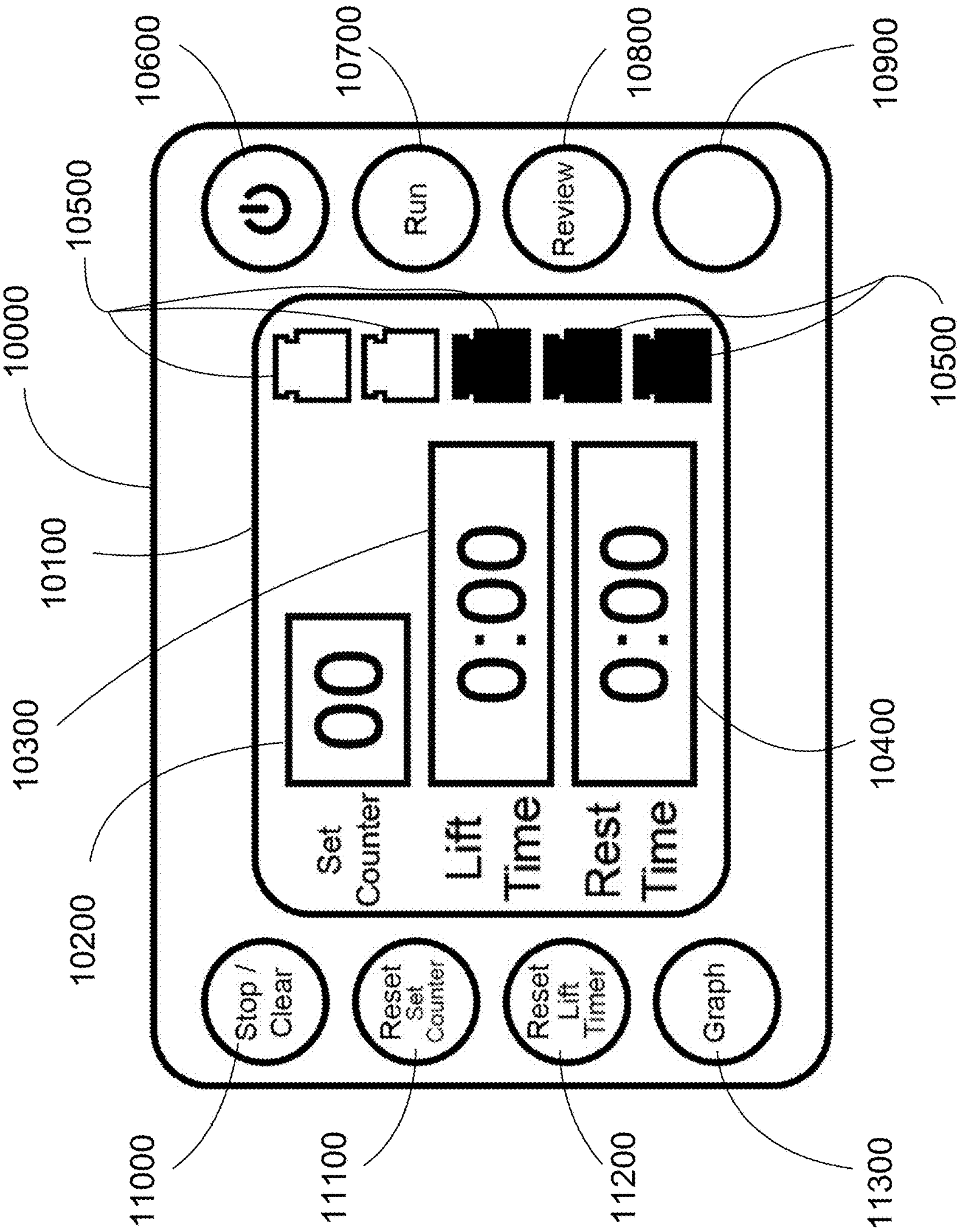
FIG. 2 is a plane view of a display of an embodiment of the invention.
Figure 3:
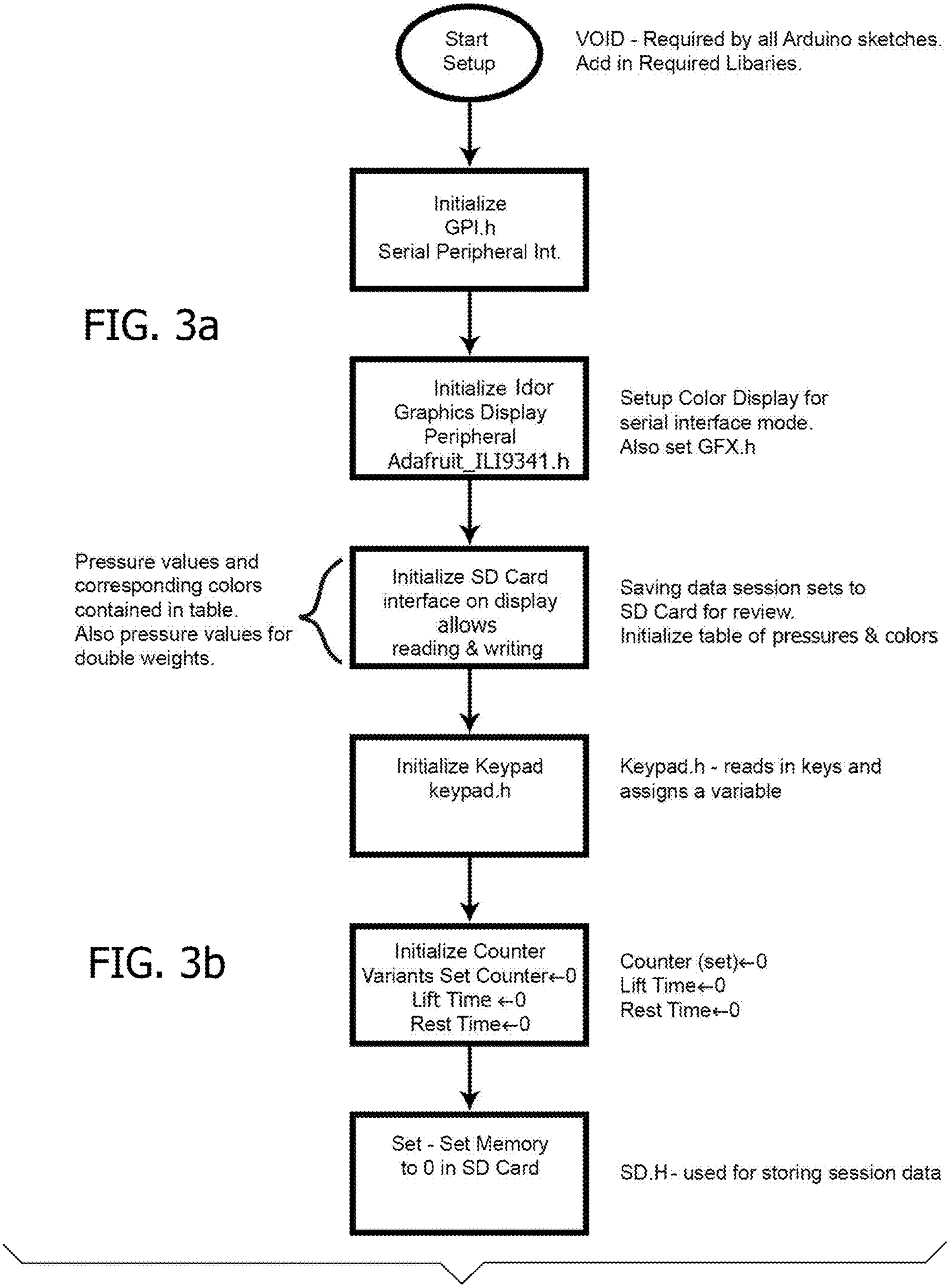
FIG. 3 is a flow chart of a process and computer program of an embodiment of the invention.
Figure 3A:
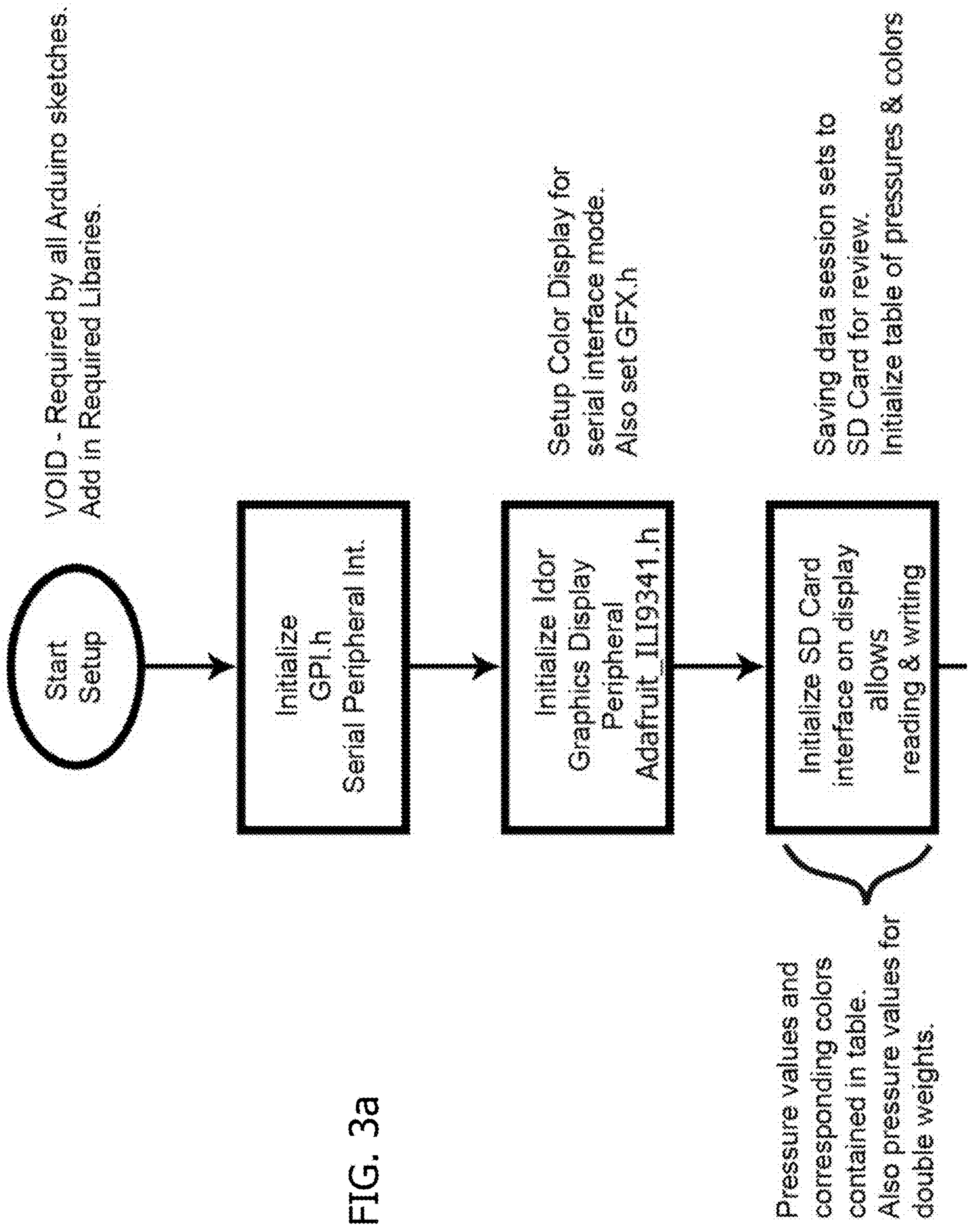
Figure 3B:
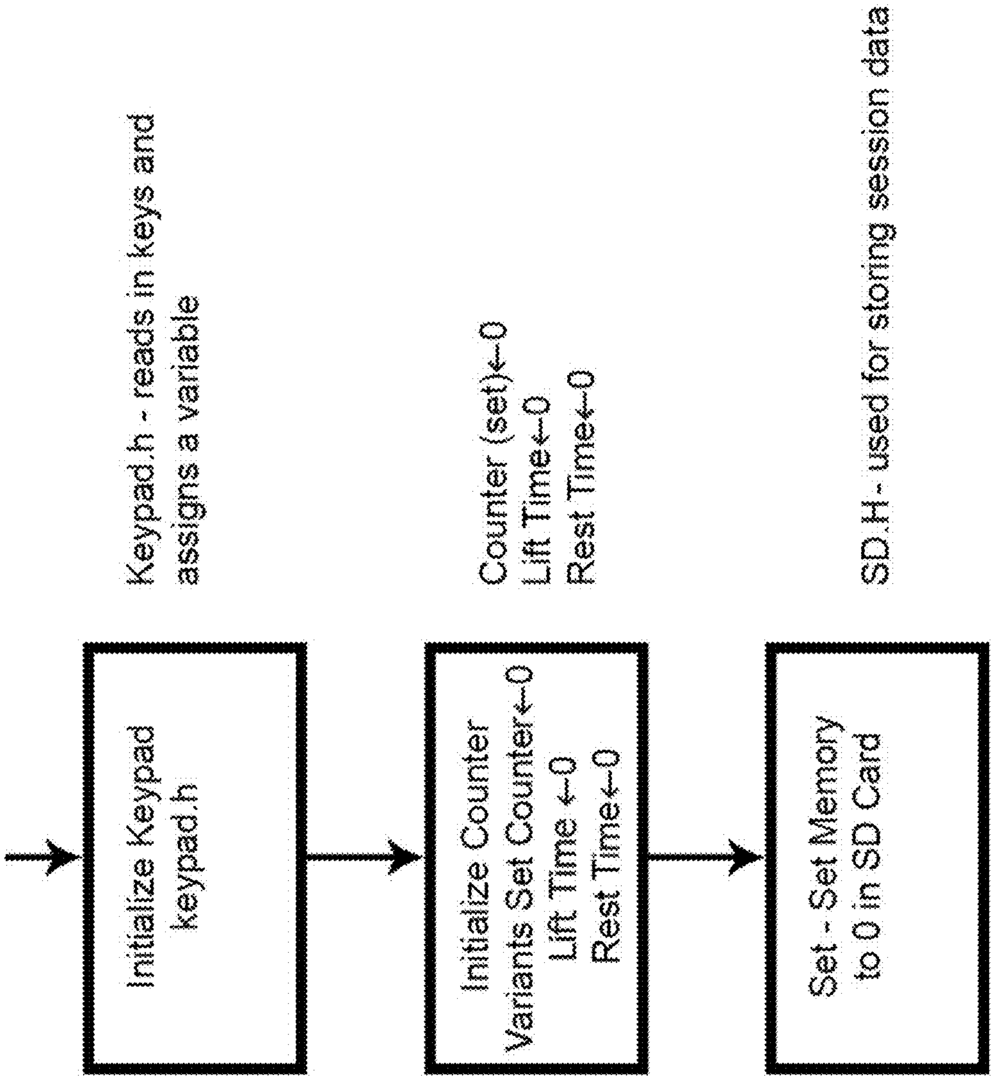
Figures 4, 4A, 4B, 4C:
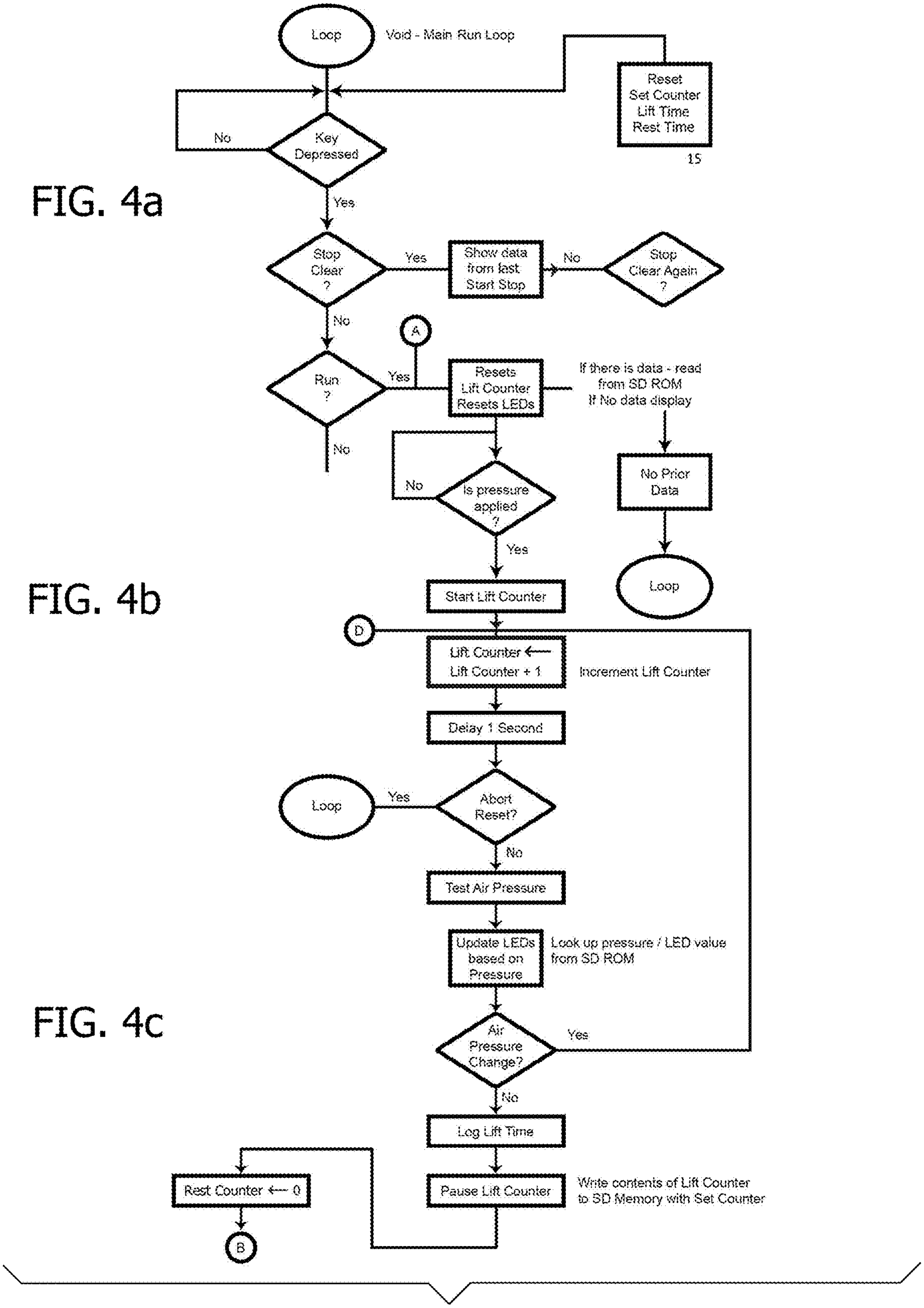
FIG. 4 is a flow chart of process and computer program of an embodiment of the invention.
Figure 4A:
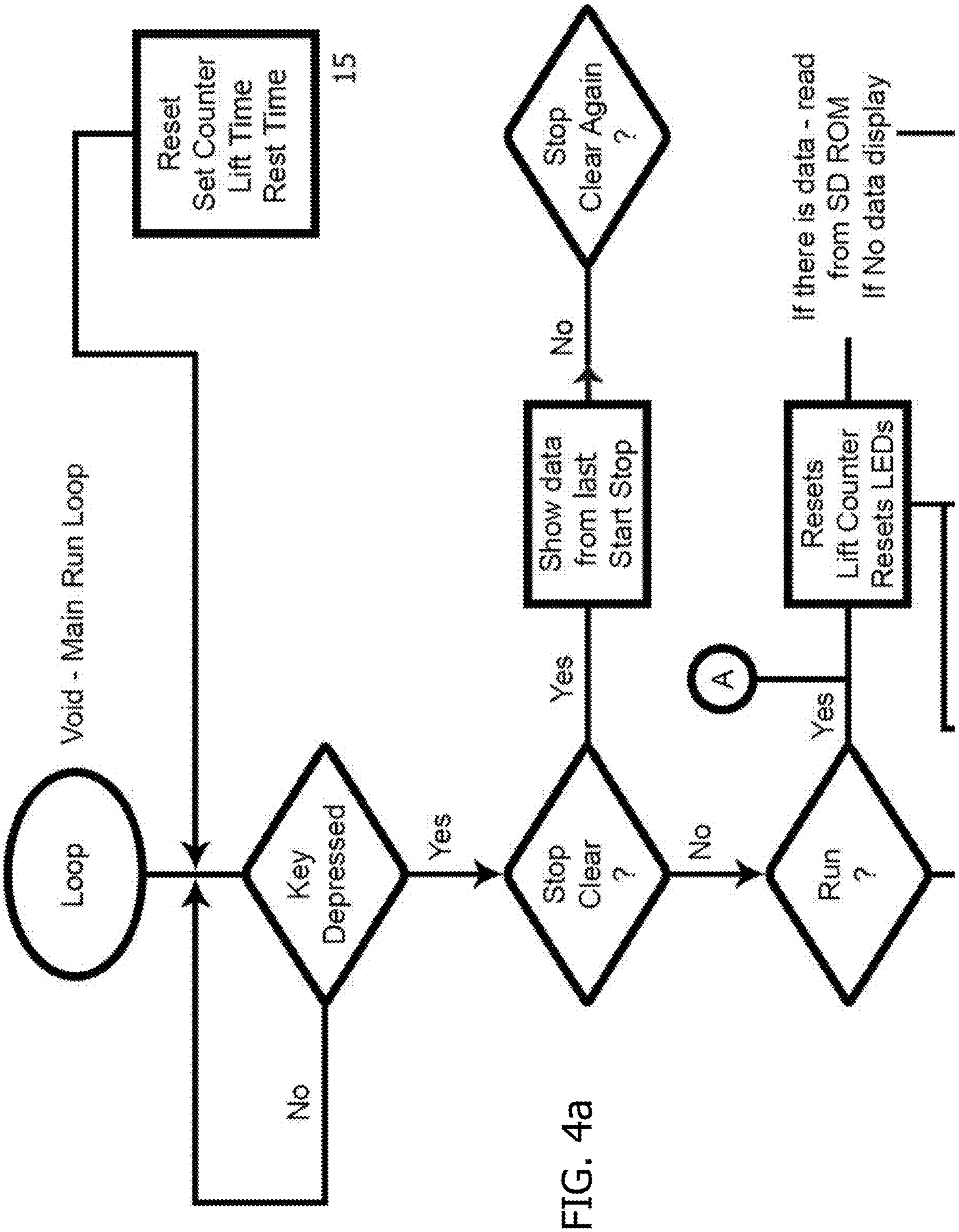
Figure 4B:
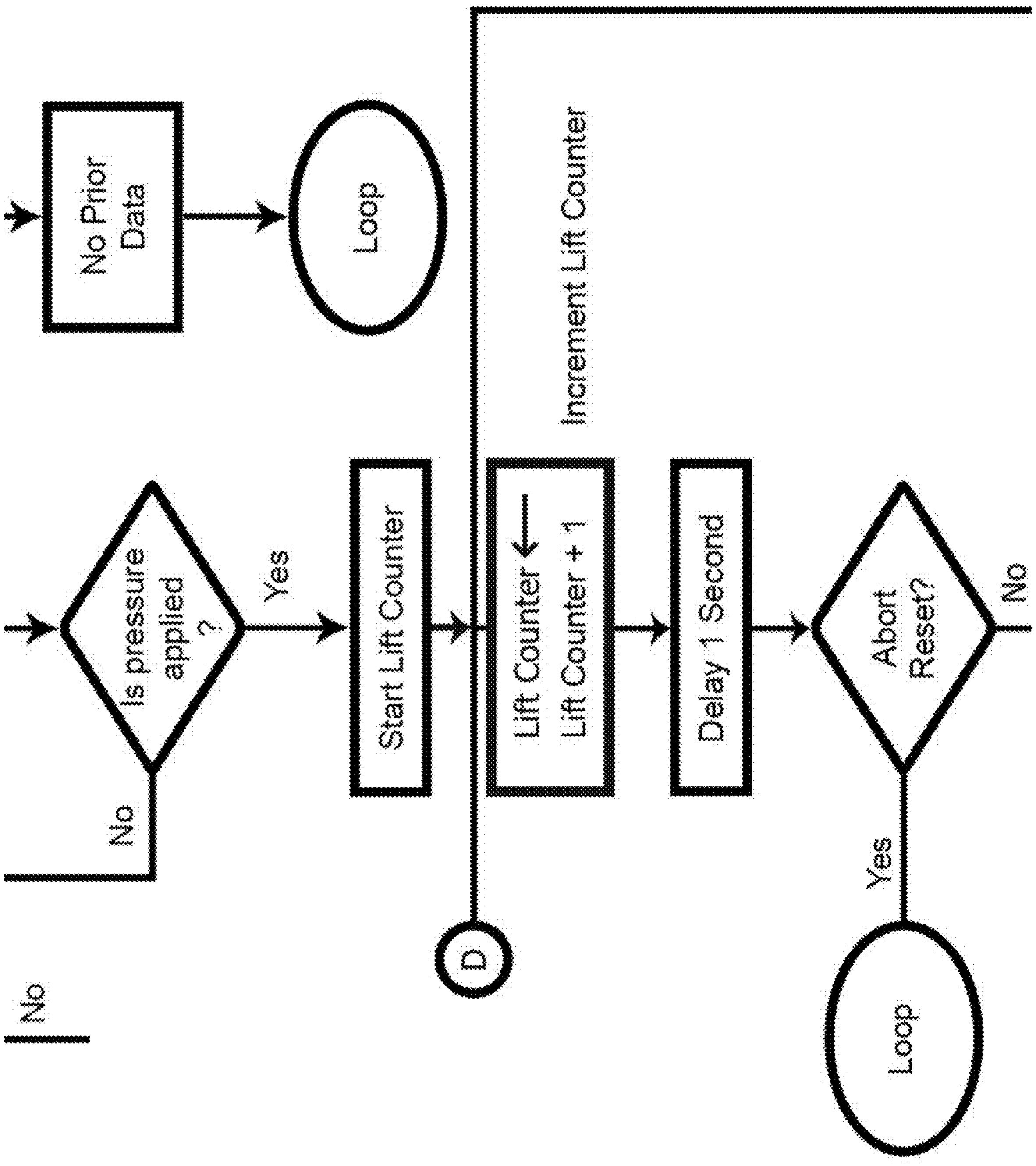
Figure 4C:
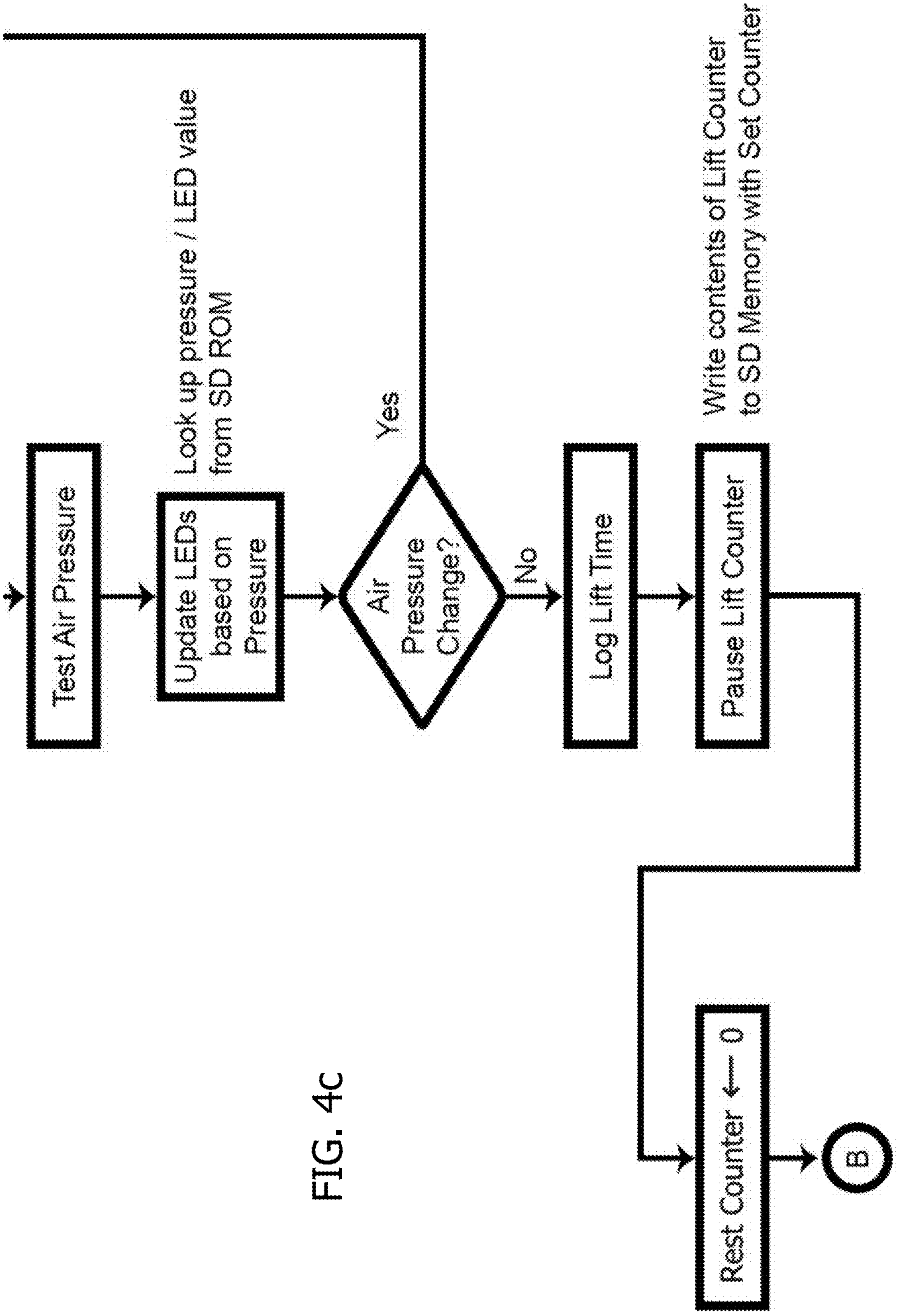
Figures 5, 5A, 5B:
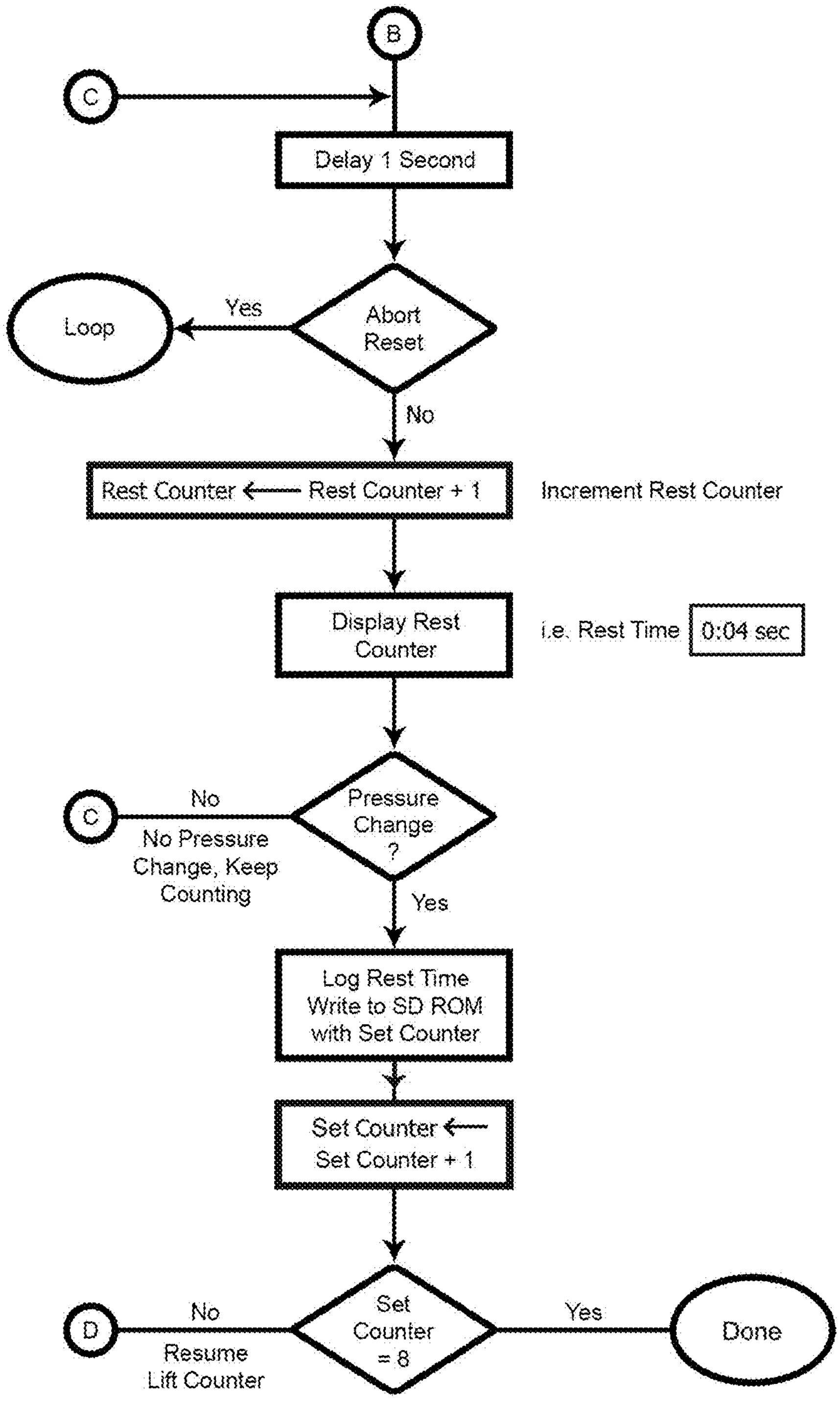
FIG. 5 is a flow chart of process and computer program of an embodiment of the invention.
Figure 5A:
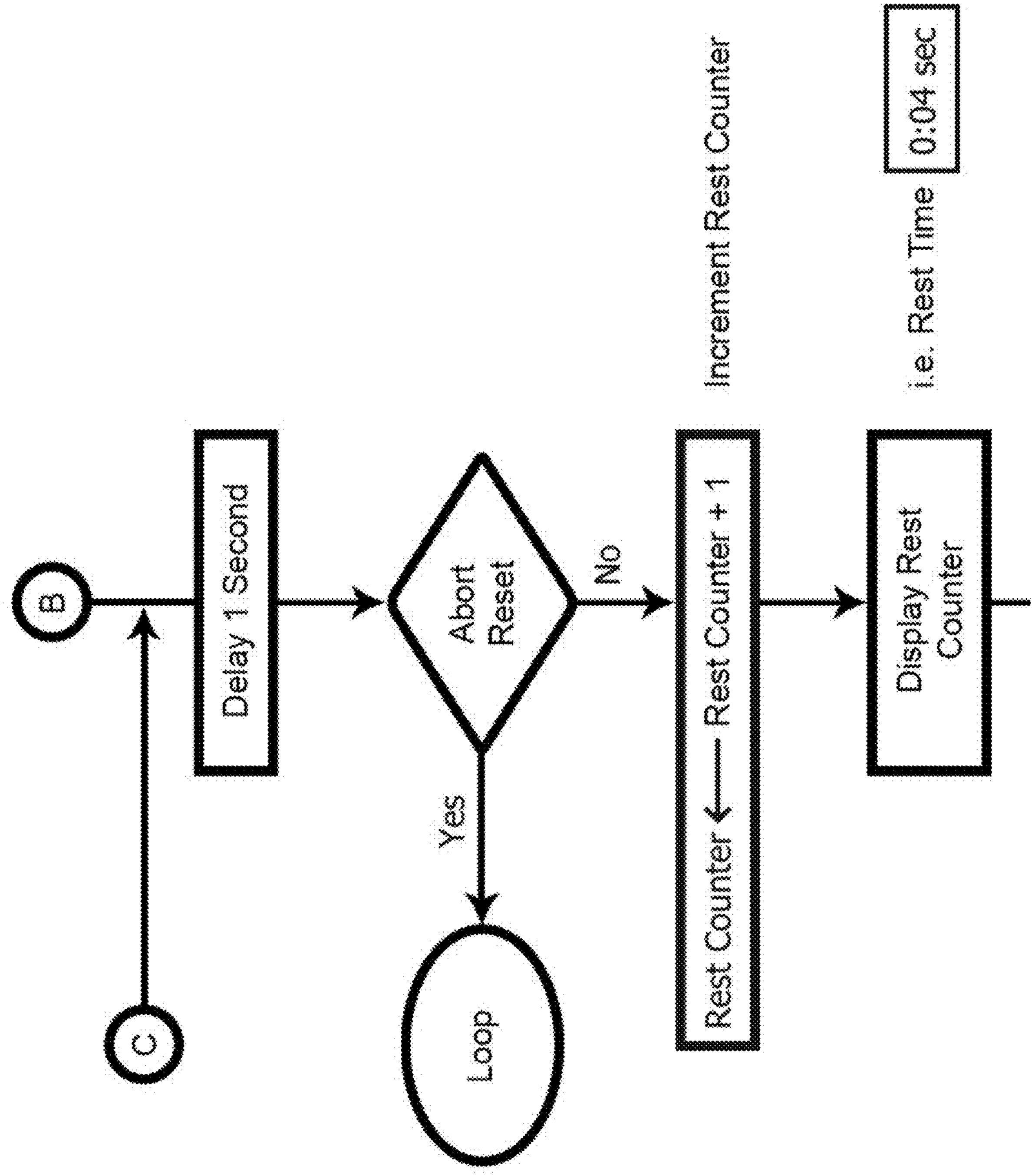
Figure 5B:
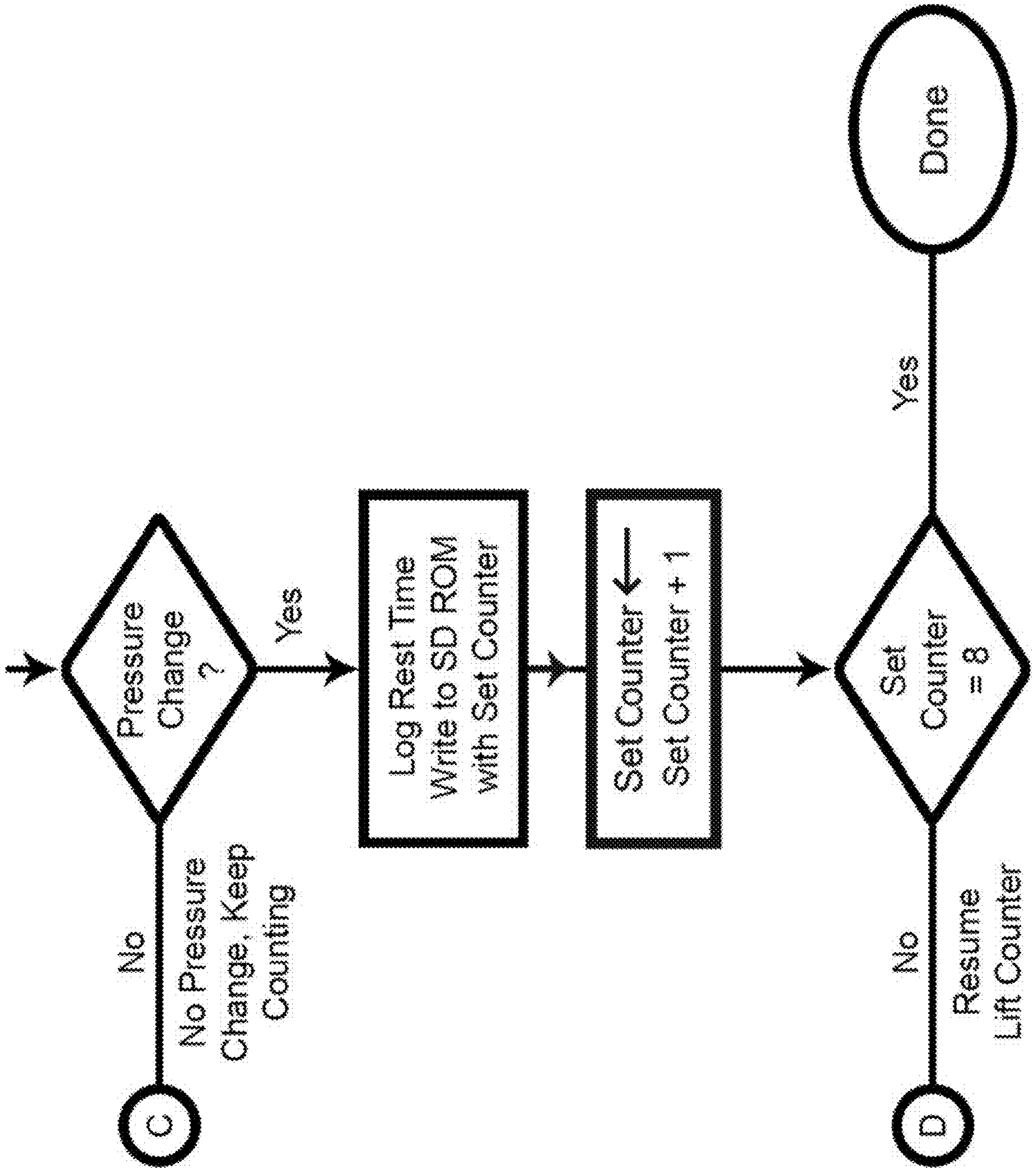
Figures 6, 6A, 6B, 6C:
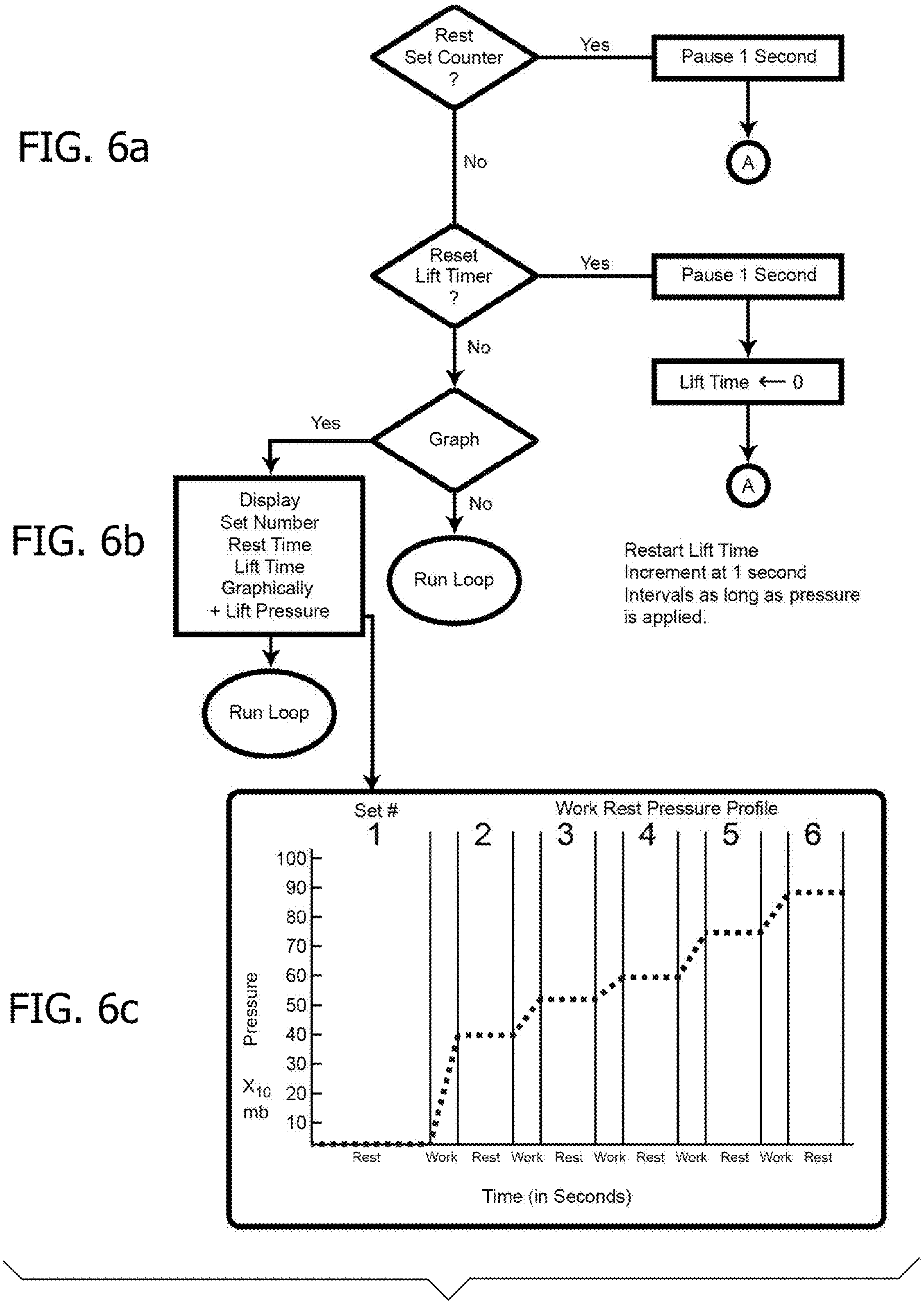
FIG. 6 is a flow chart of process and computer program of an embodiment of the invention.
Figure 6A:
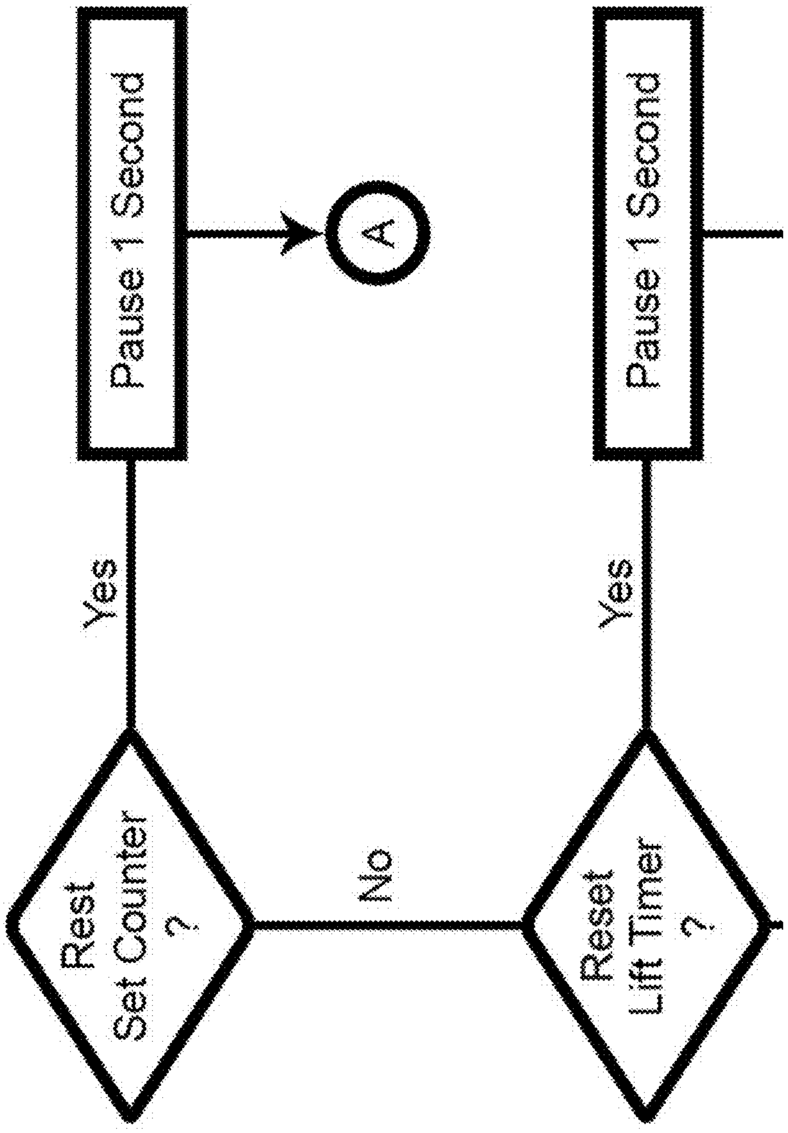
Figure 6B:
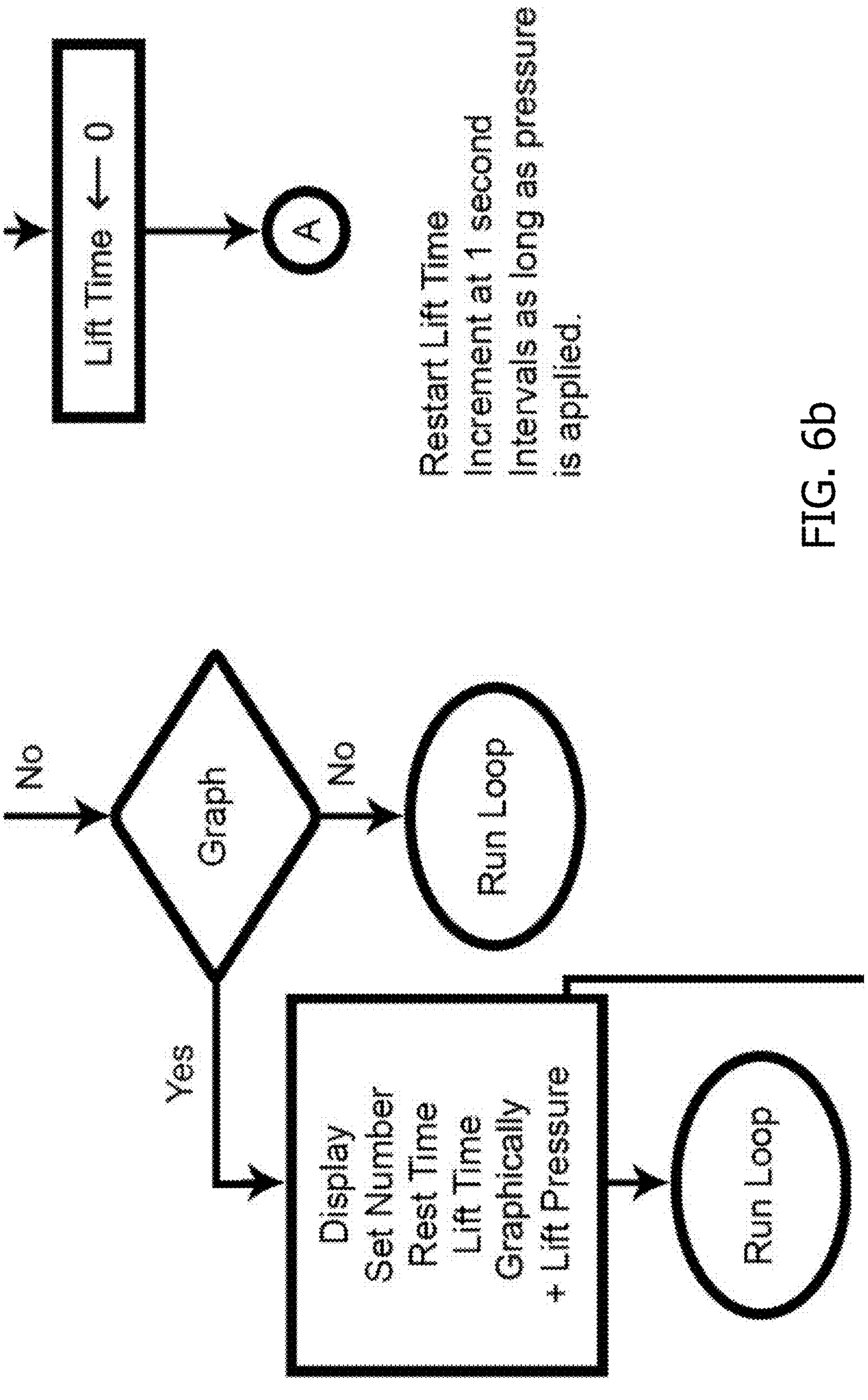
Figure 6C:
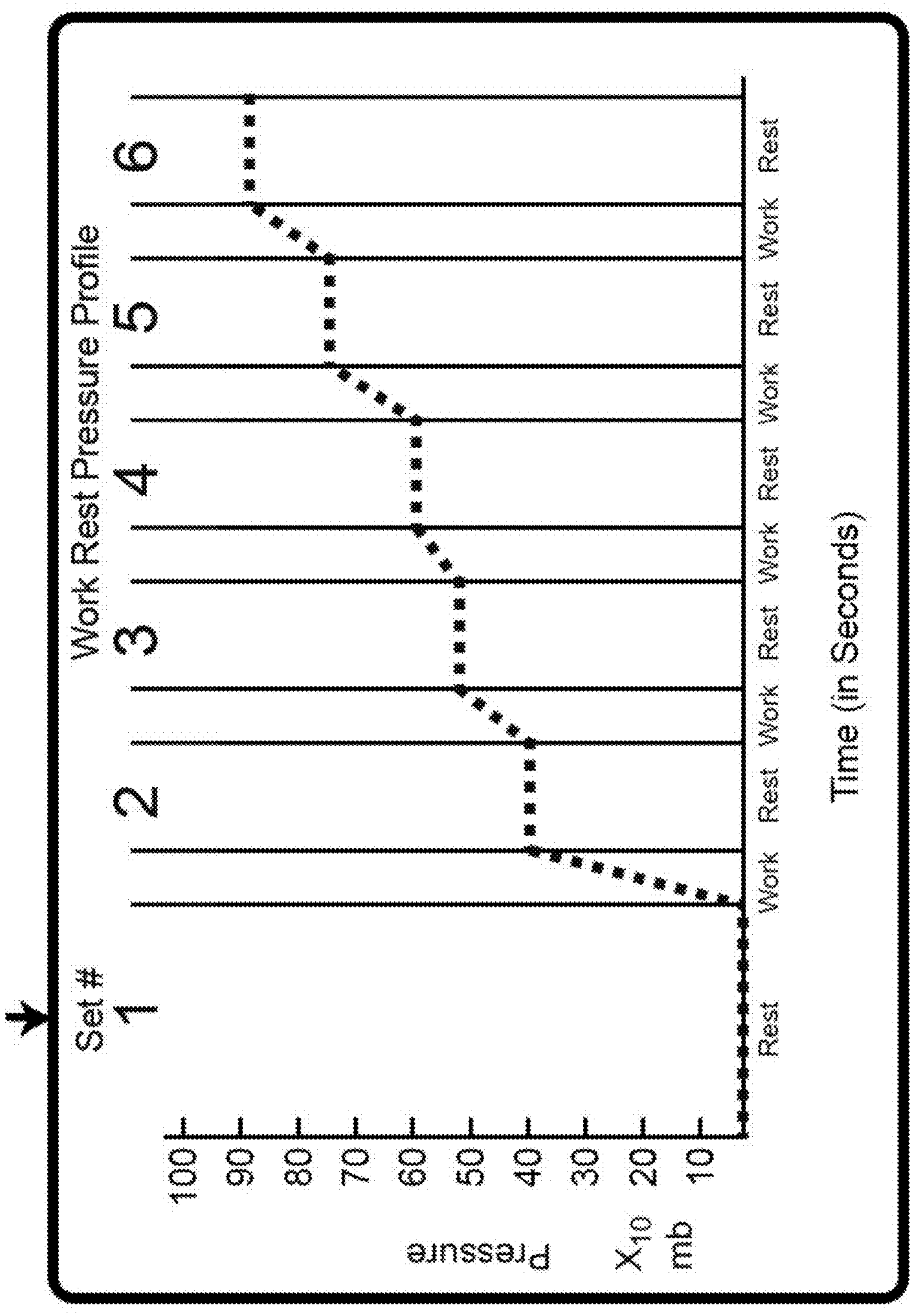
Figures 7, 7A, 7B:
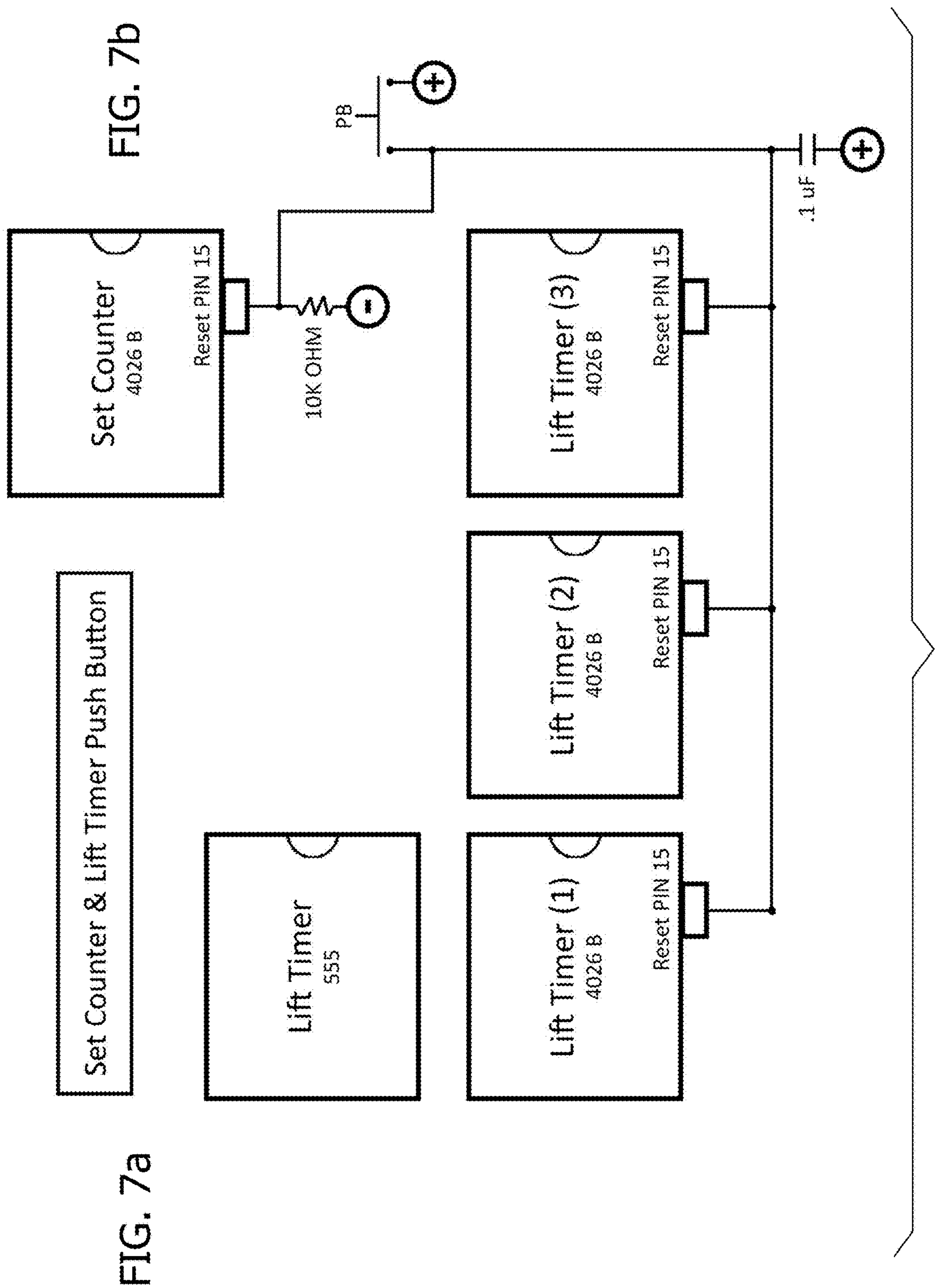
FIG. 7 is a schematic of an embodiment of the set counter and lift timer push button of the invention.
Figure 7A:
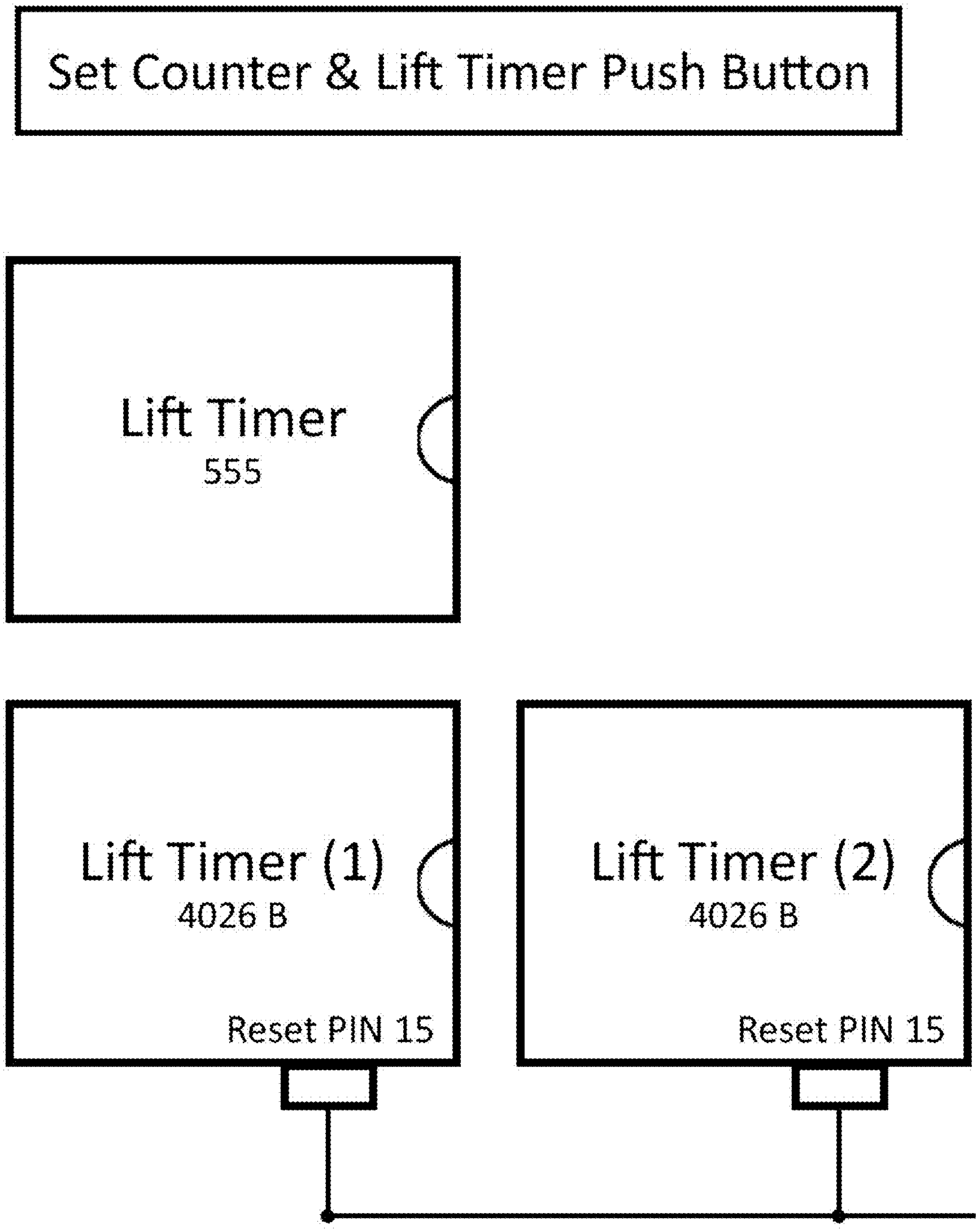
Figure 7B:
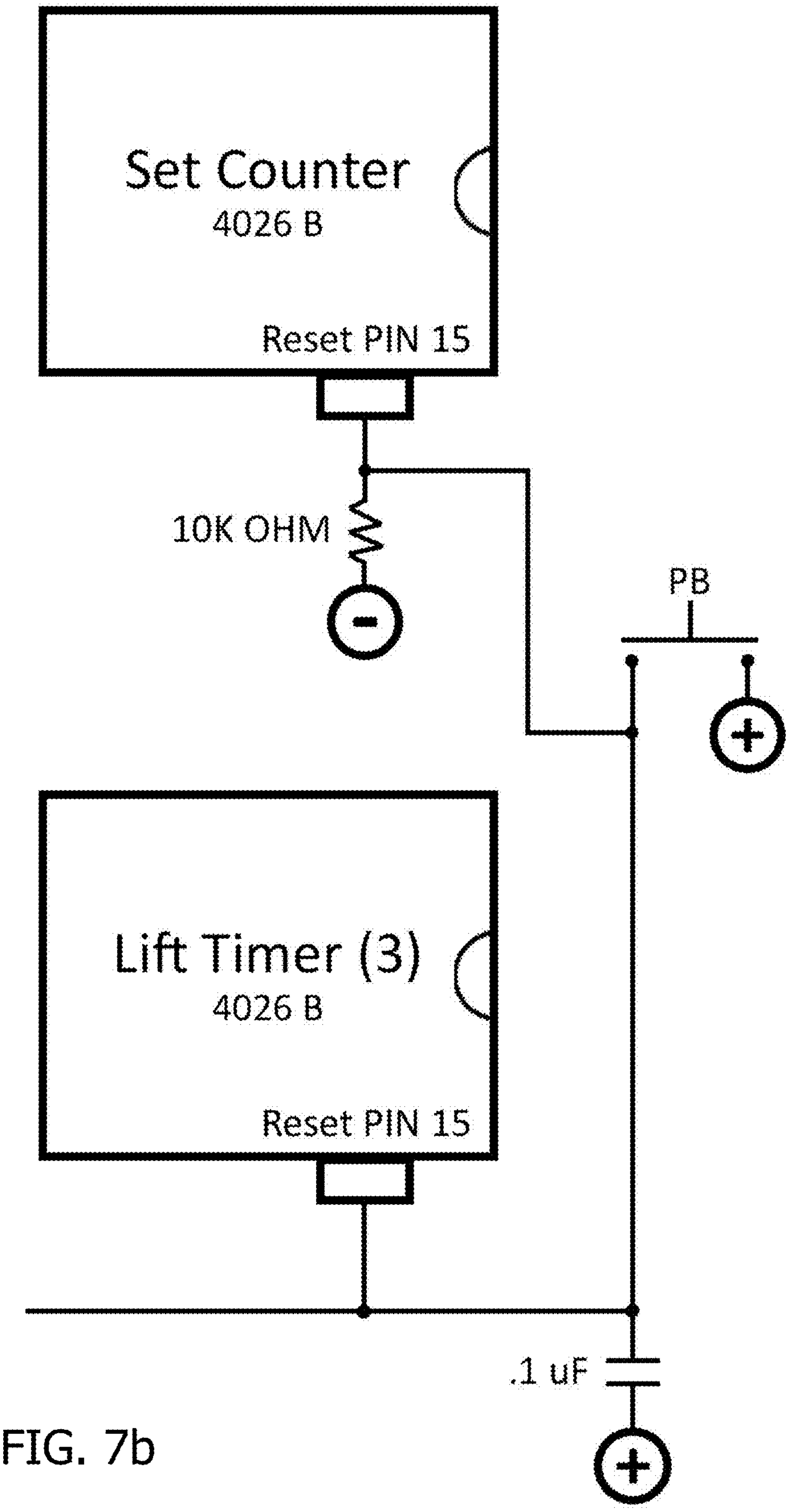
Figures 8, 8A, 8B:
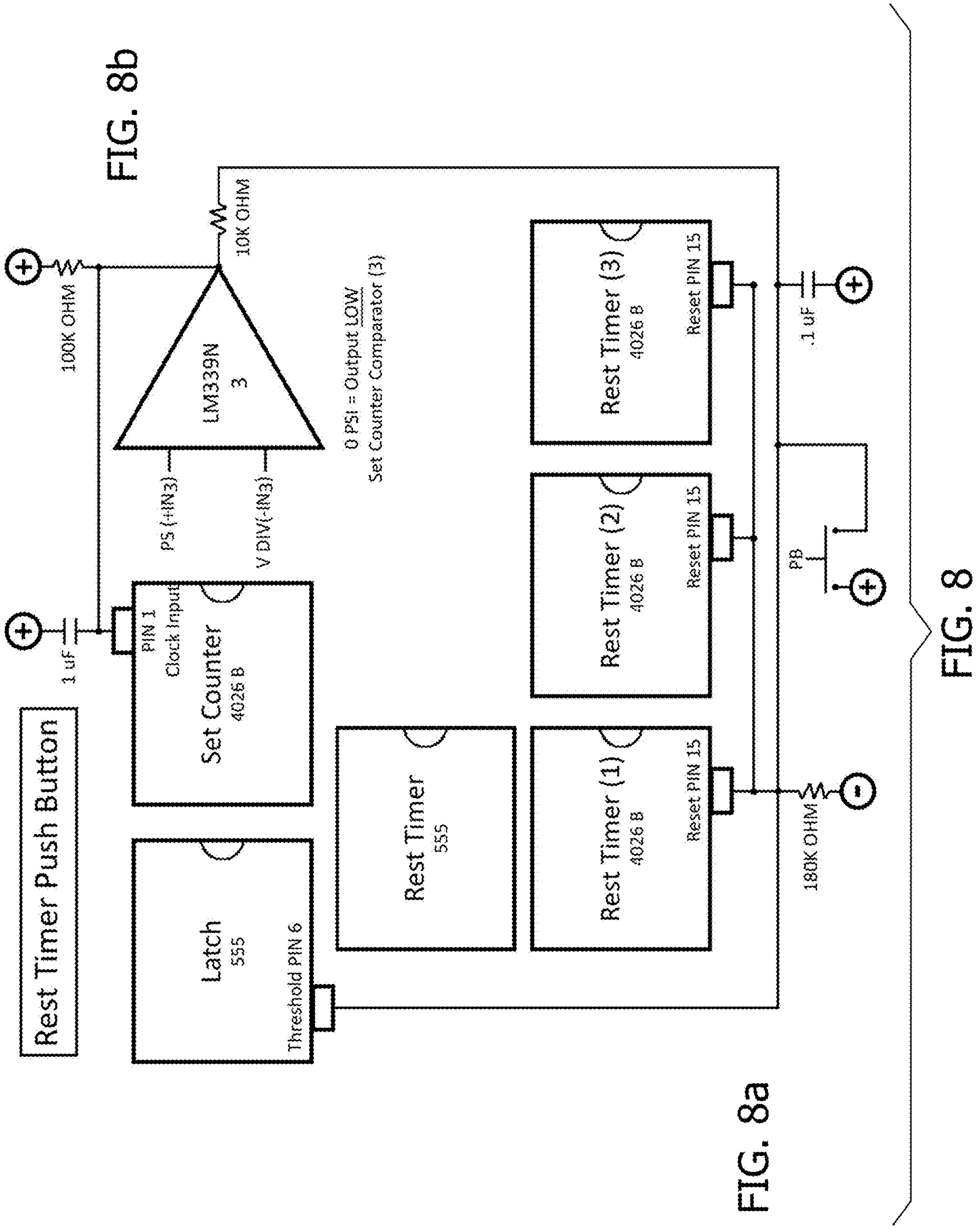
FIG. 8 is a schematic of an embodiment of the reset timer push button of the invention.
Figure 8A:
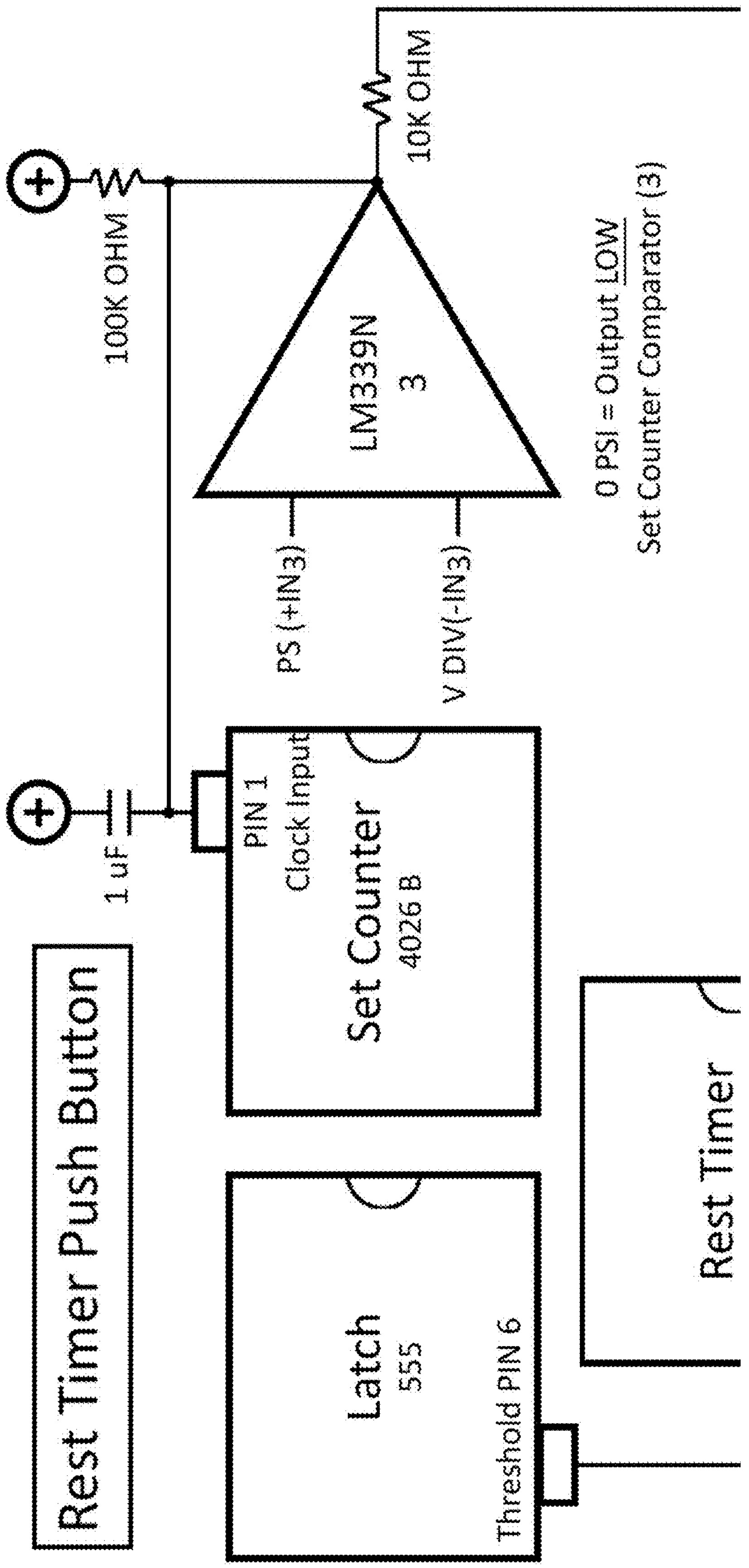
Figure 8B:
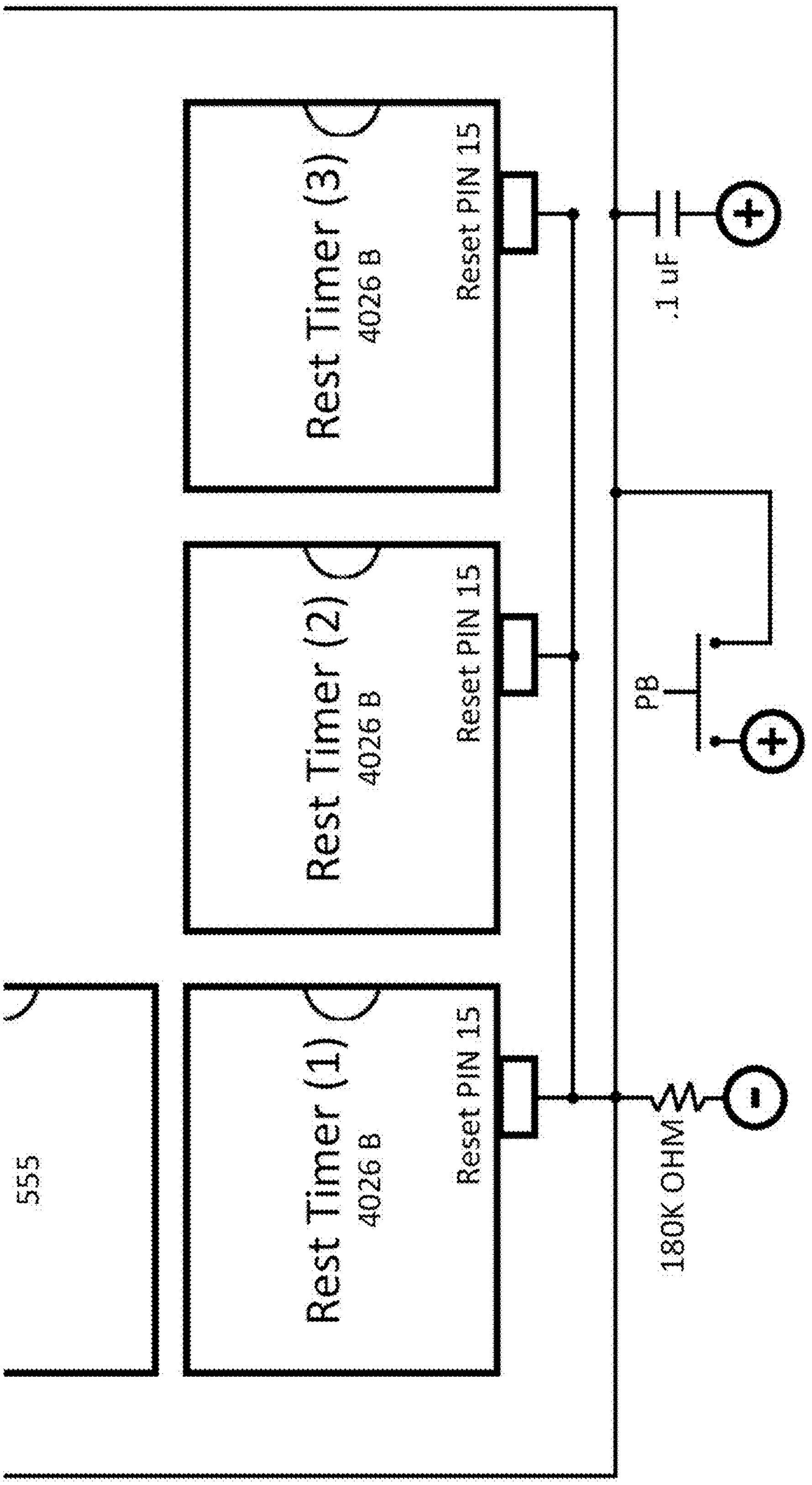
Figure 9:
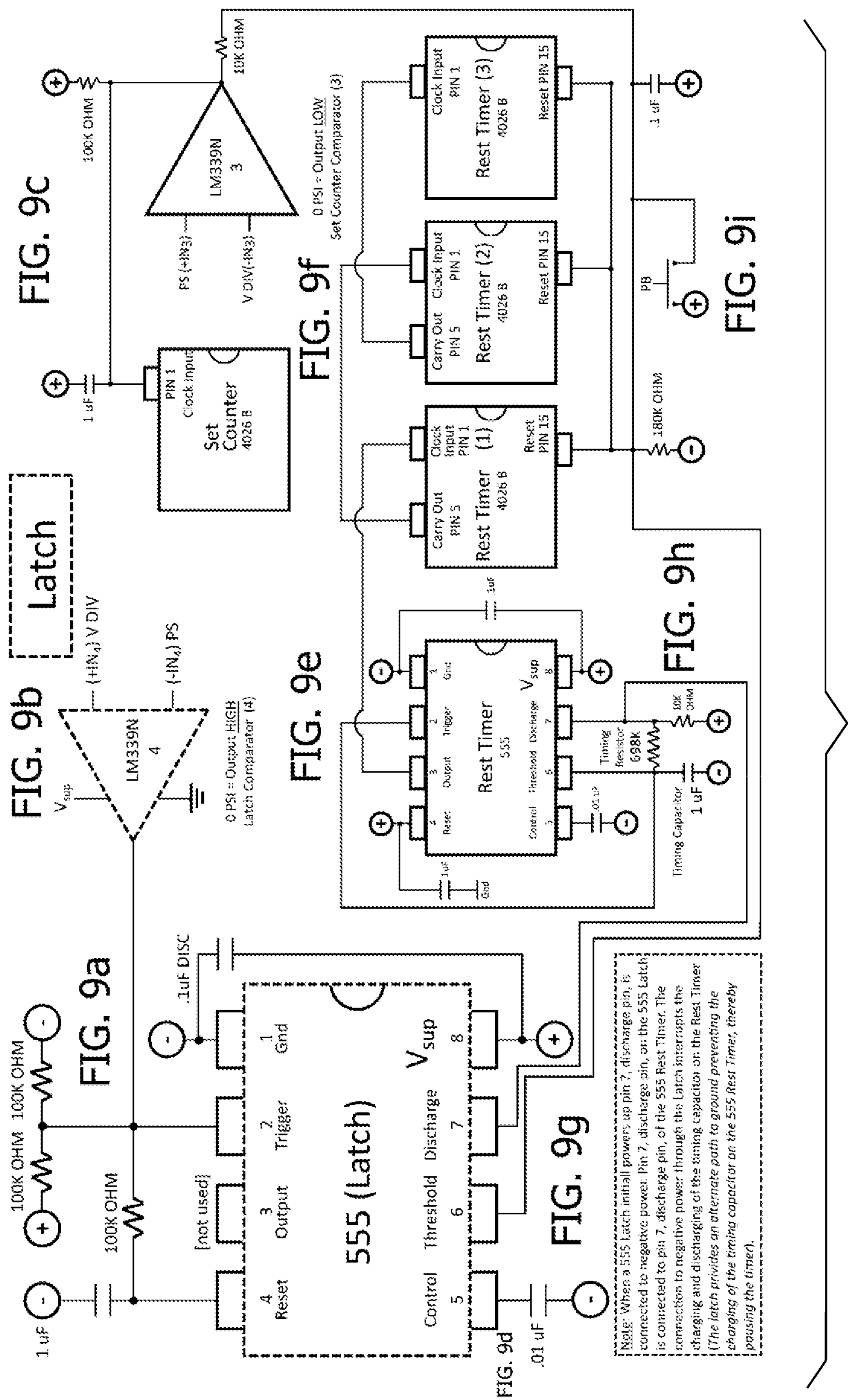
FIG. 9 is a schematic of an embodiment of the latch of the invention.
Figure 9A:
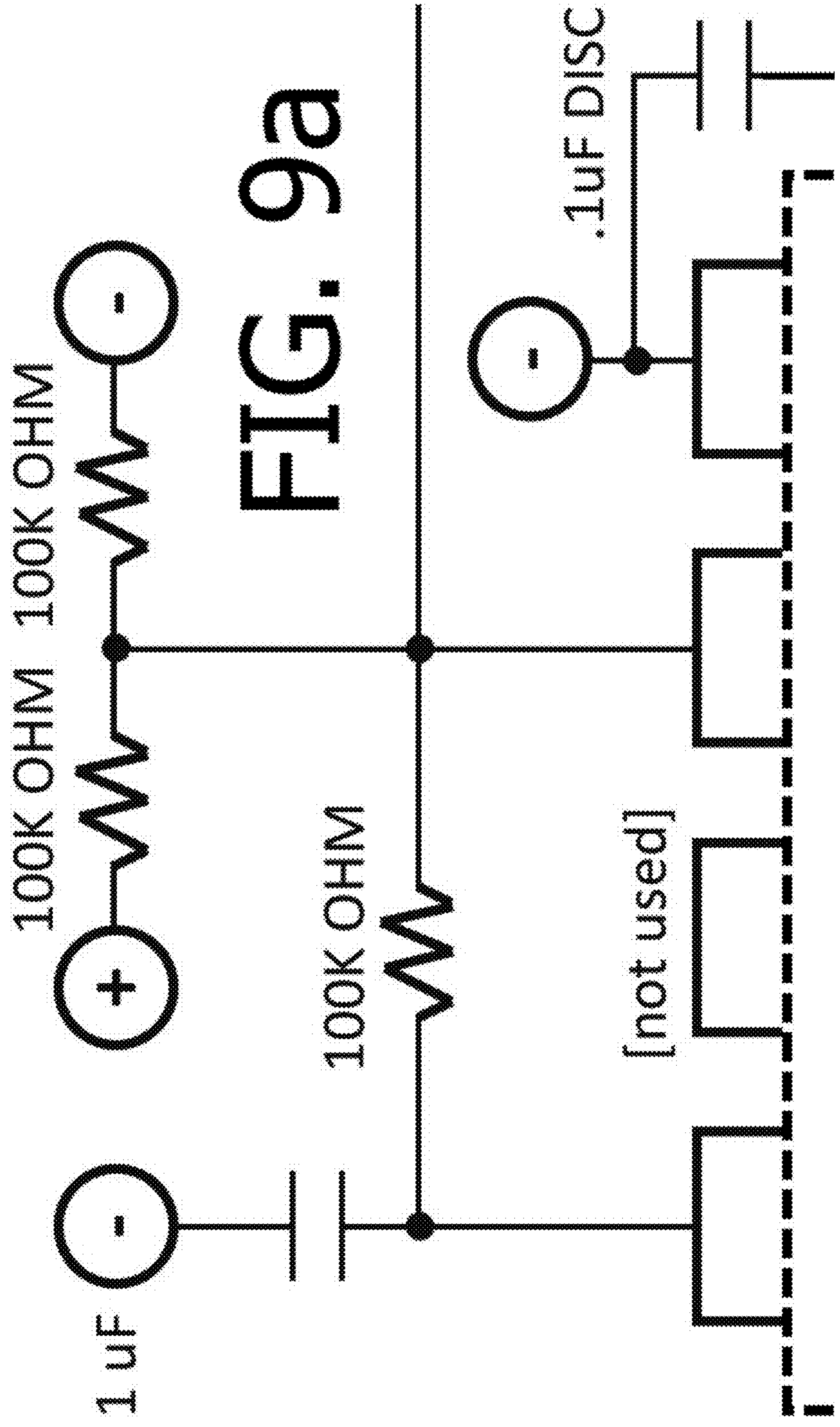
Figure 9B:
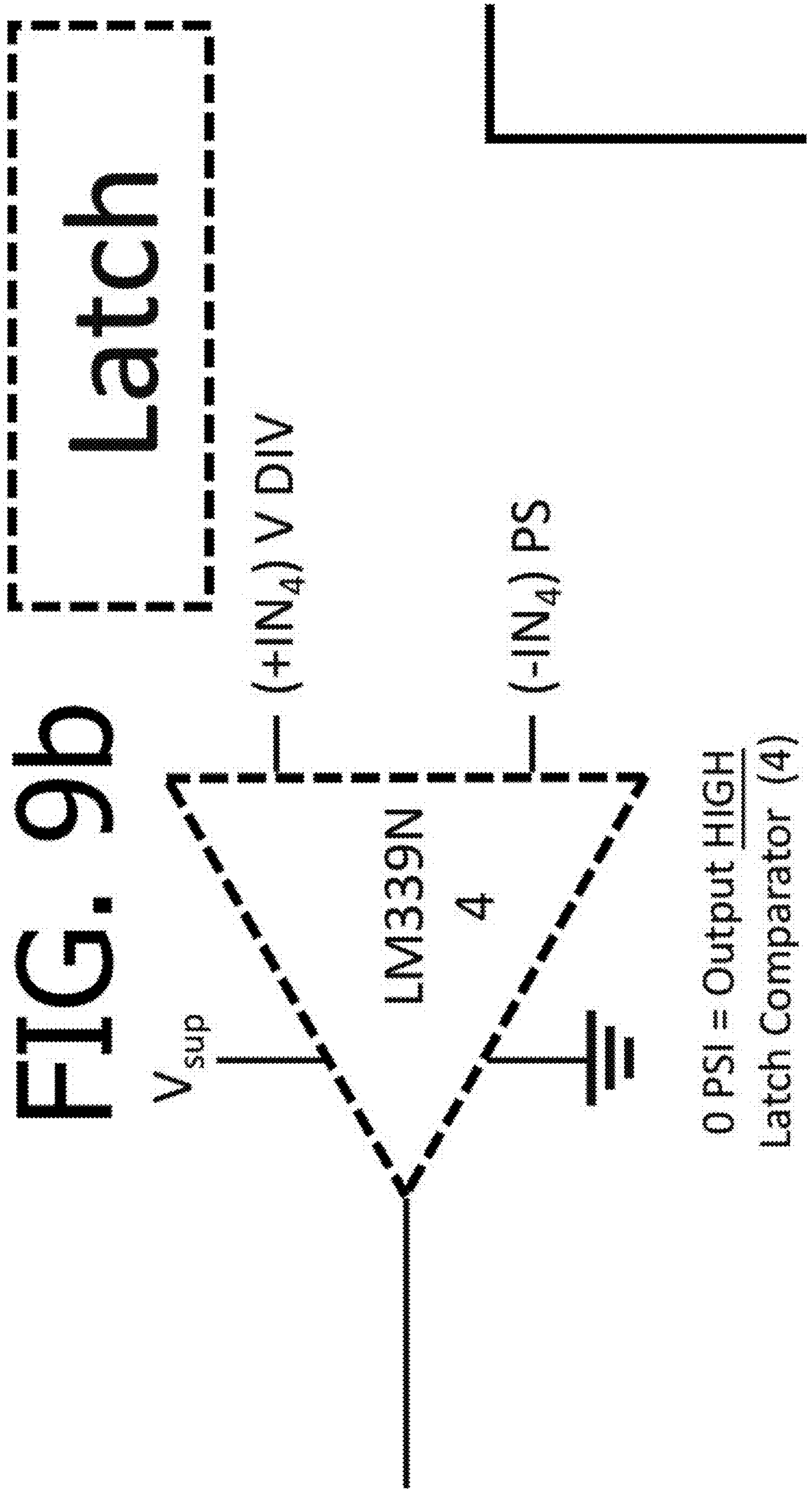
Figure 9C:
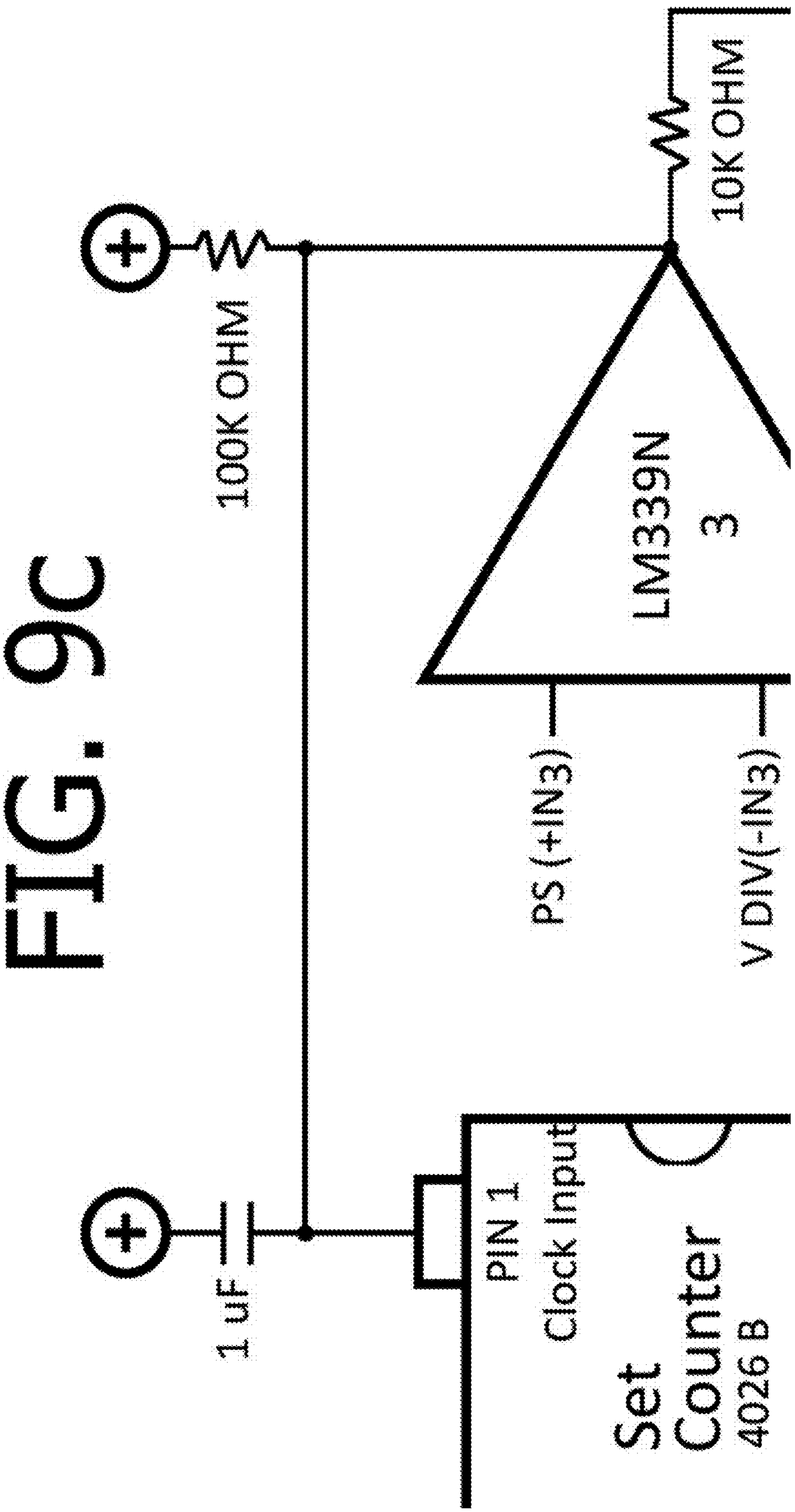
Figure 9D:
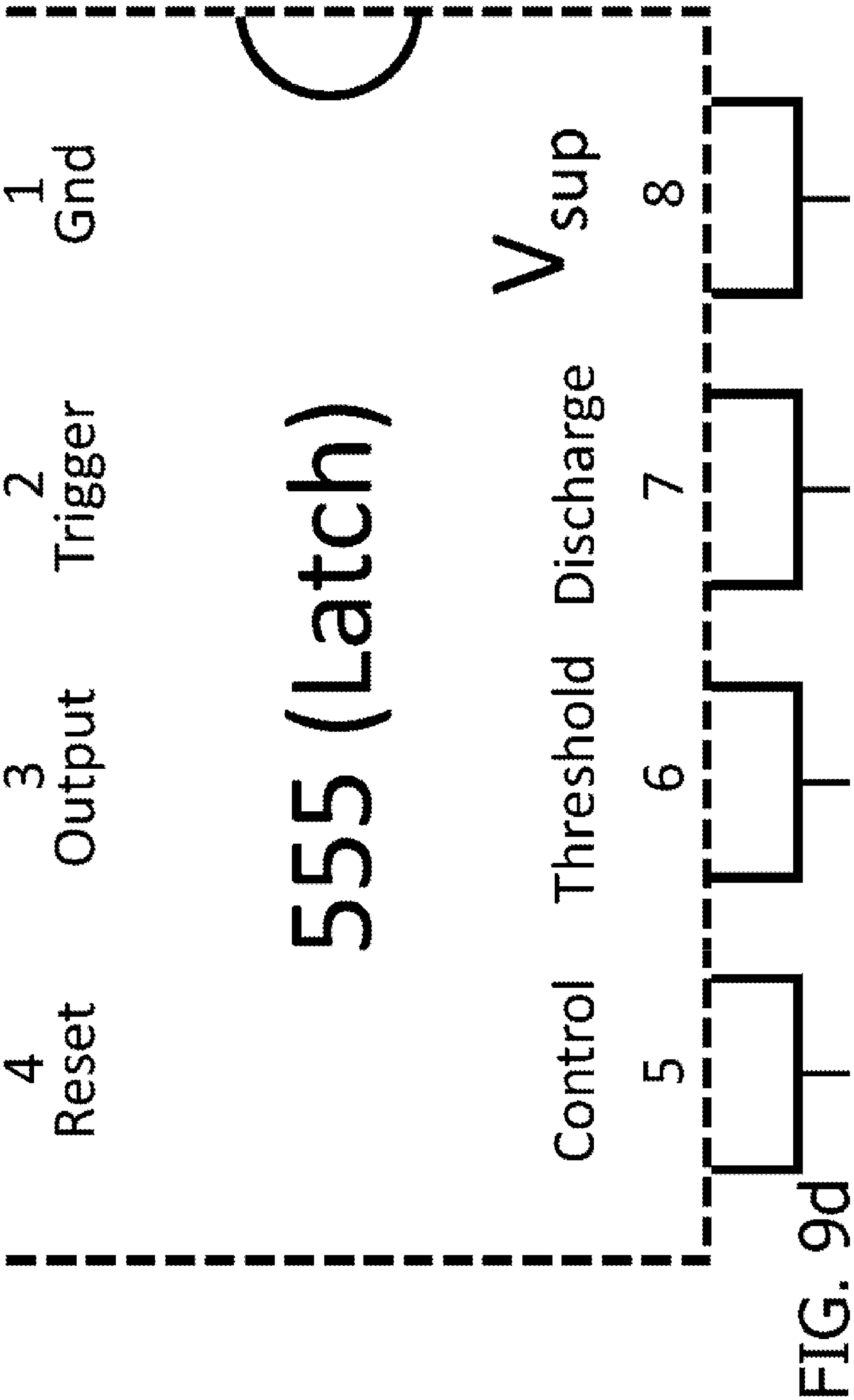
Figure 9E:
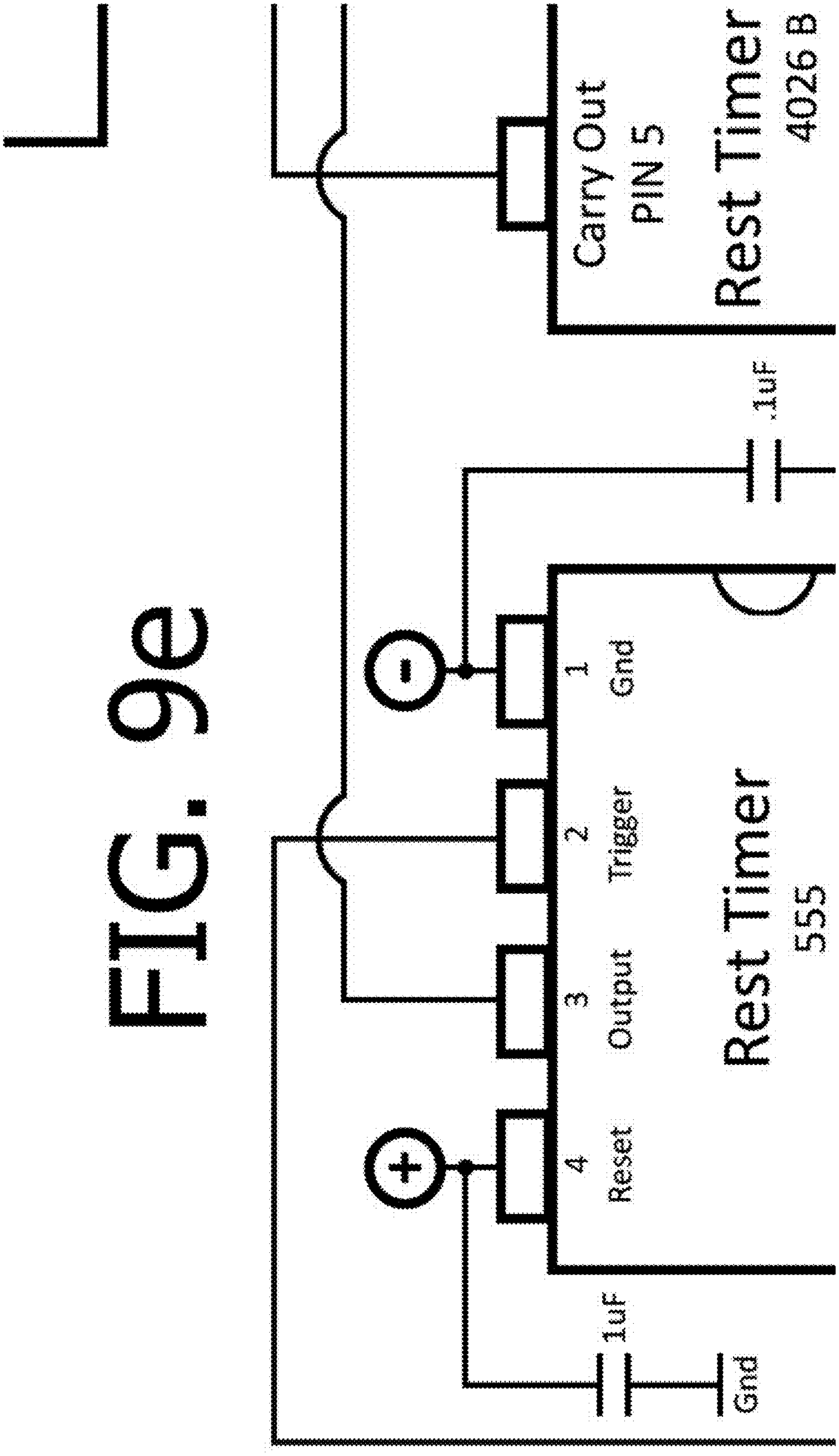
Figure 9F:
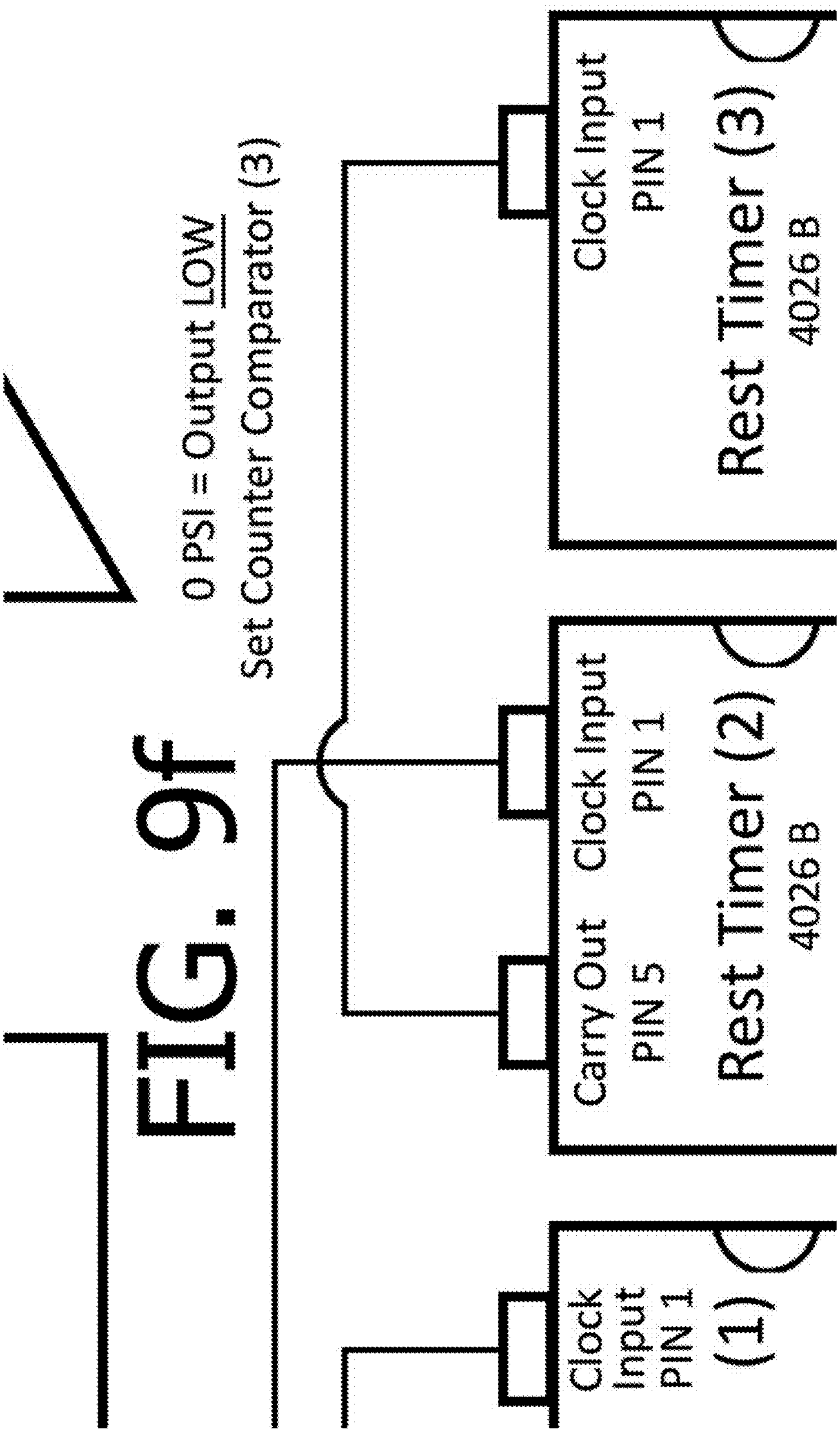
Figure 9H:
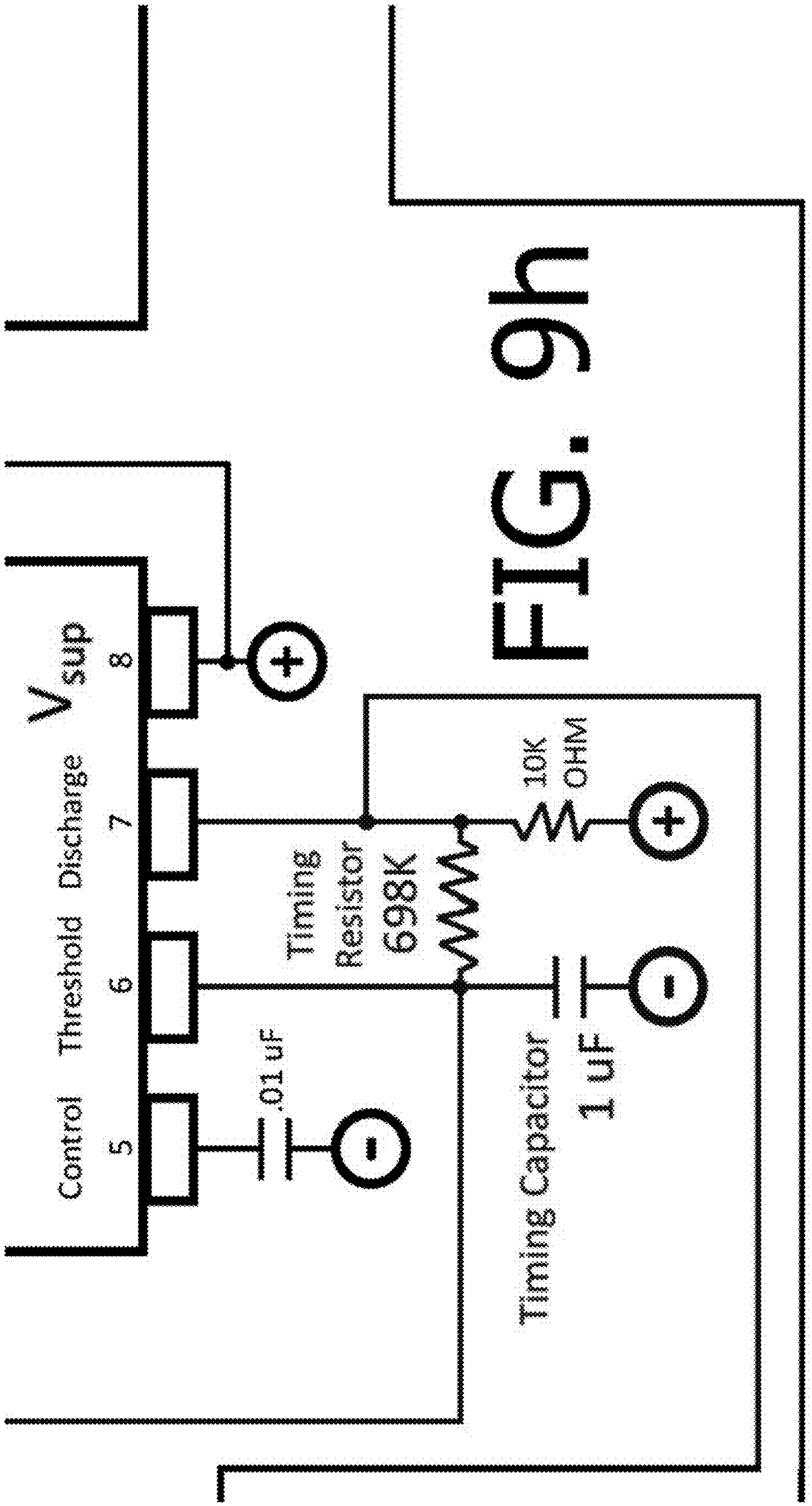
Figure 9I:
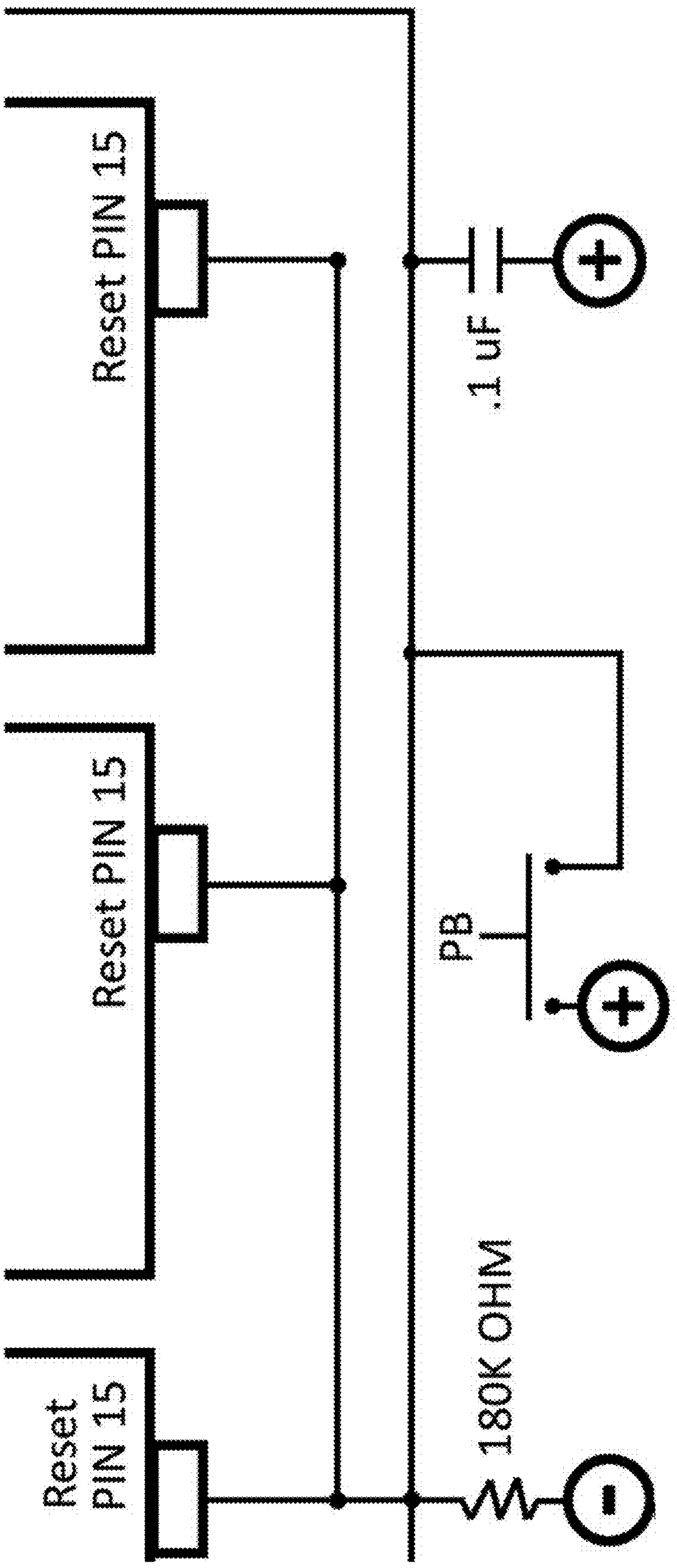
Figure 10:
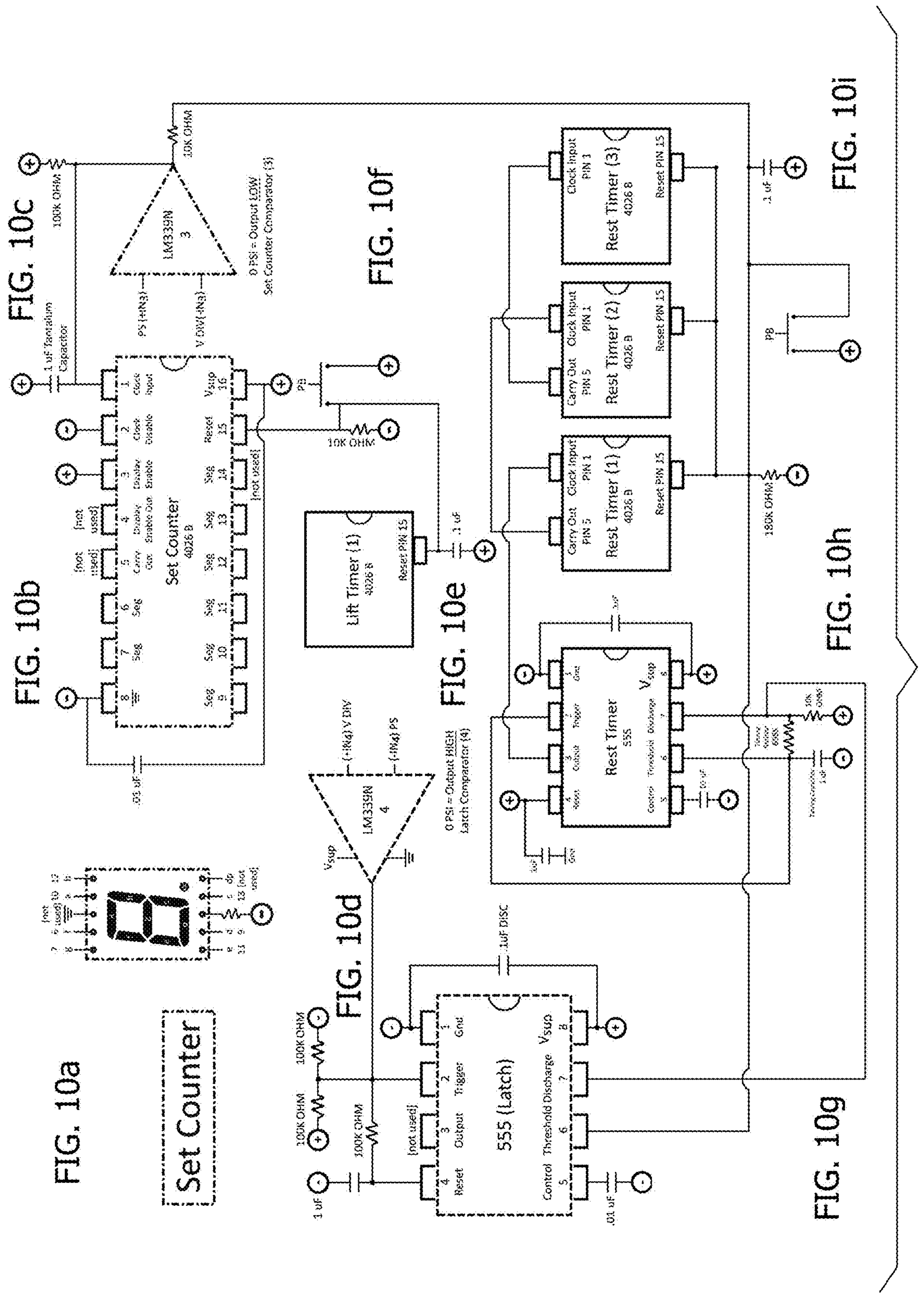
FIG. 10 is a schematic of an embodiment of the set counter of the invention.
Figure 10A:
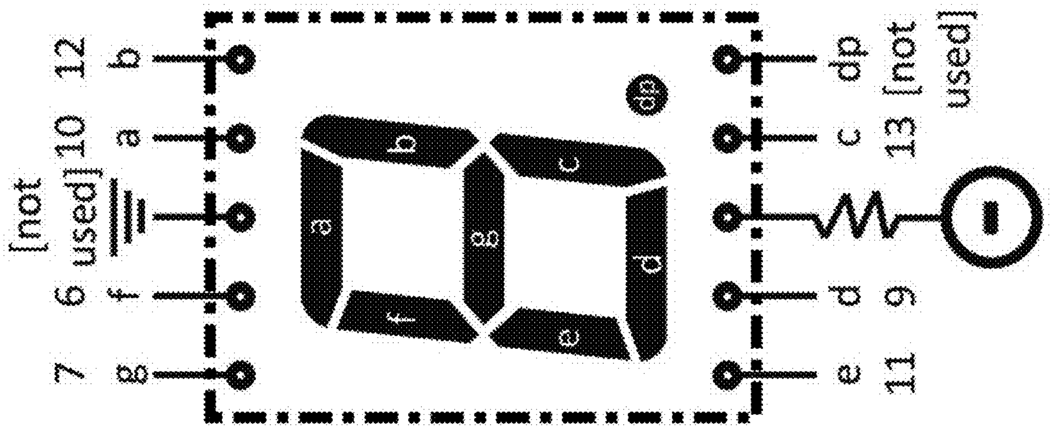
Figure 10A:
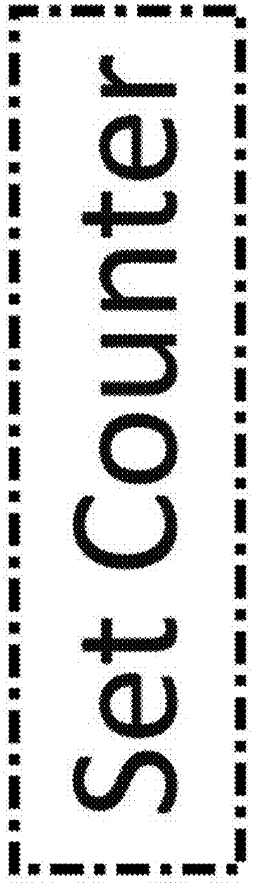
Figure 10B:
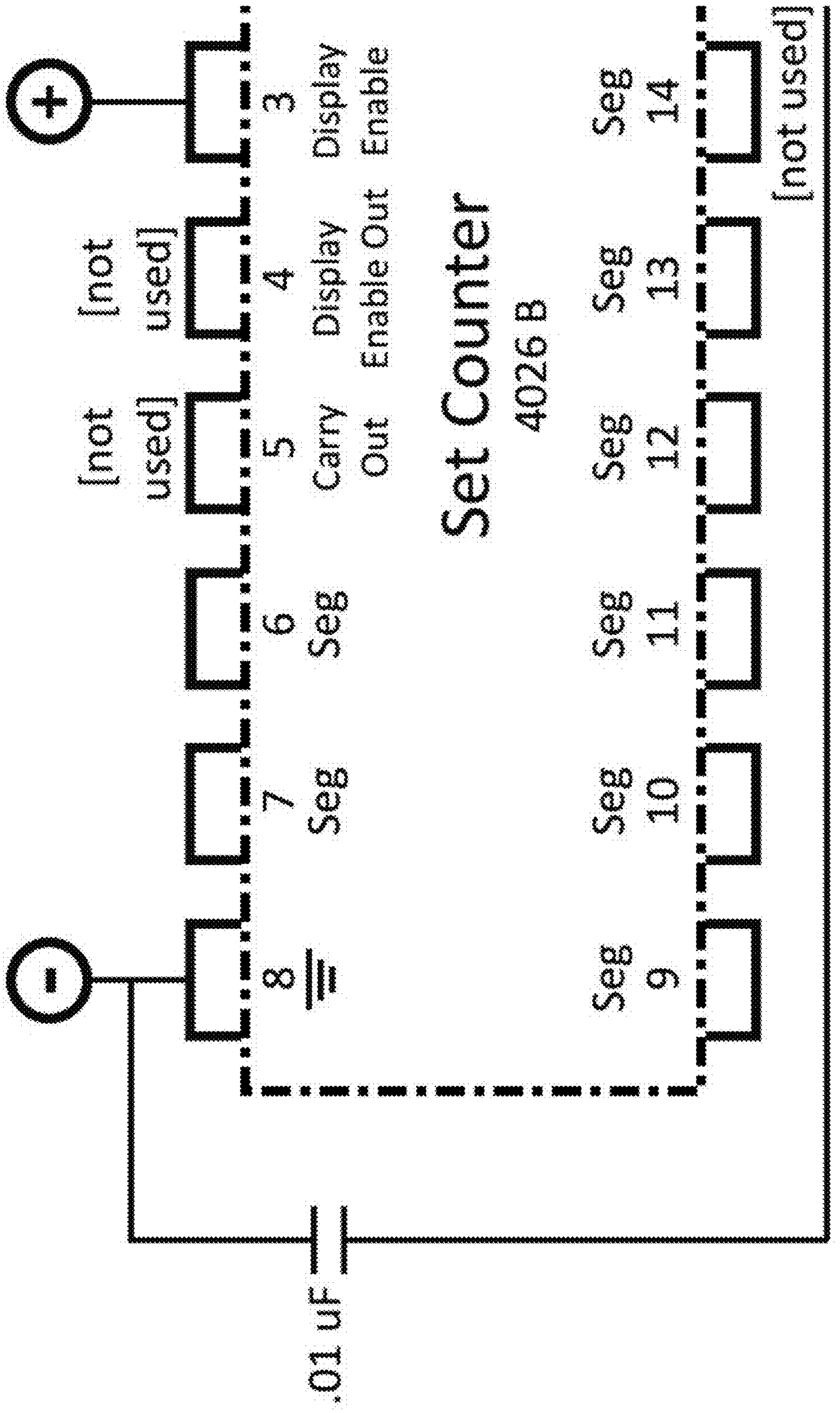
Figure 10C:
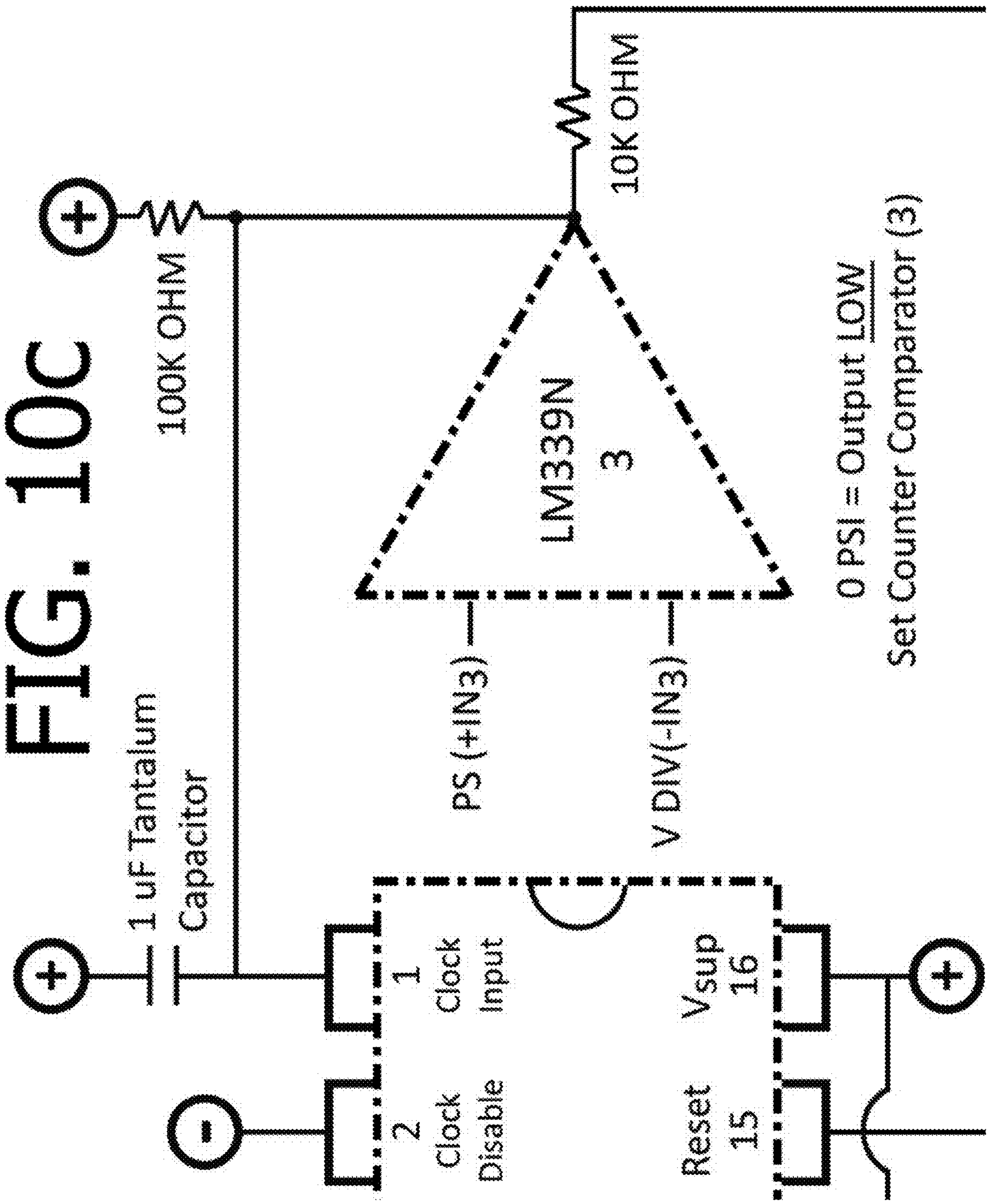
Figure 10D:
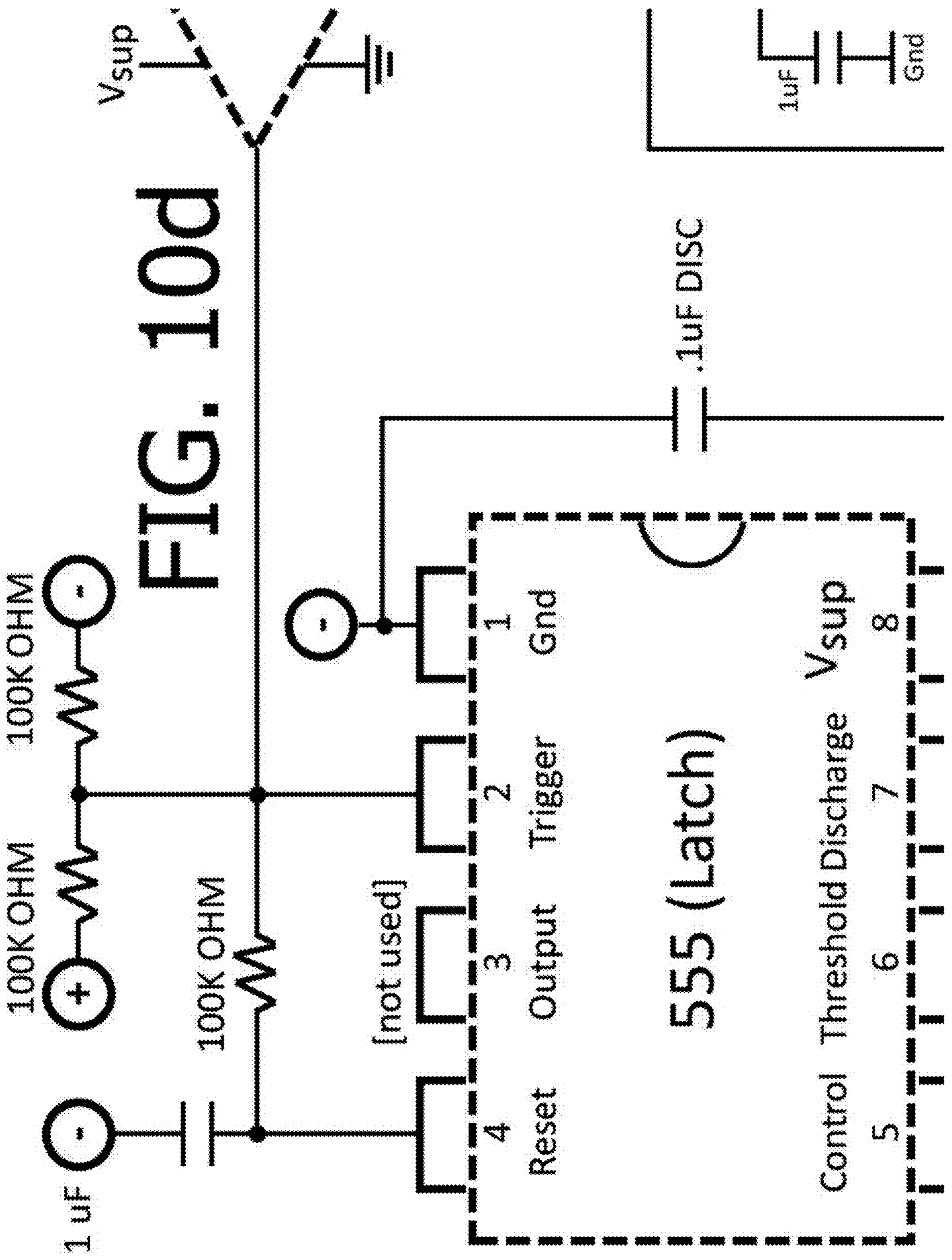
Figure 10E:
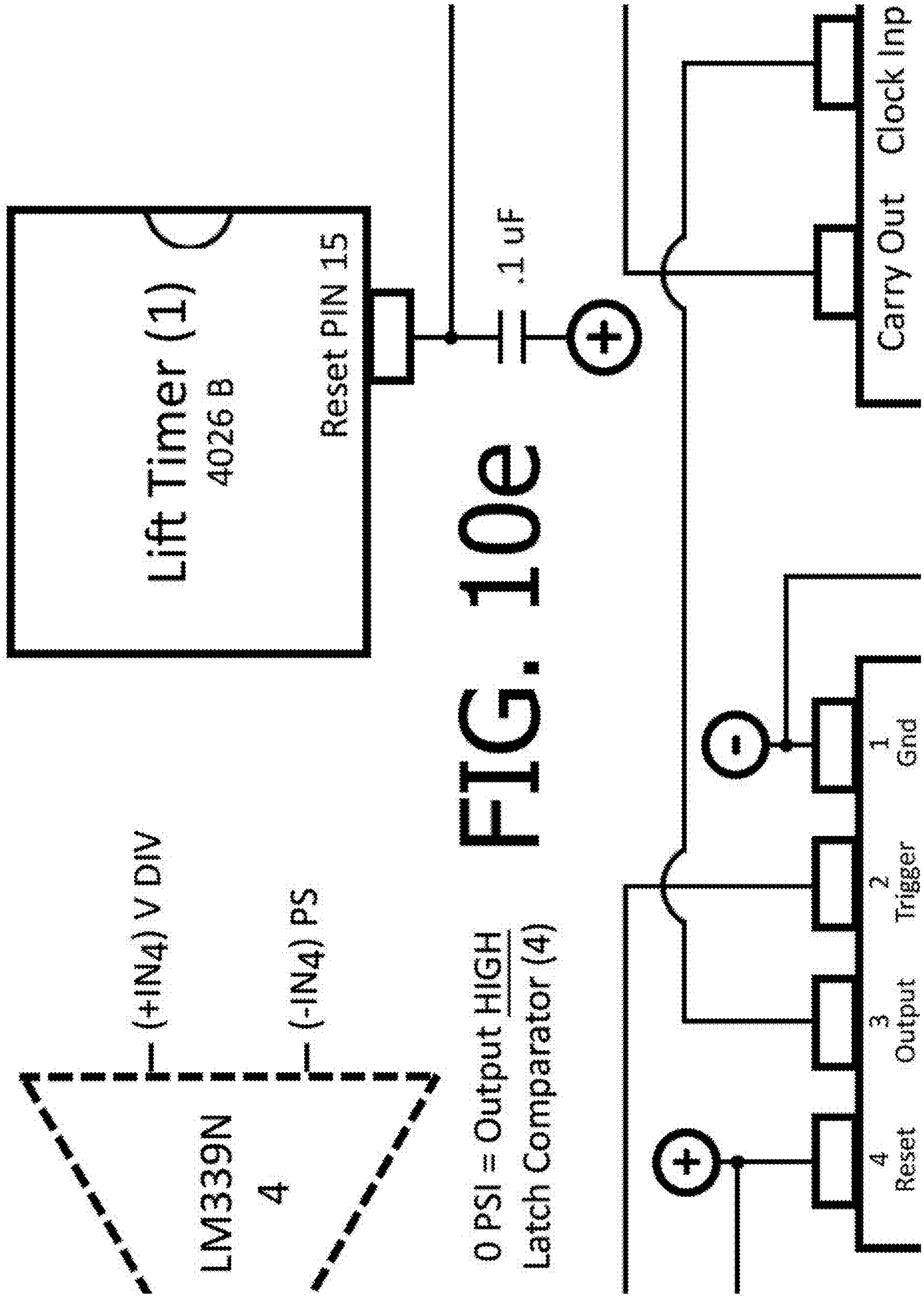
Figure 10F:
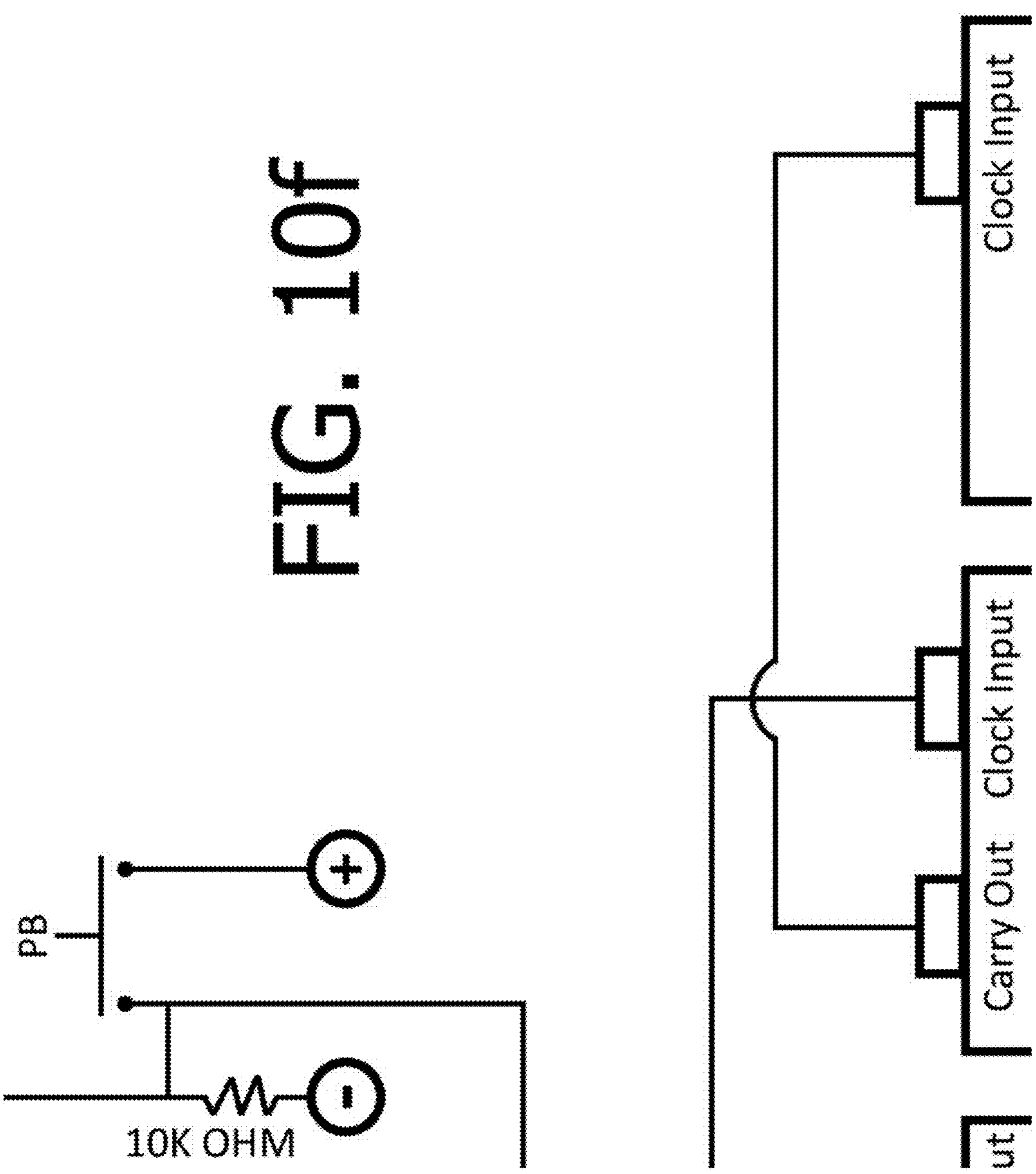
Figure 10G:
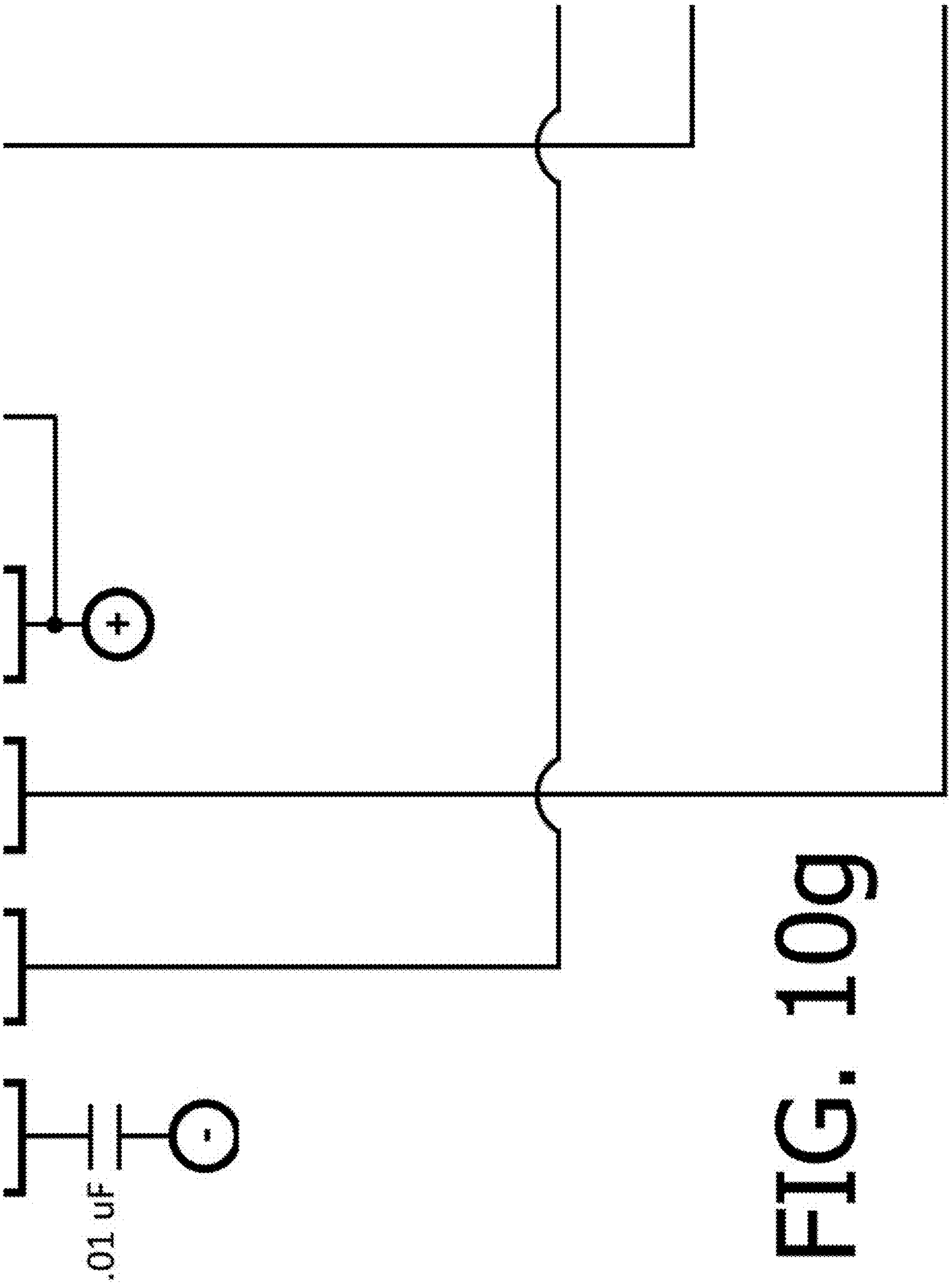
Figure 10H:
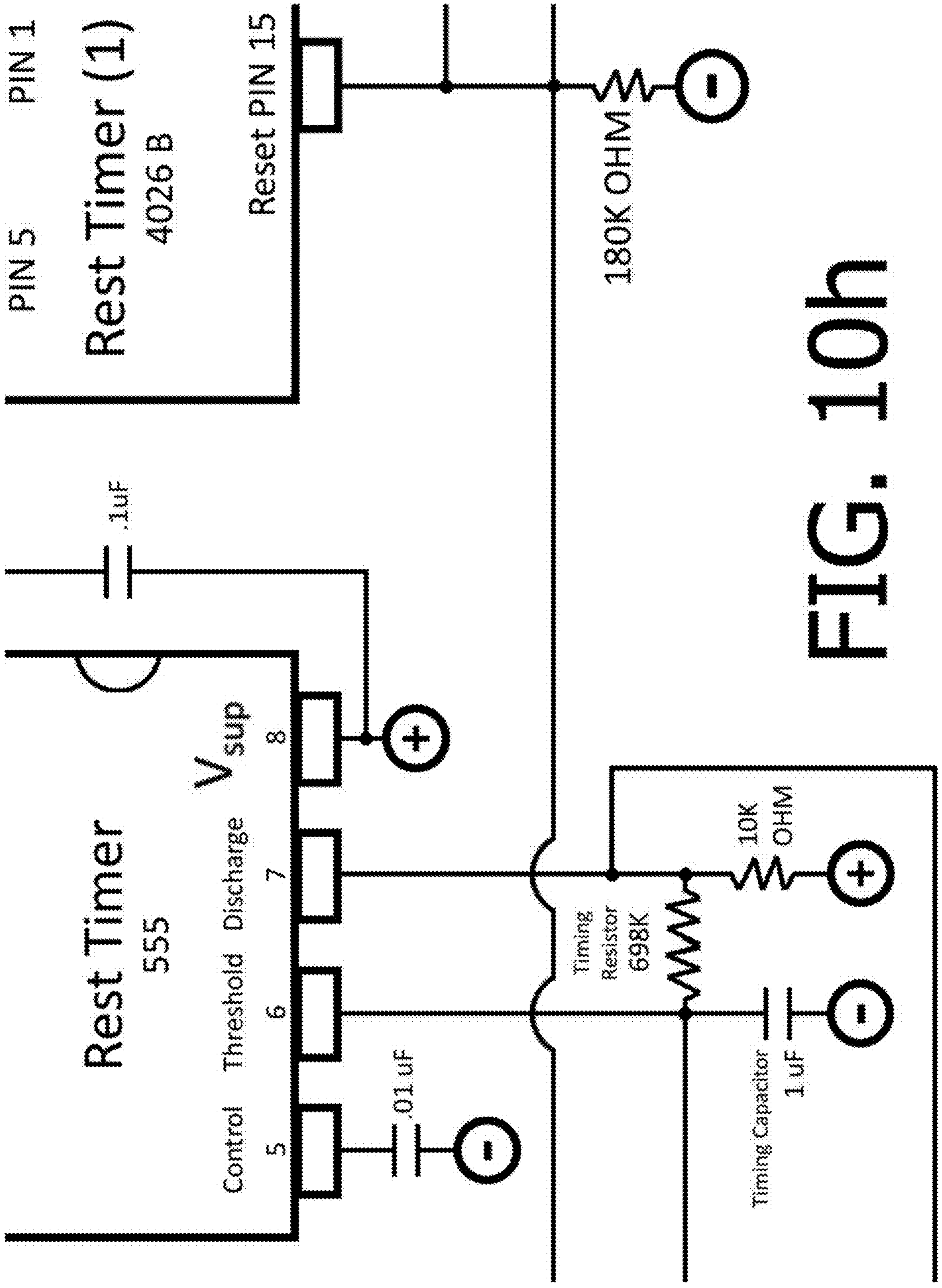
Figure 10I:
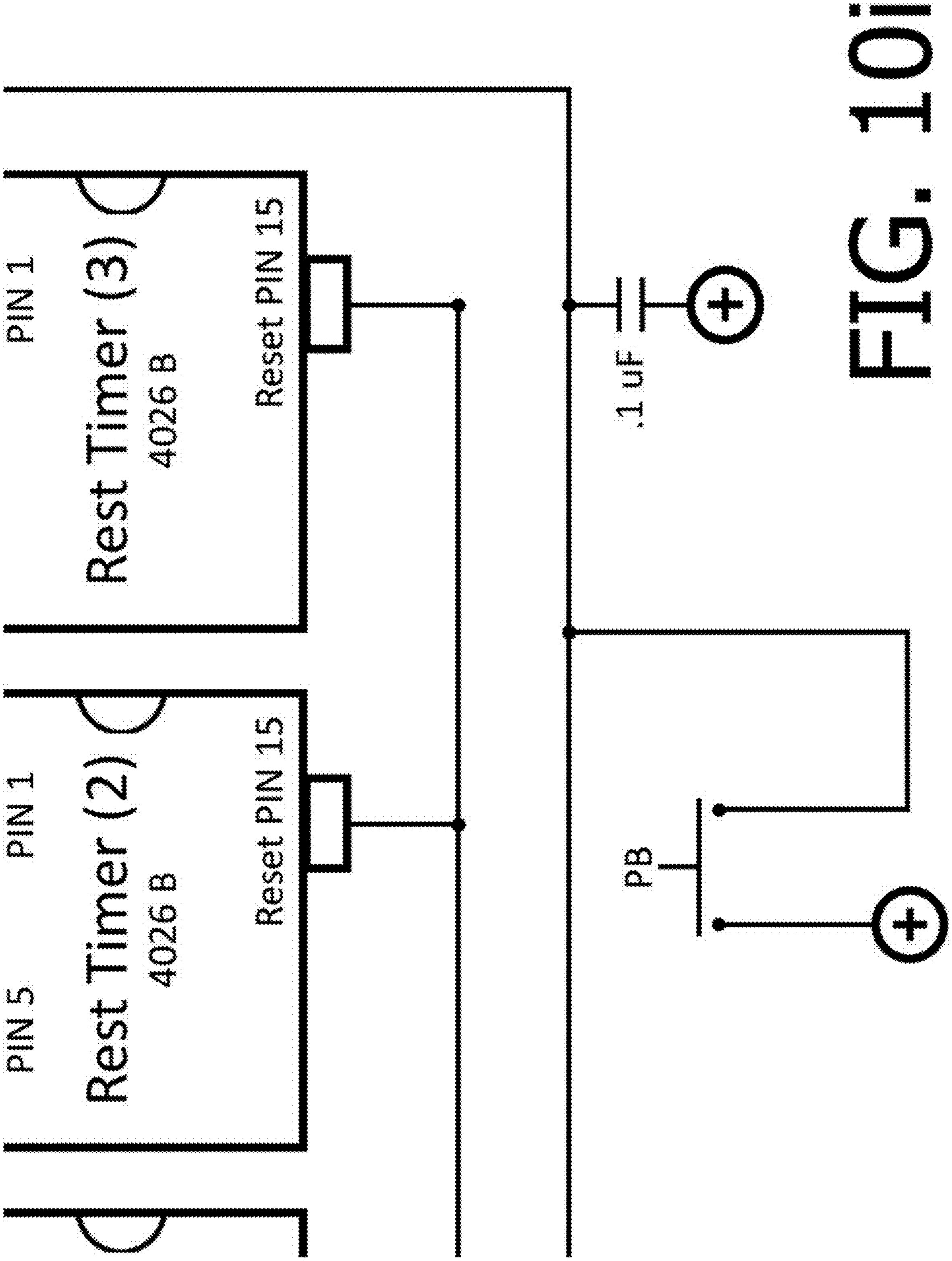
Figure 11:
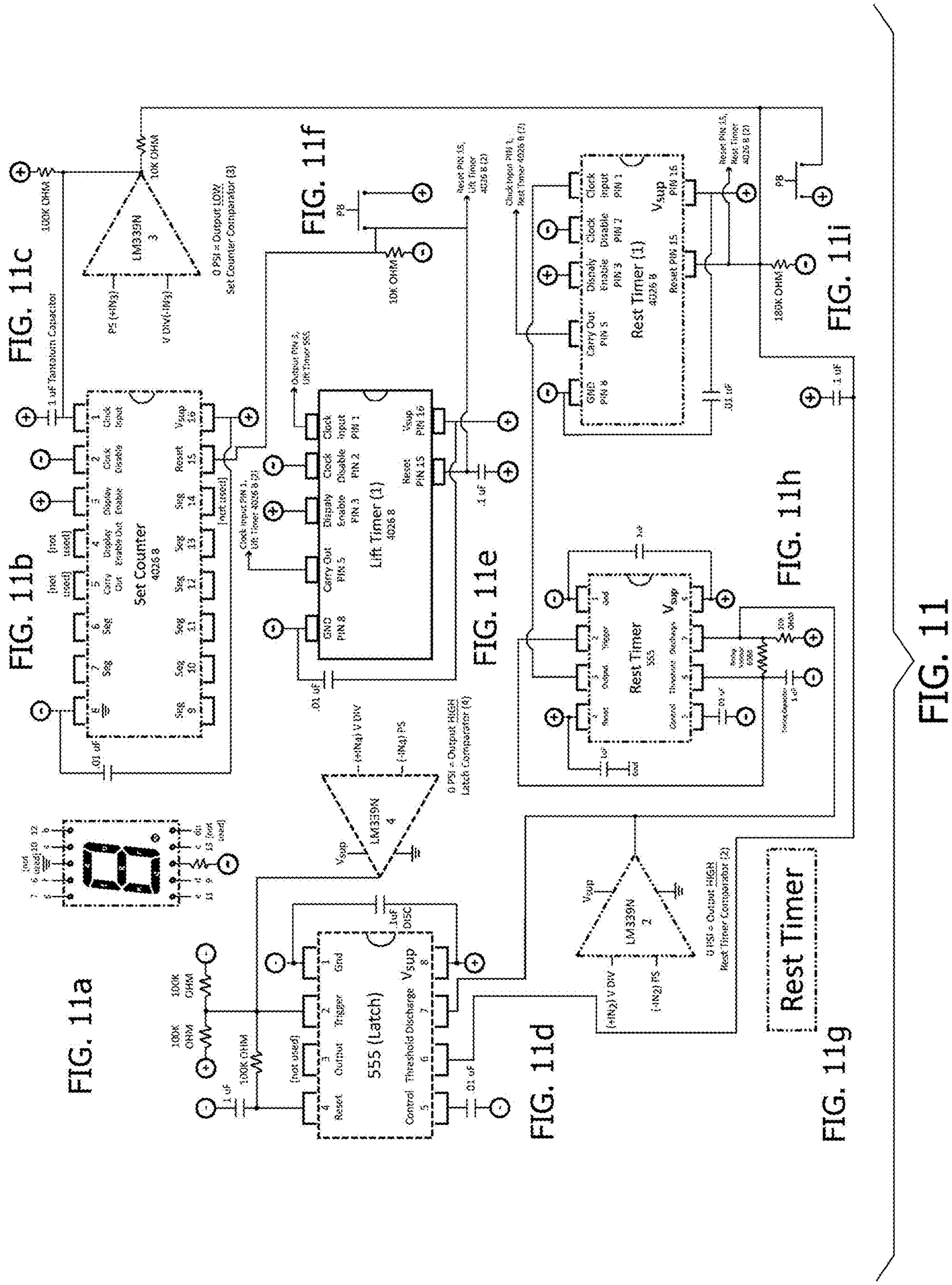
FIG. 11 is a schematic of the rest timer of the invention.
Figure 11A:
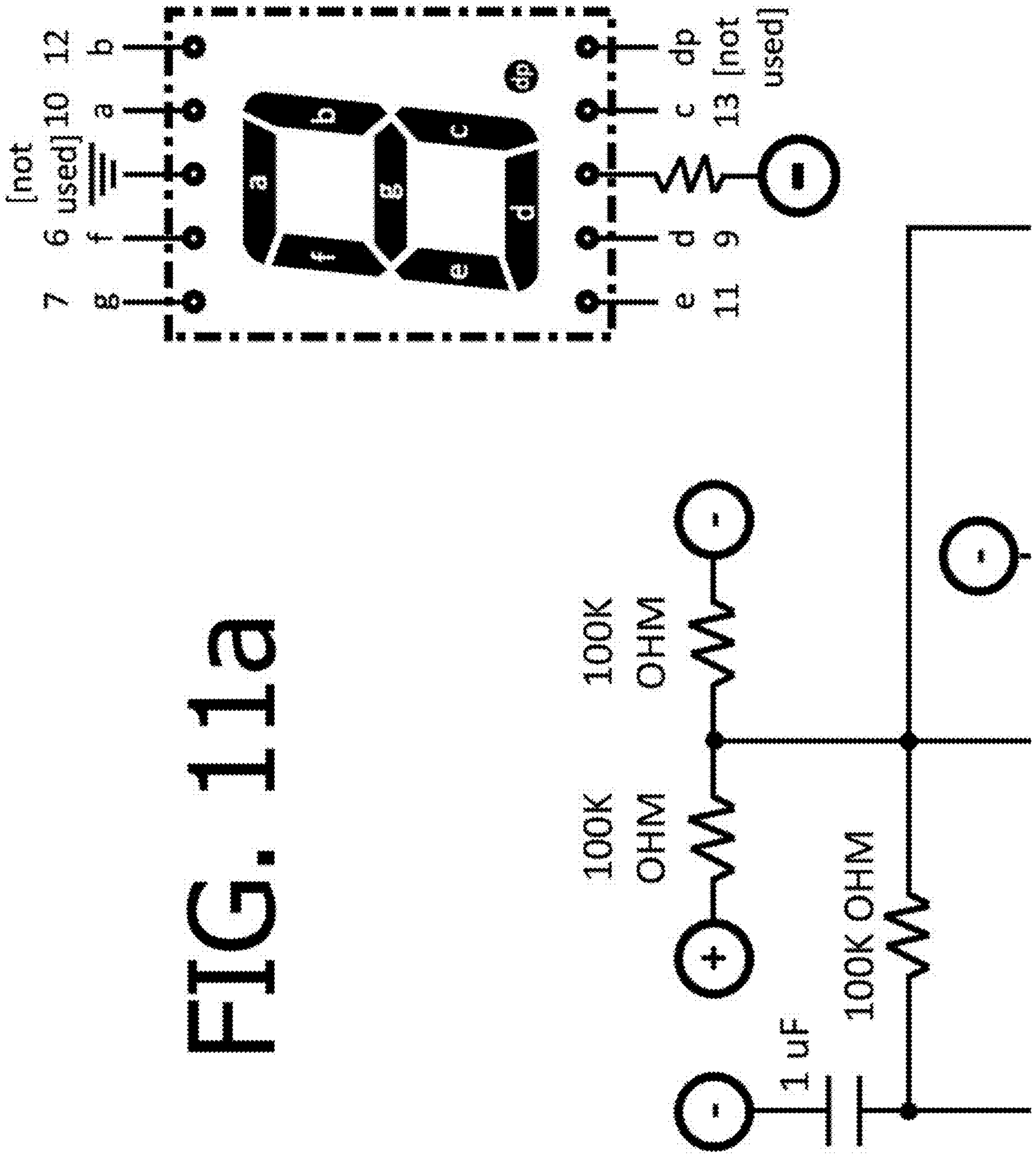
Figure 11B:
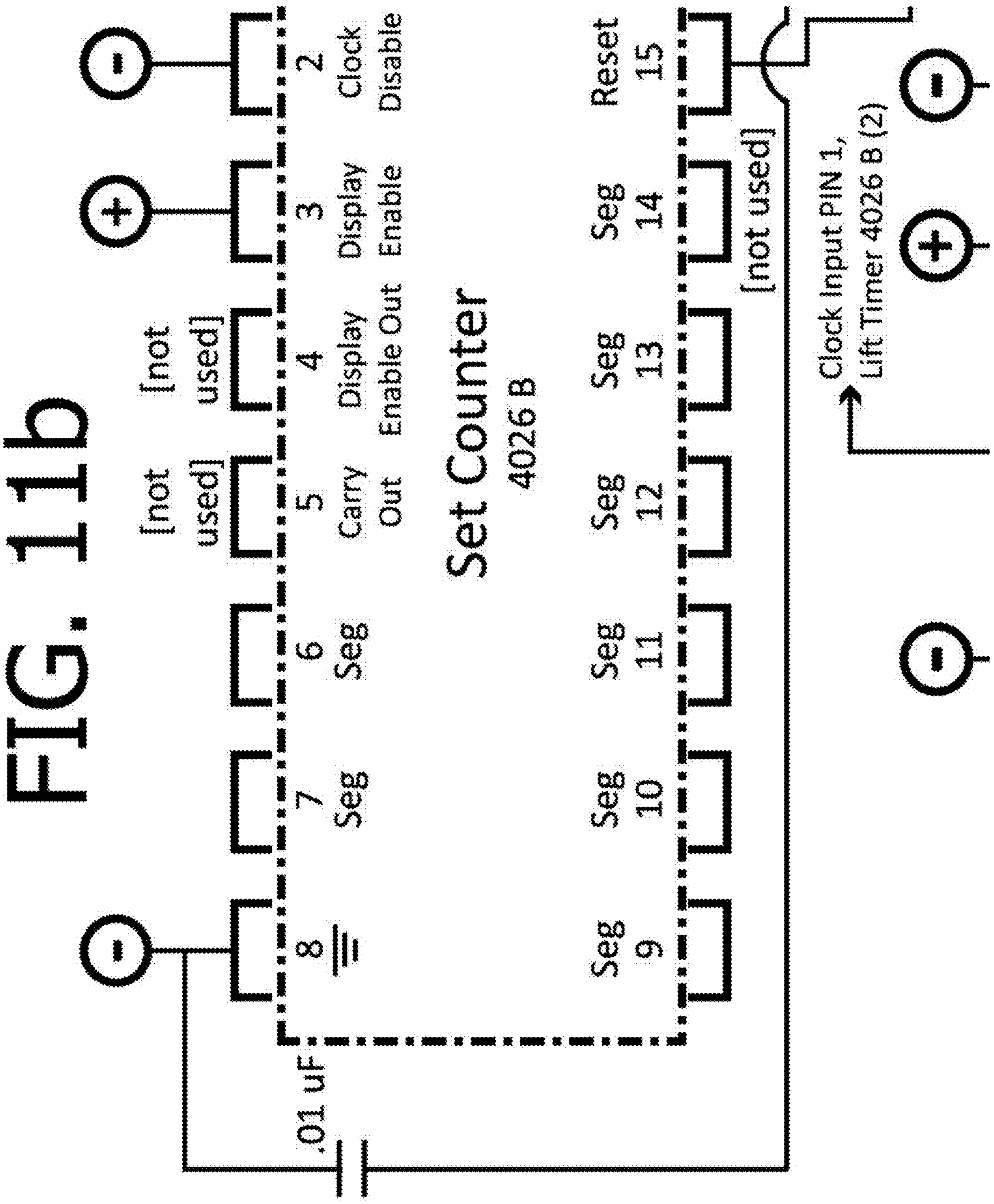
Figure 11C:
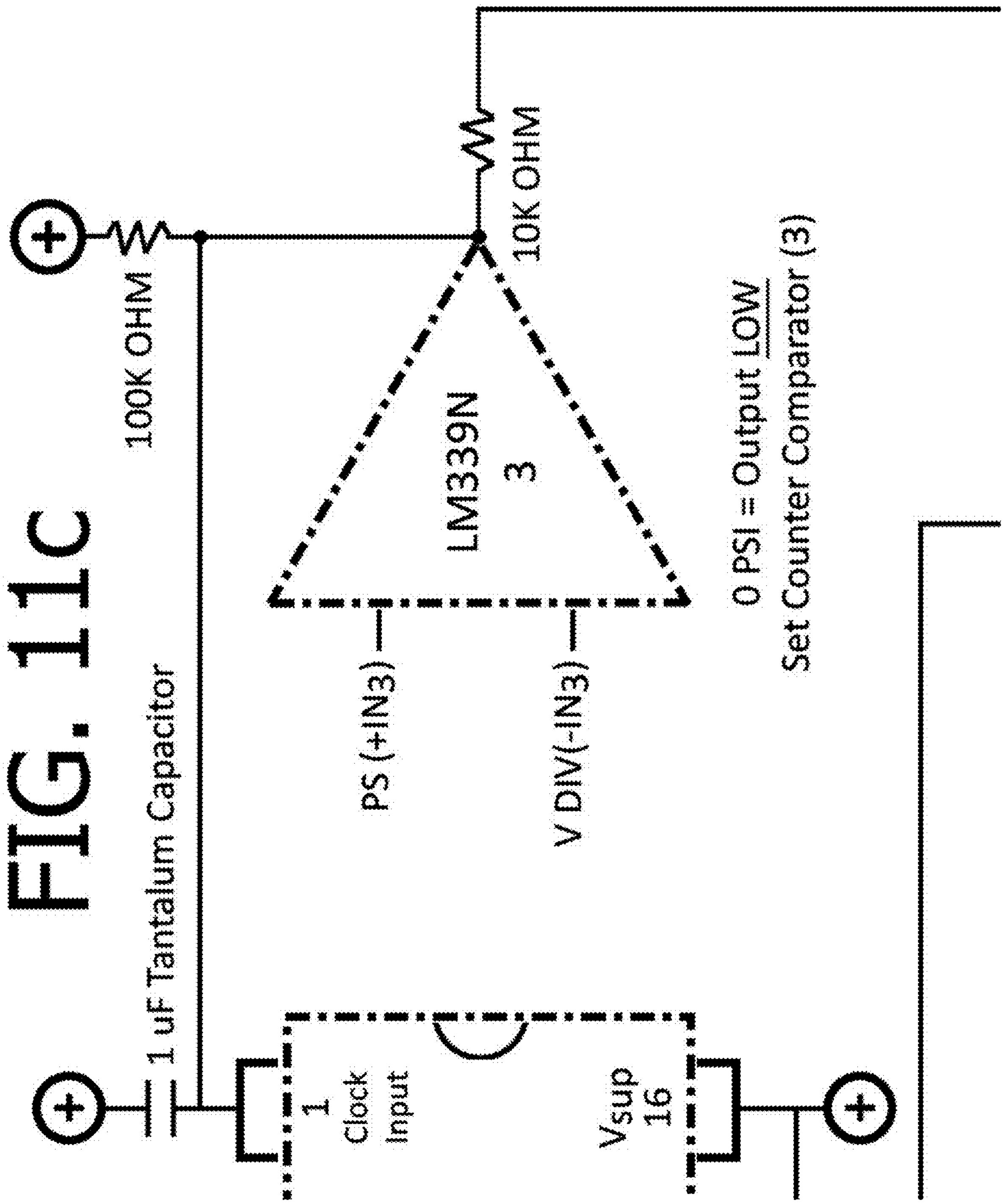
Figure 11D:
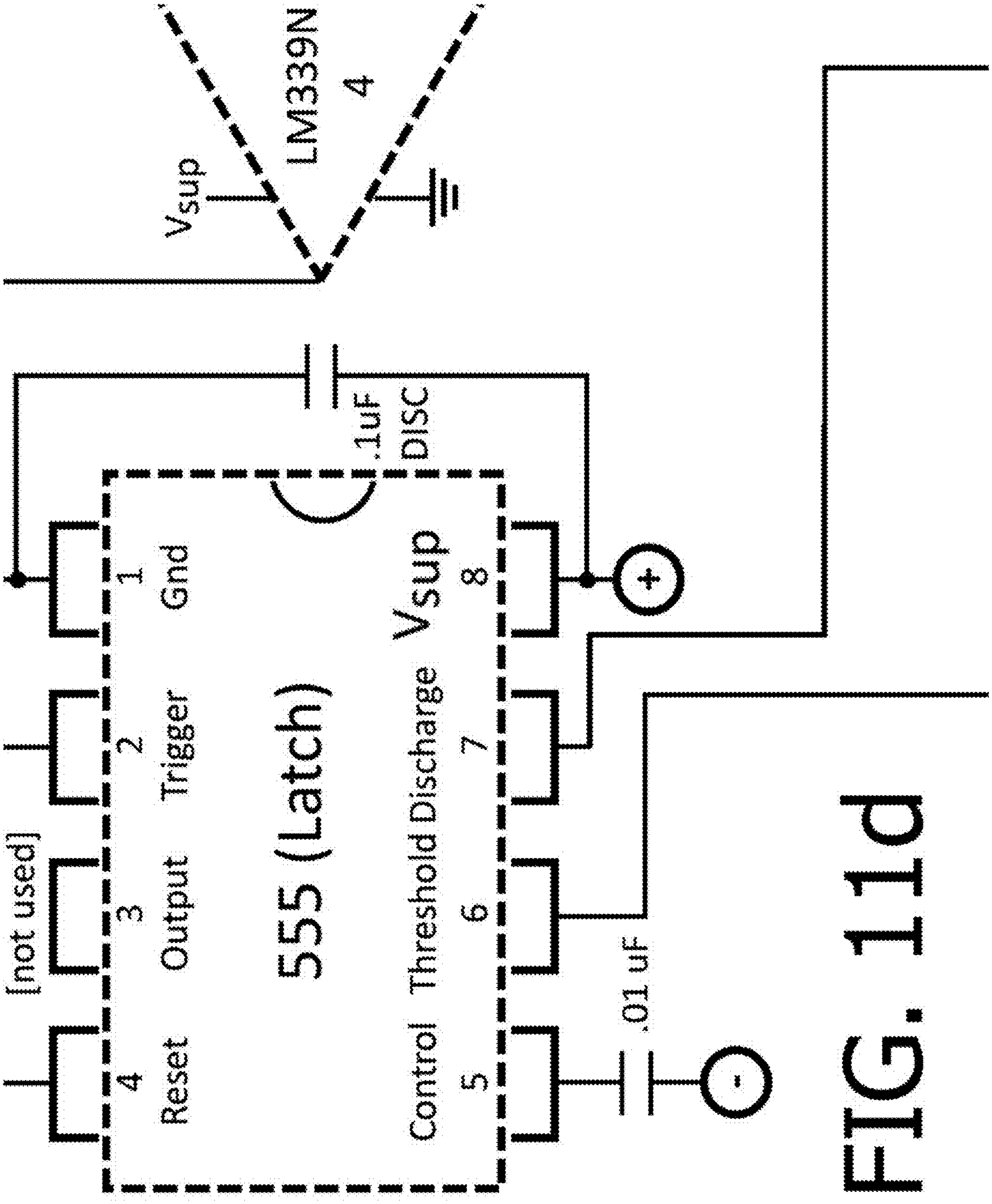
Figure 11E:
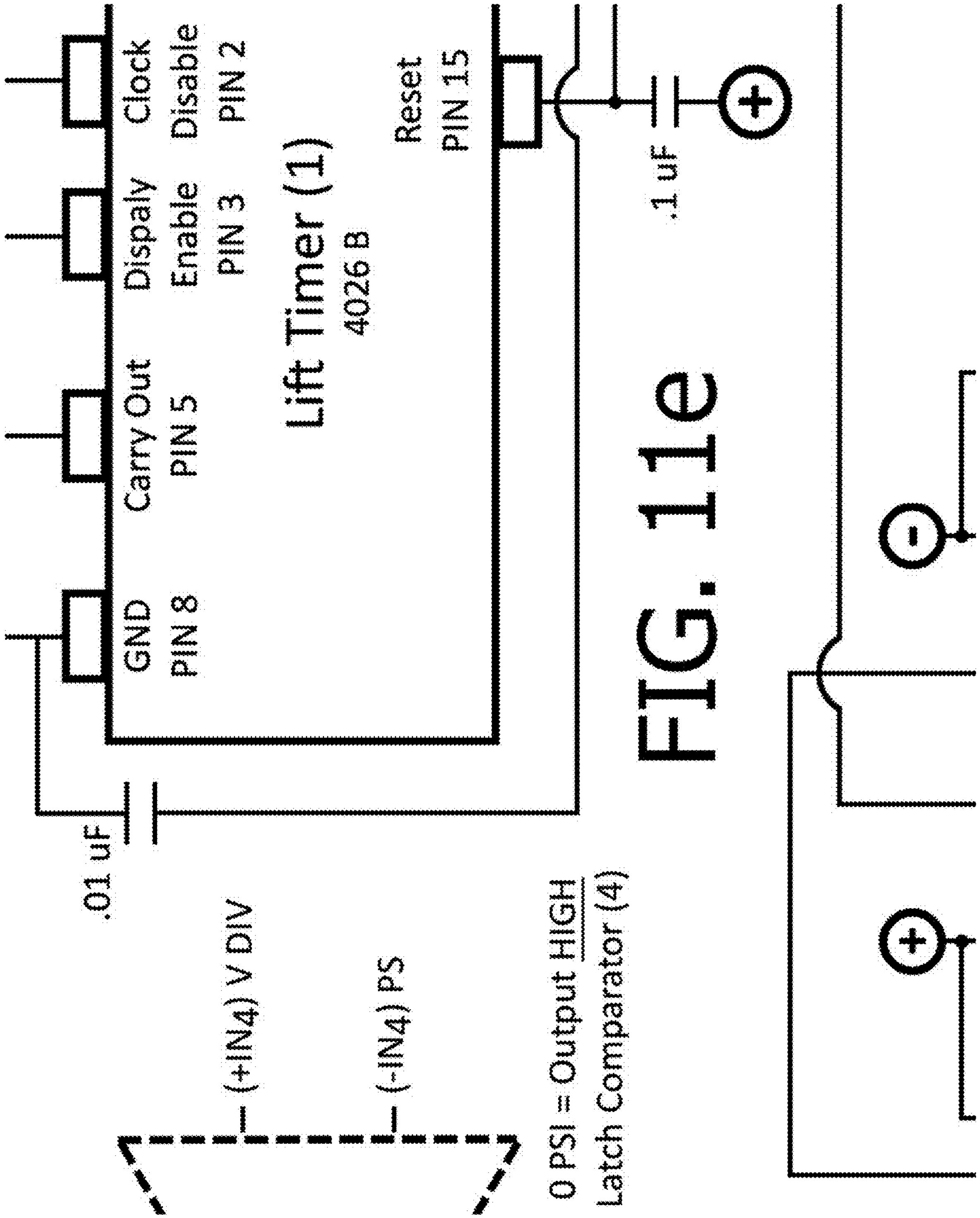
Figure 11F:
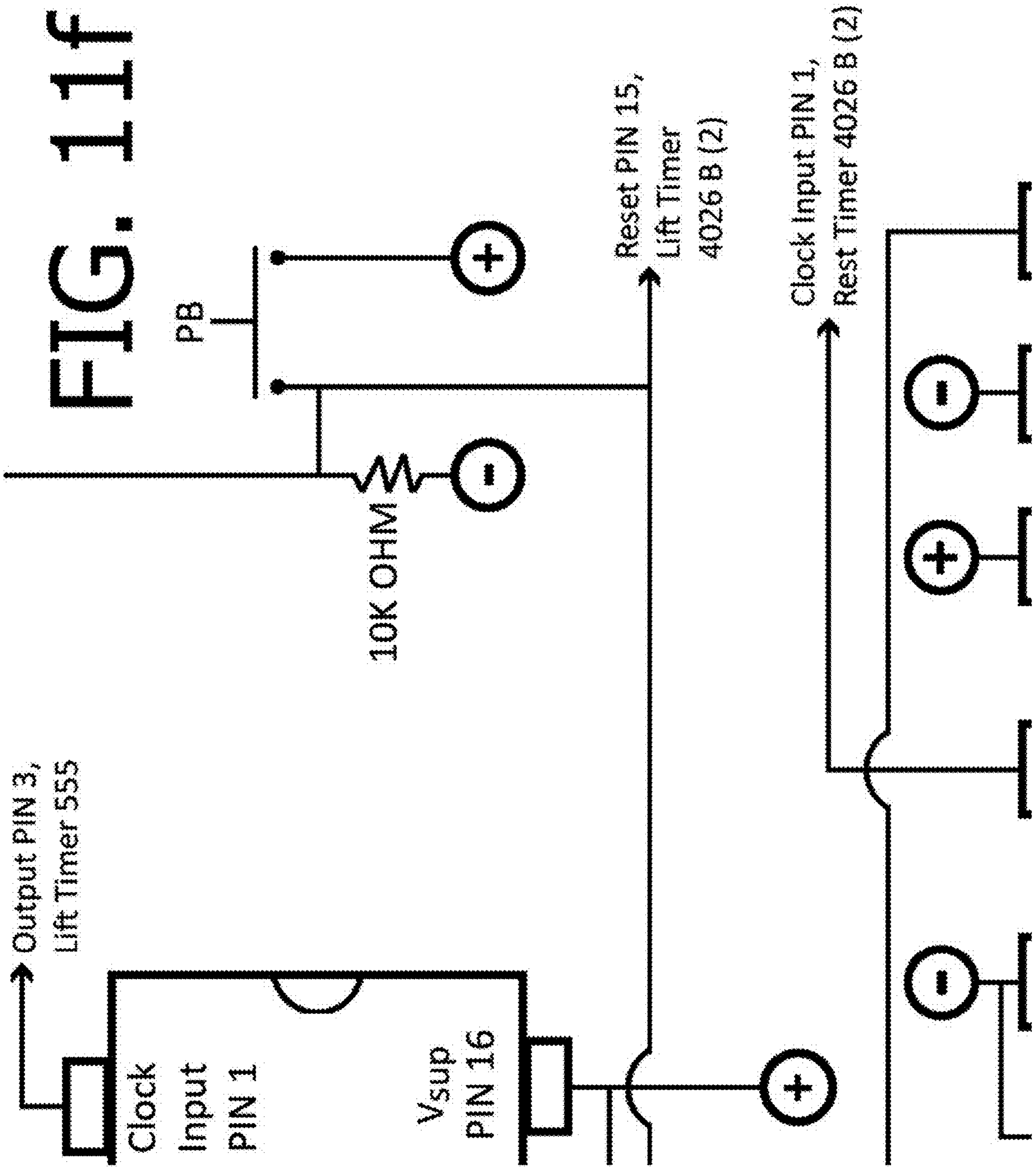
Figure 11G:
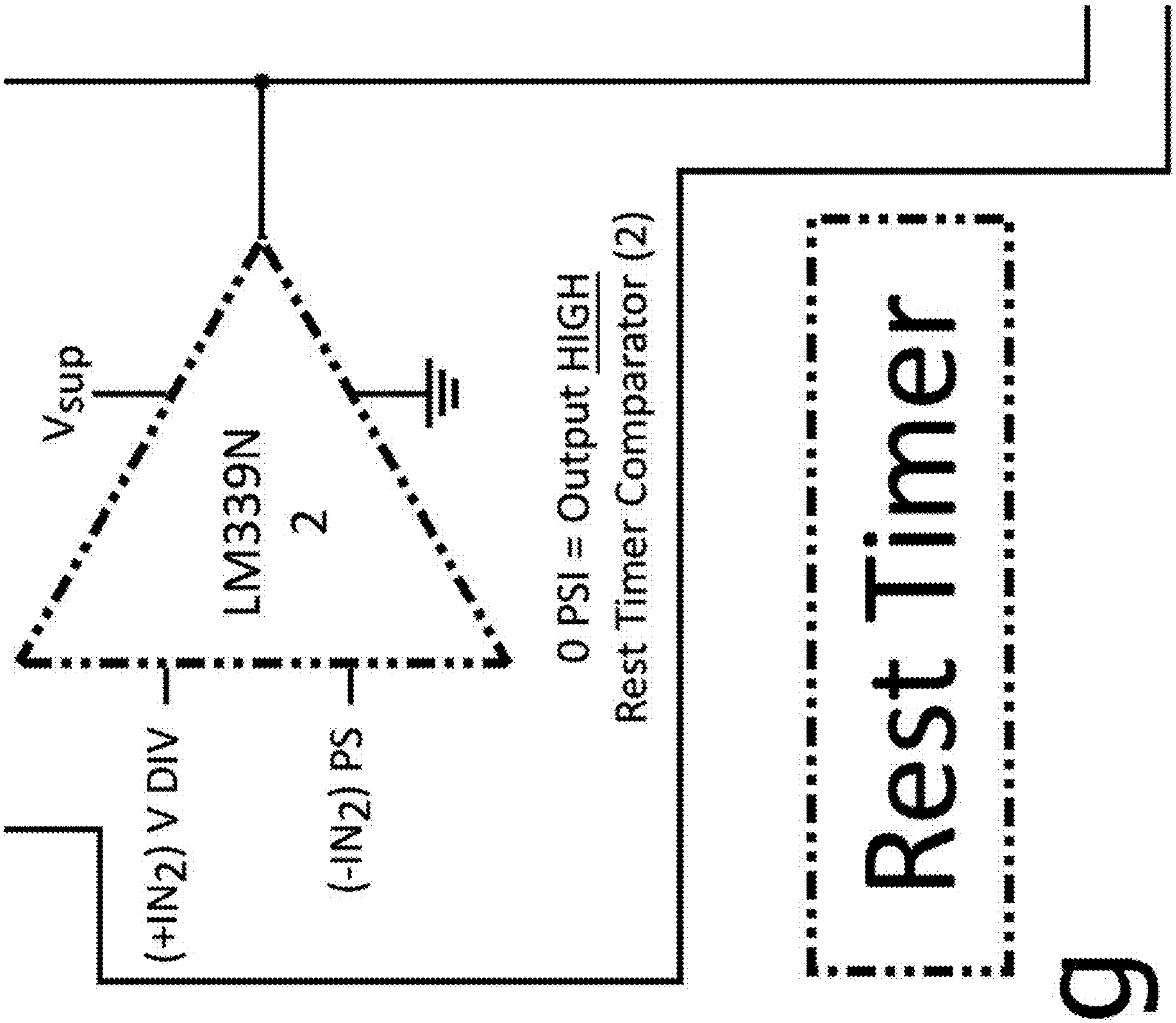
Figure 11H:
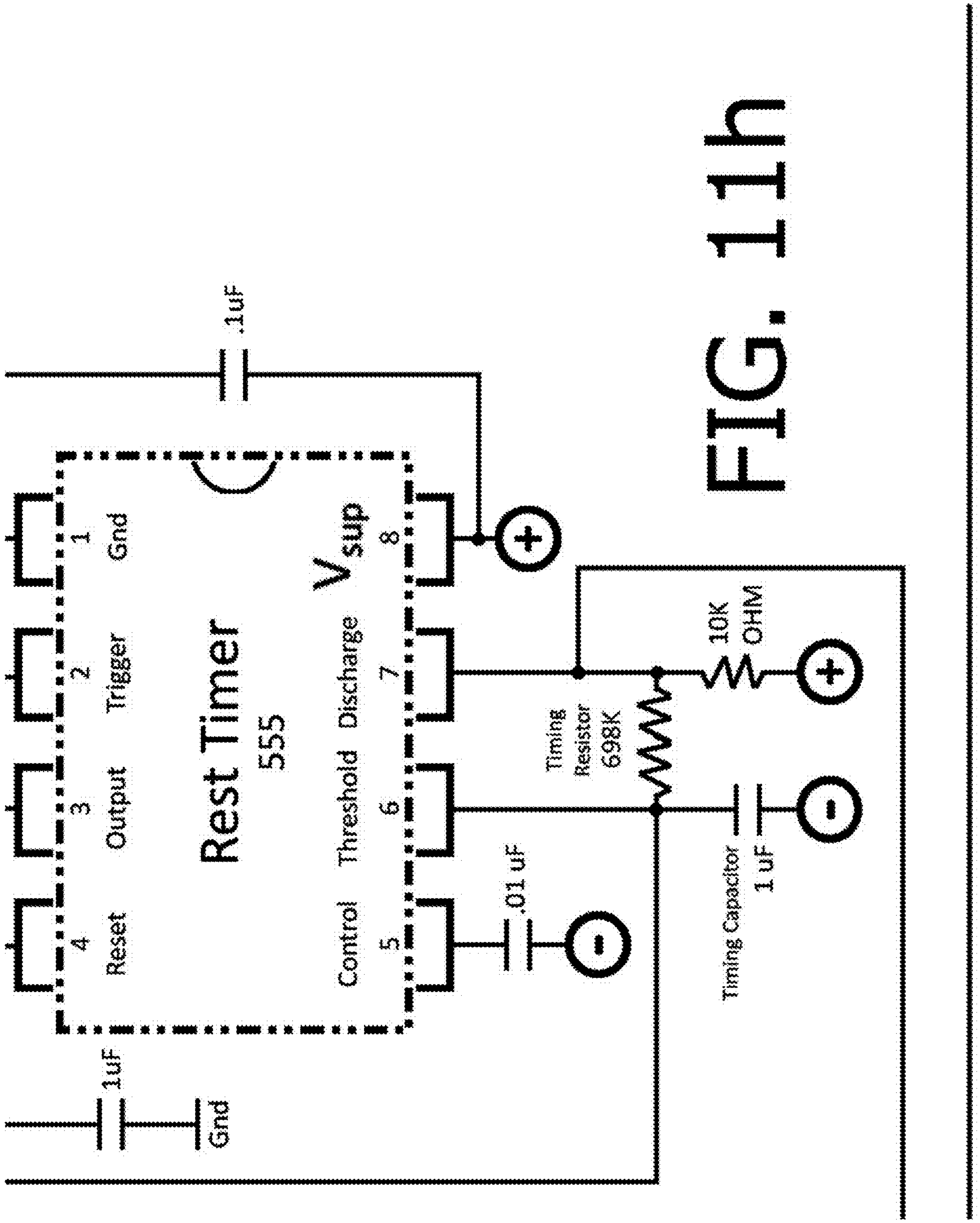
Figure 11I:
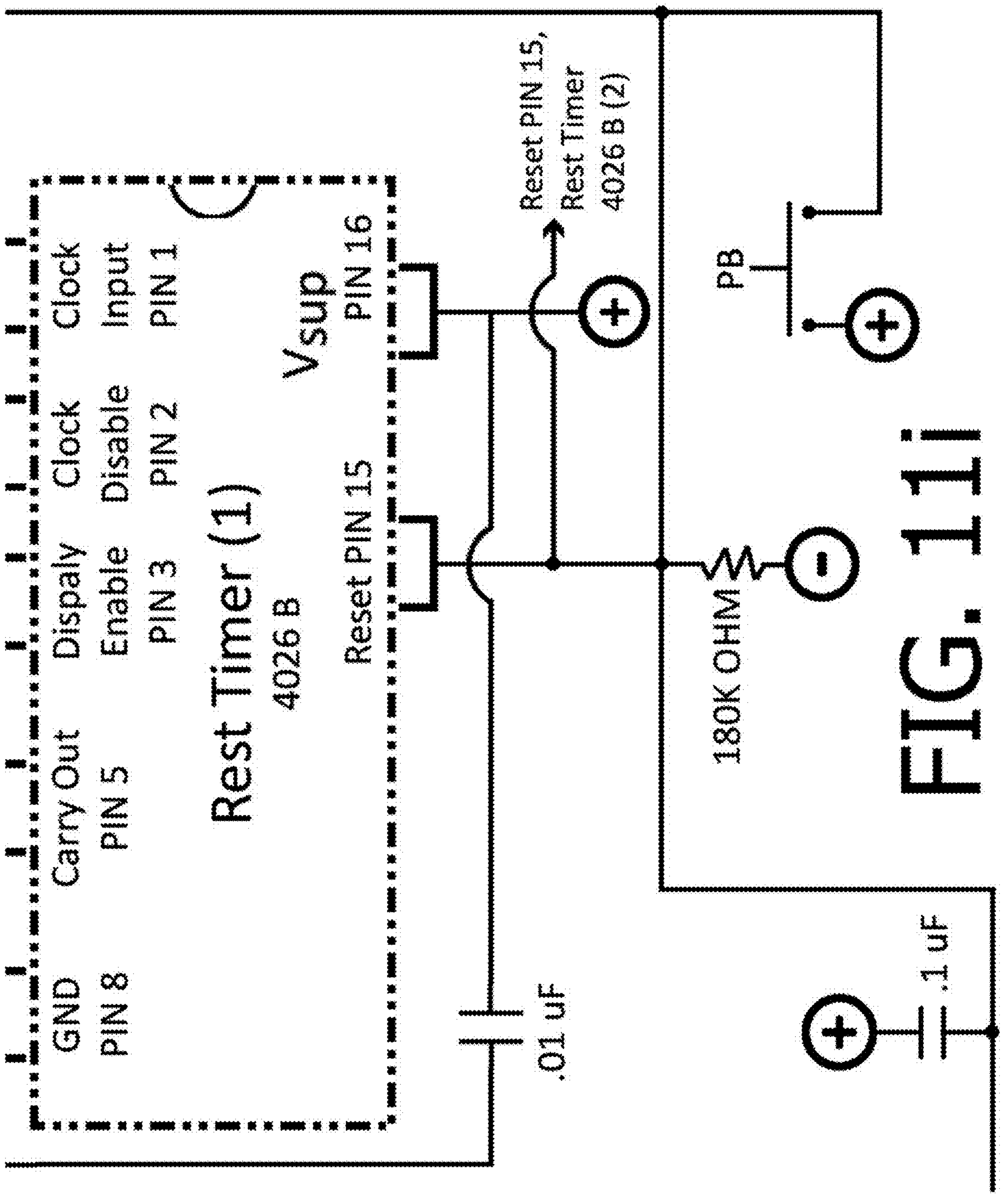
Figure 12:
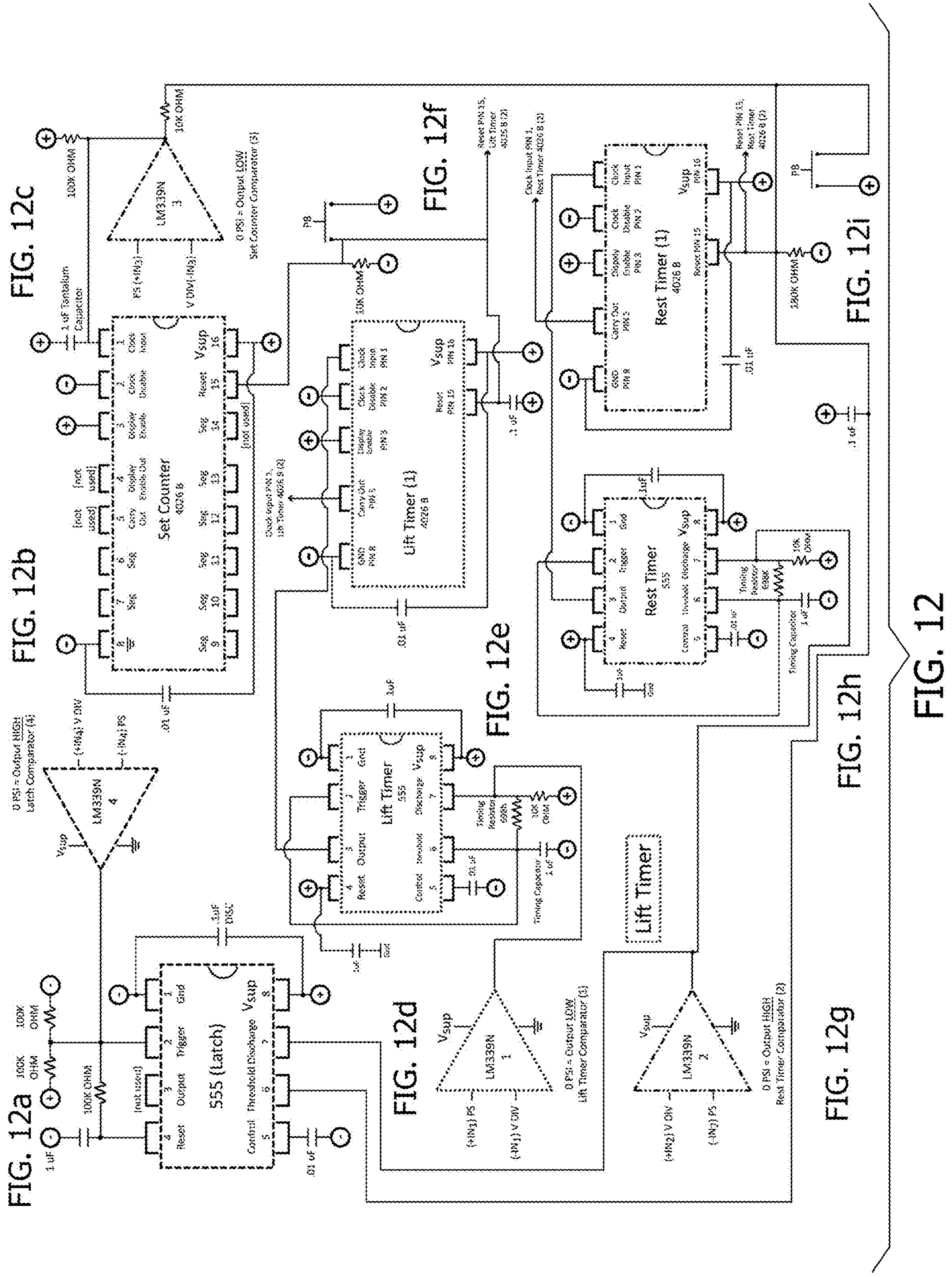
FIG. 12 is a schematic of the lift timer of the invention.
Figure 12A:
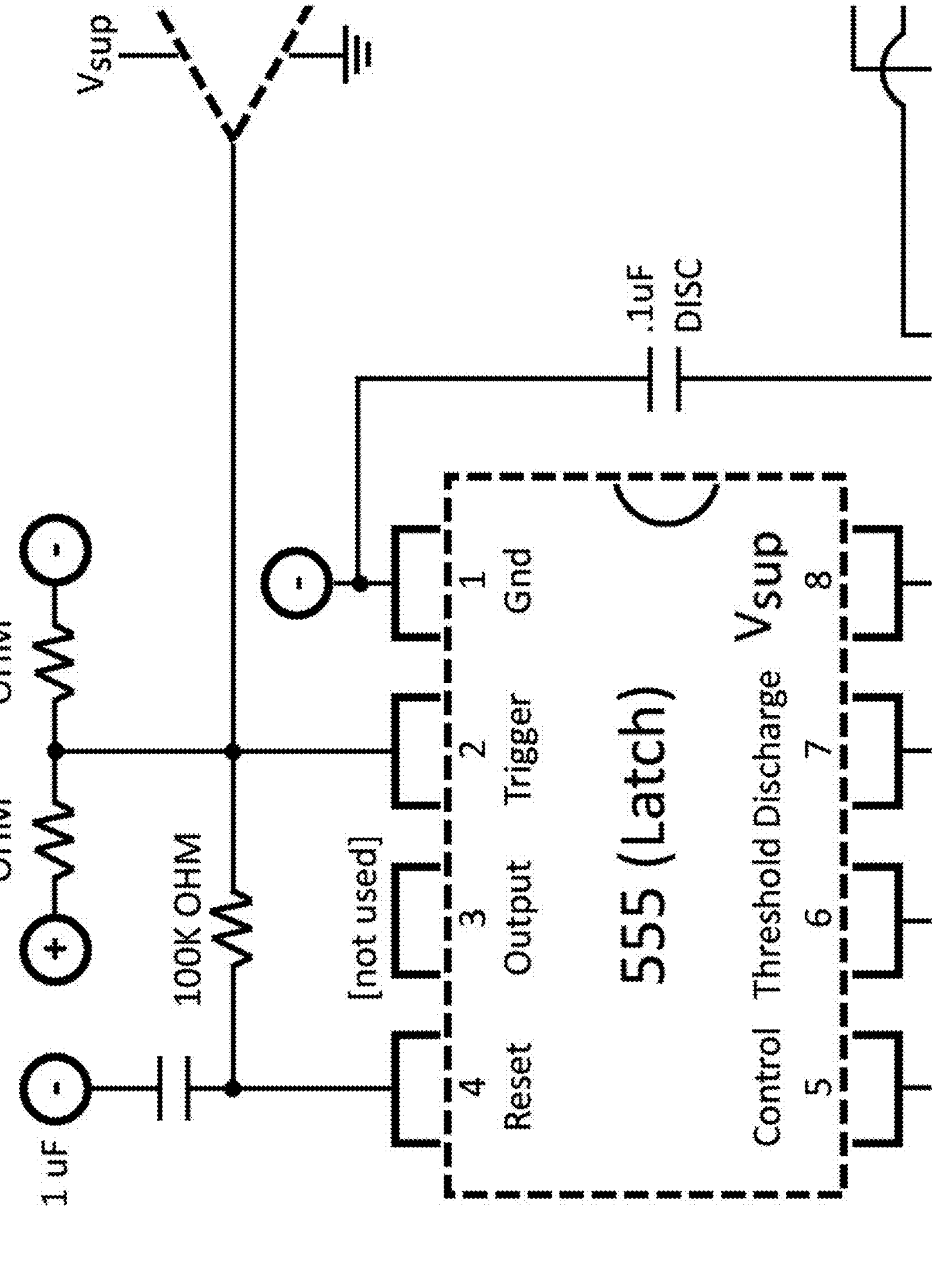
Figure 12B:
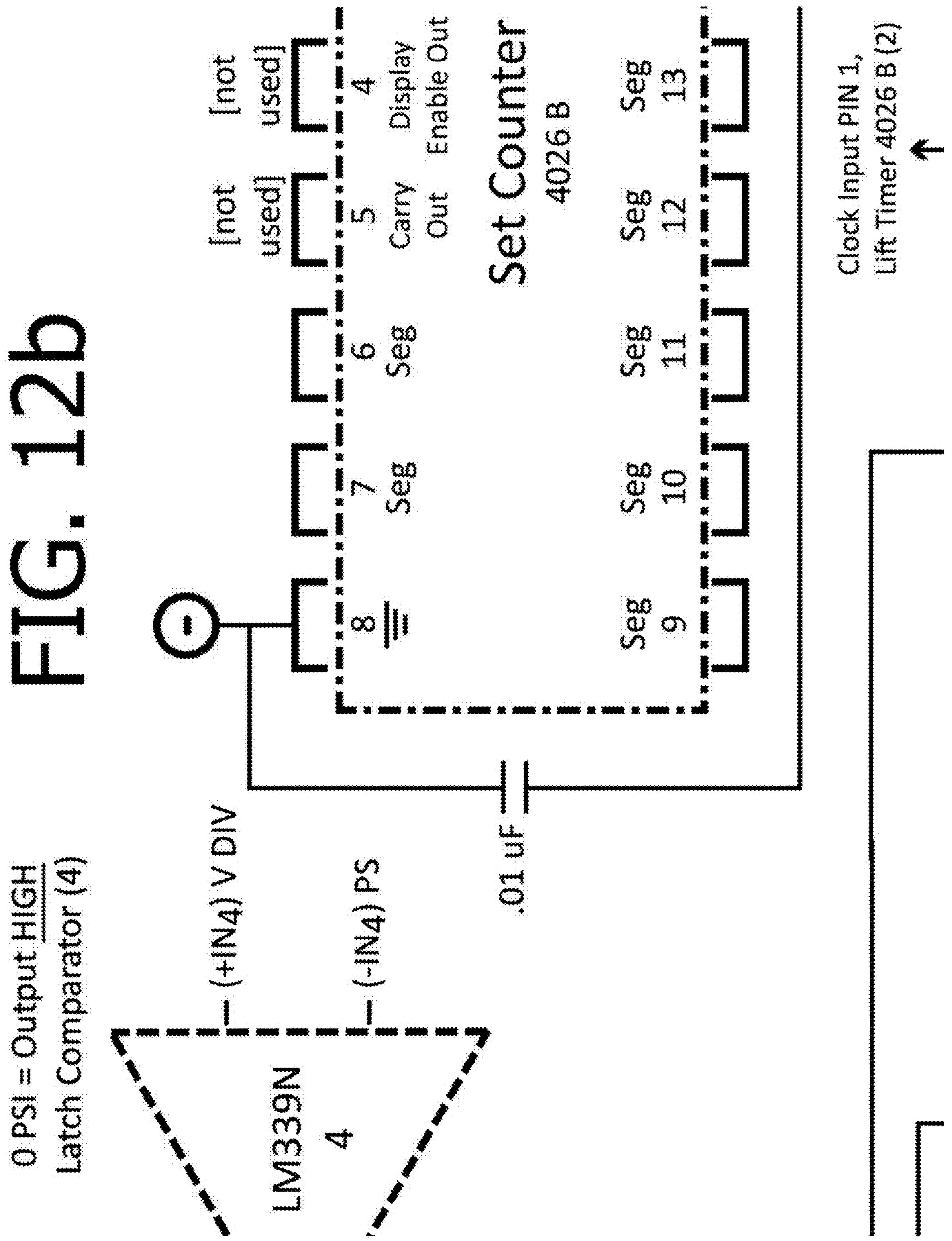
Figure 12C:
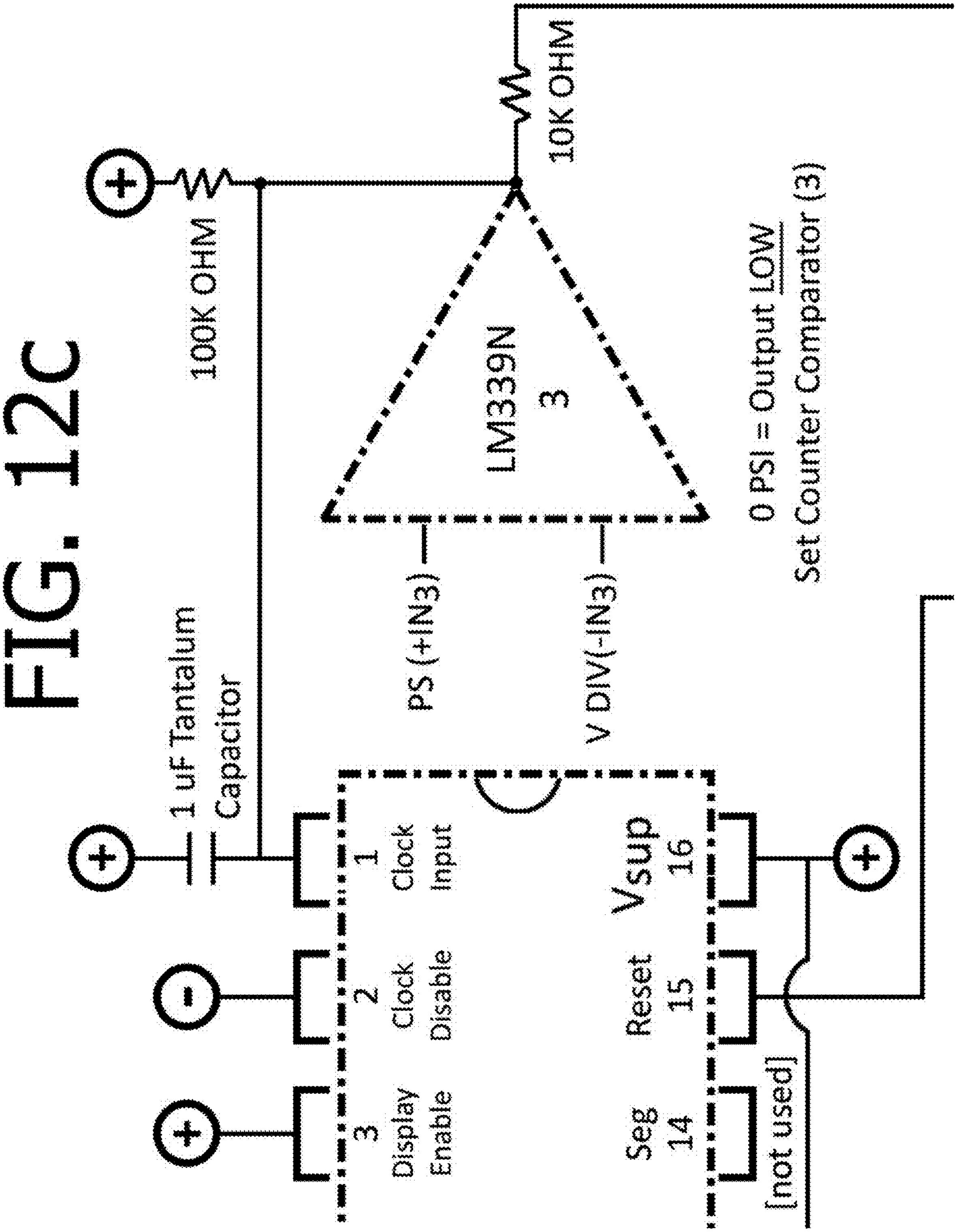
Figure 12D:
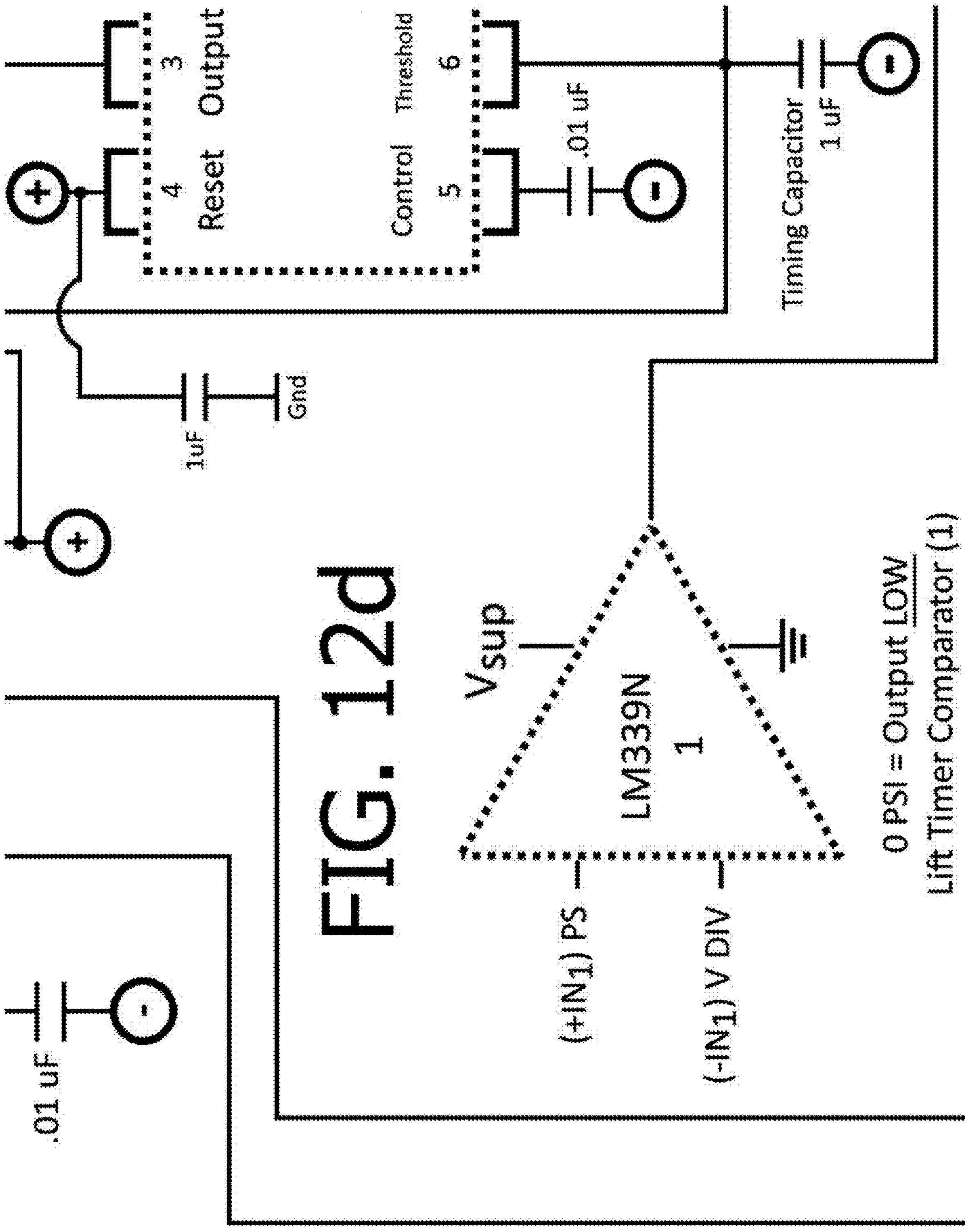
Figure 12E:
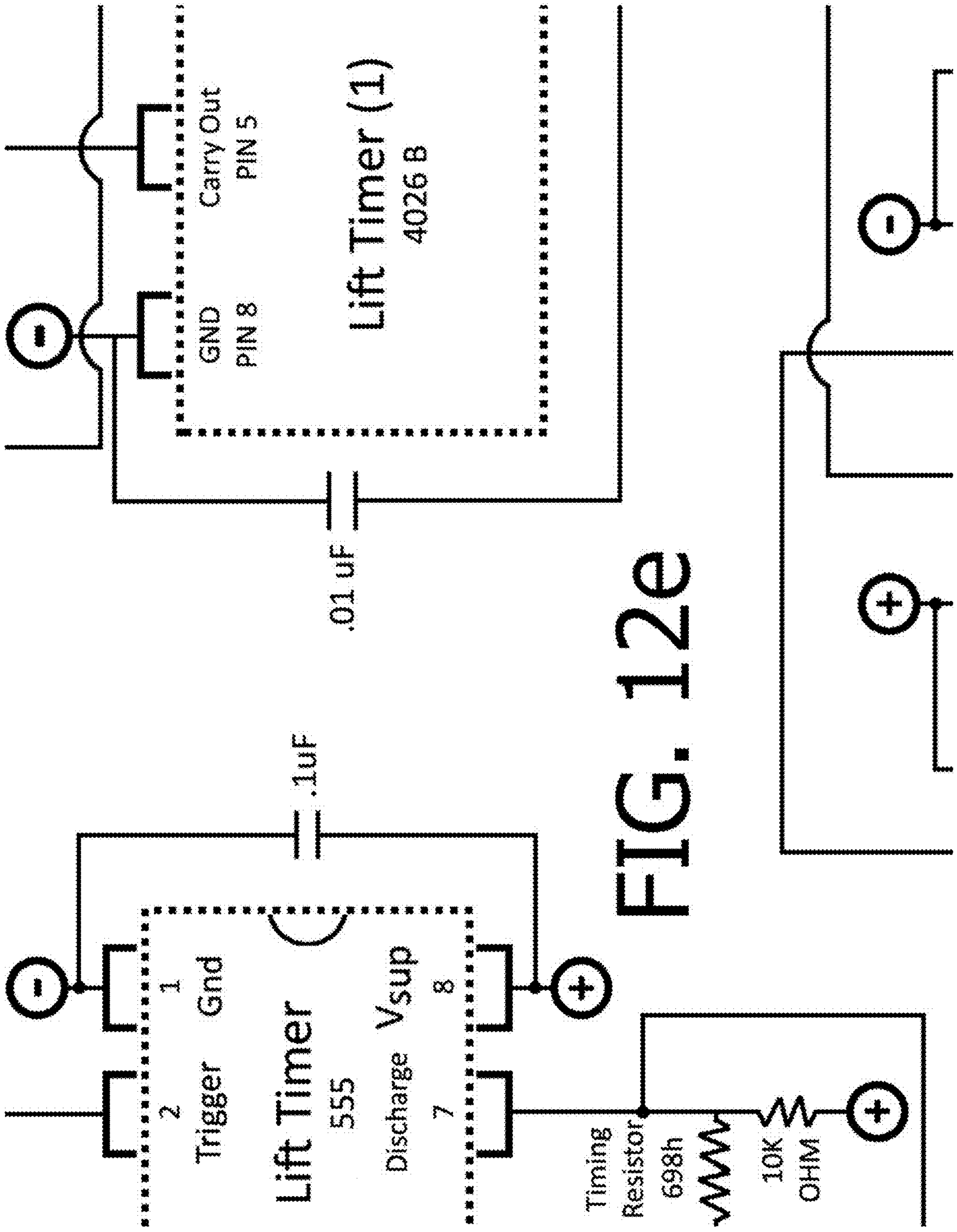
Figure 12F:
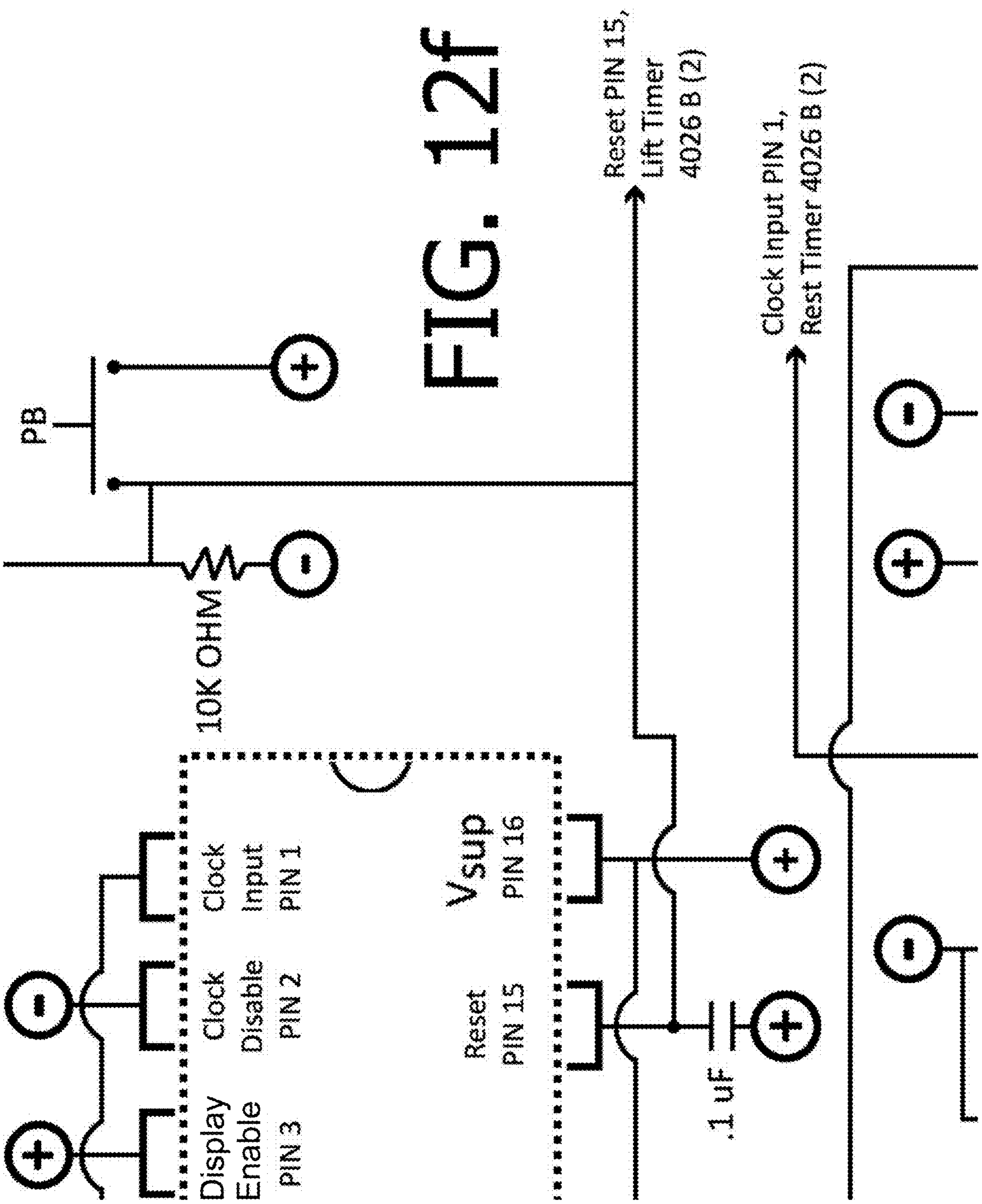
Figure 12G:
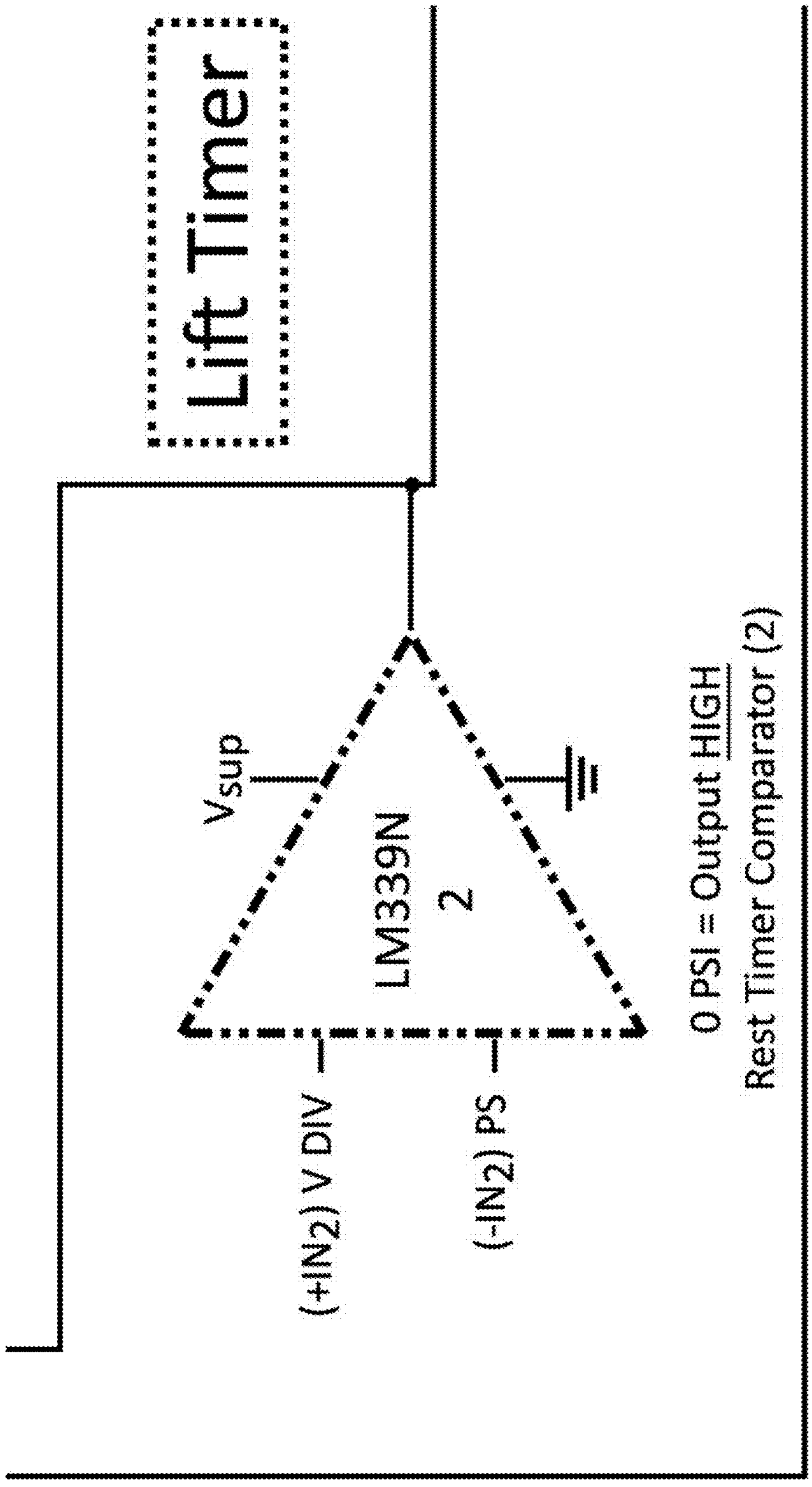
Figure 12H:
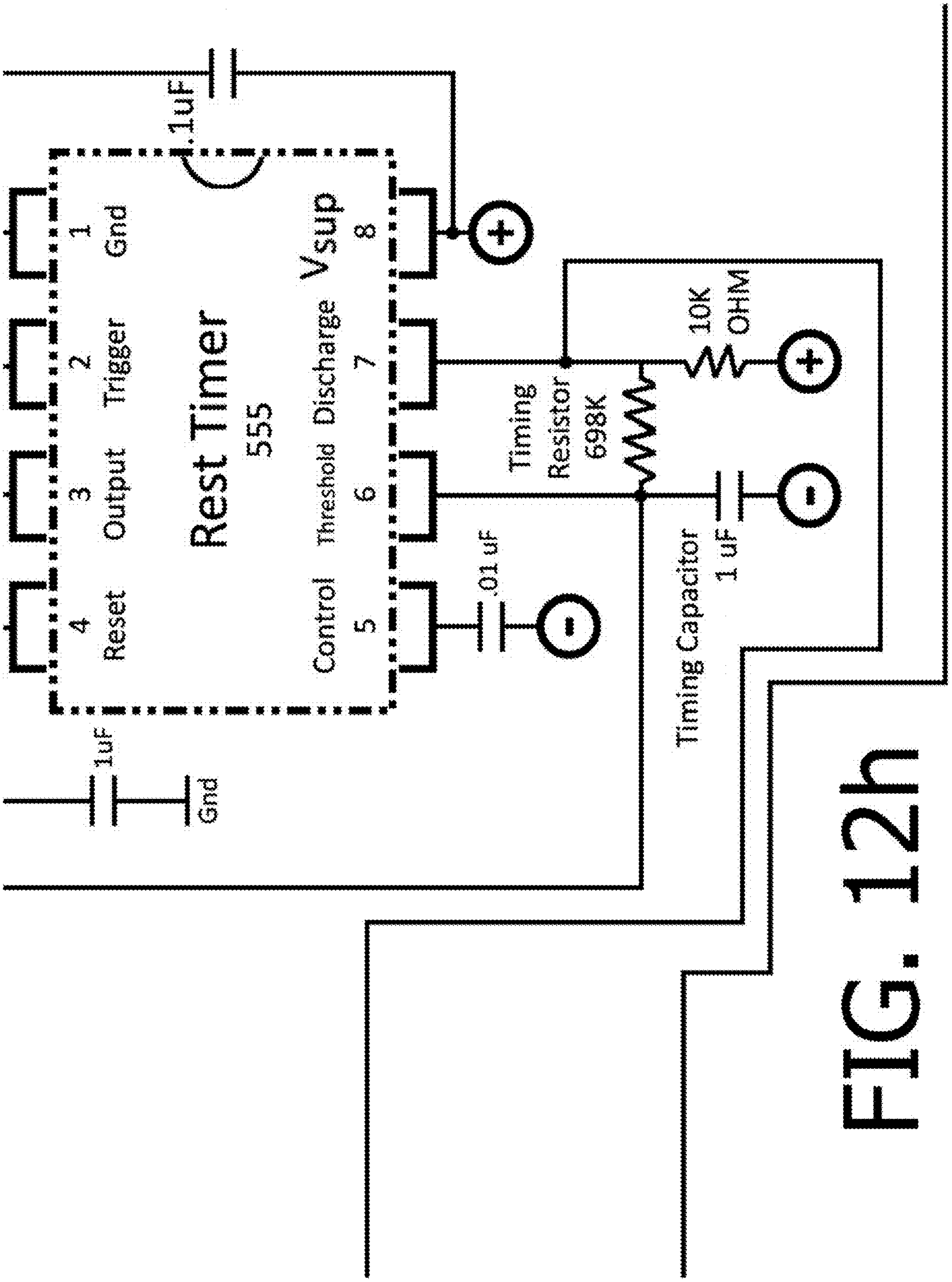
Figure 12I:
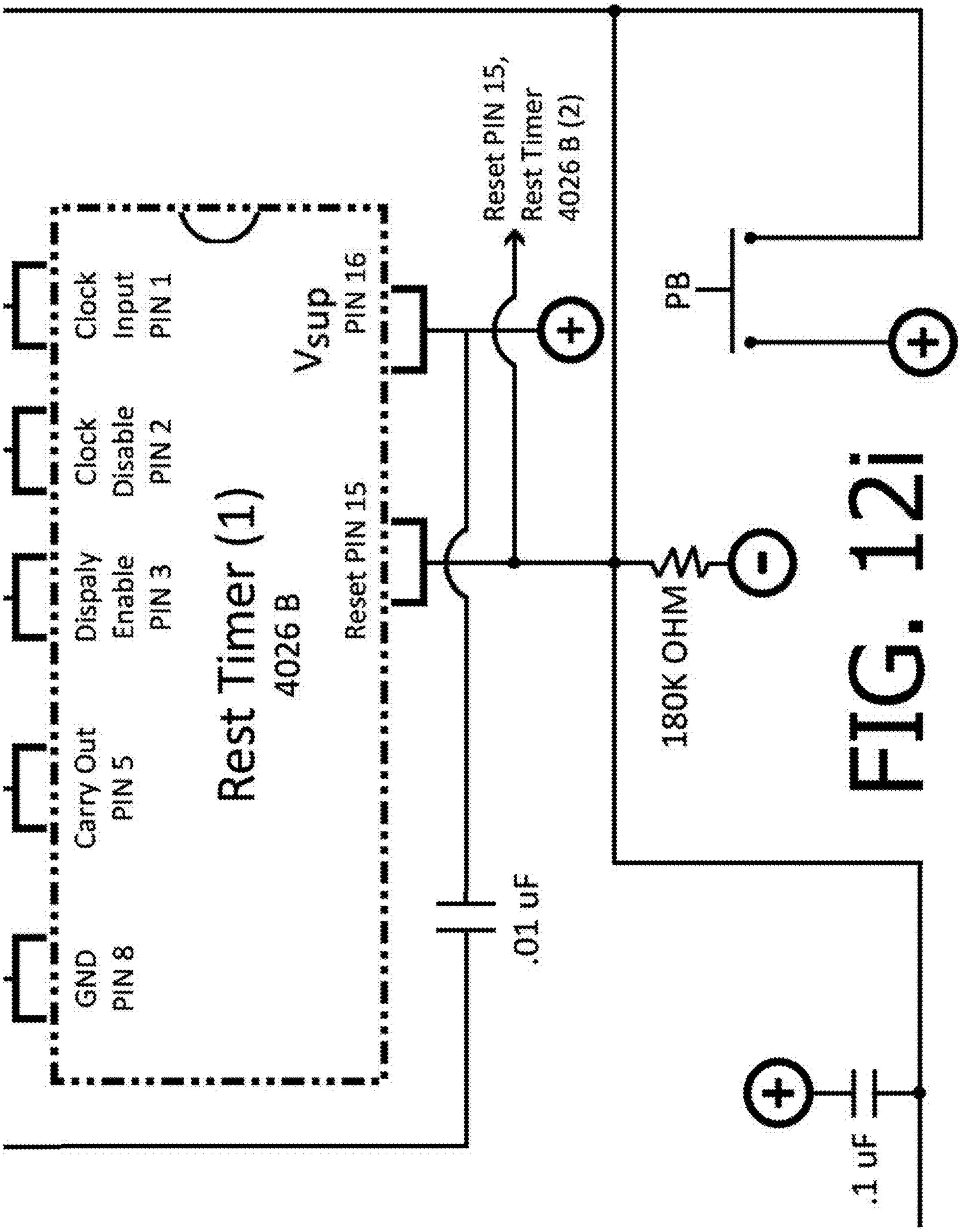
Figure 13:
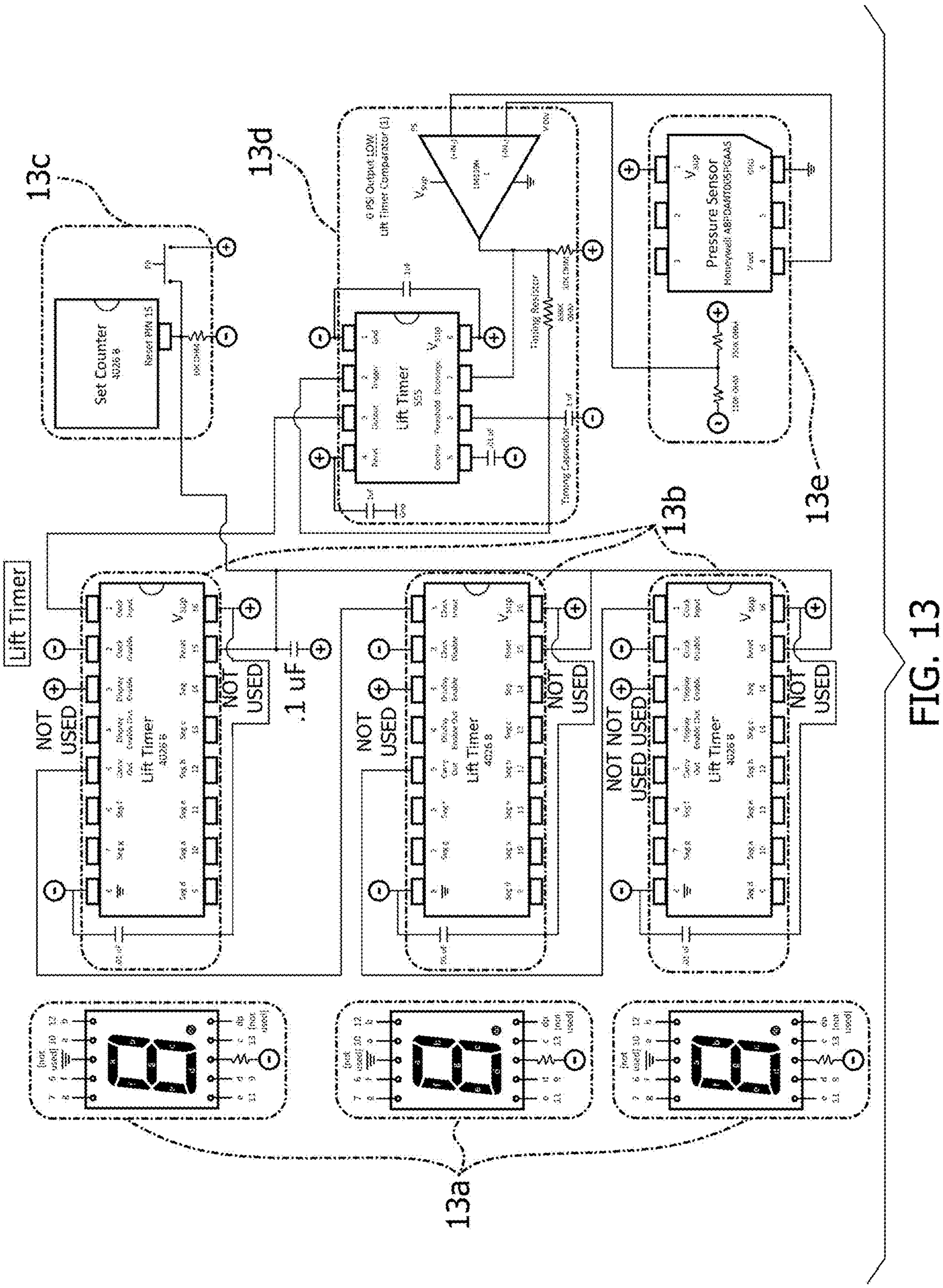
FIG. 13 is an embodiment of the lift timer of the invention and the 7 segment LEDs.
Figure 13A:
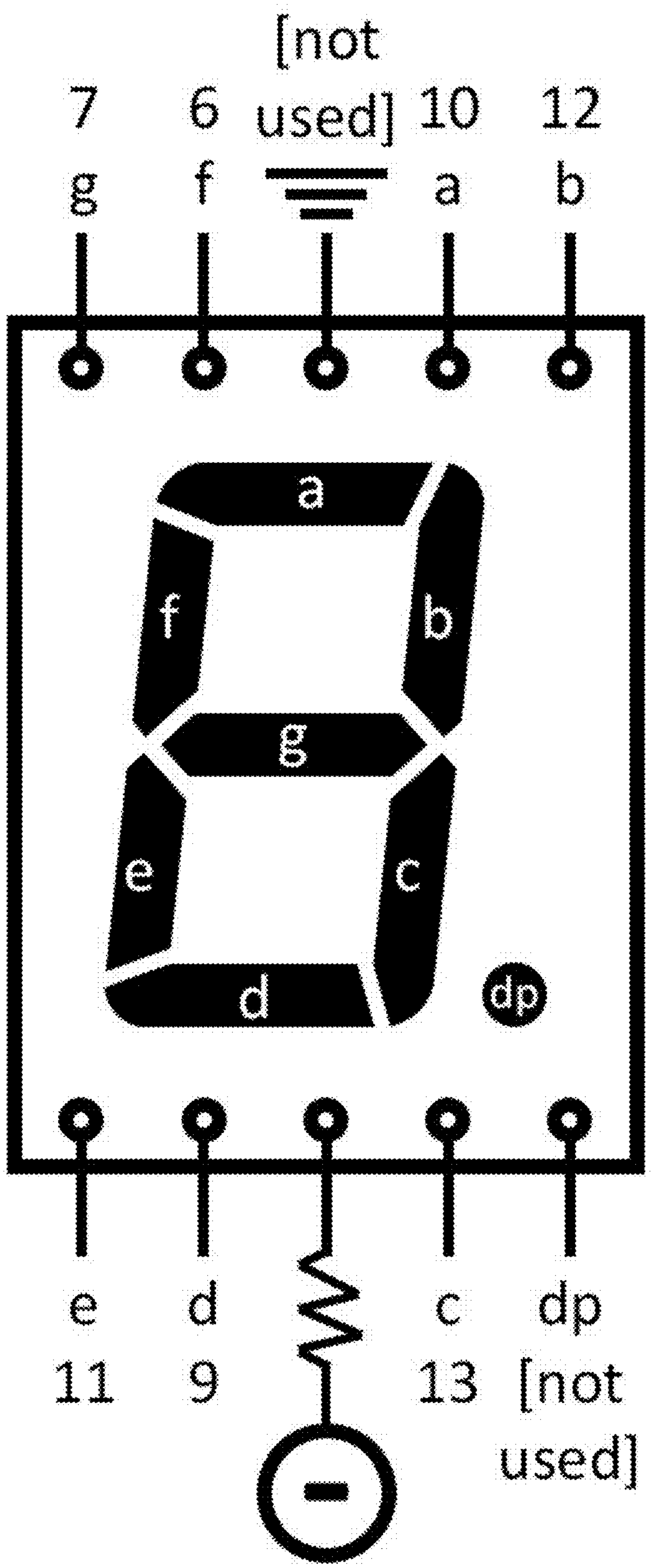
Figure 13B:
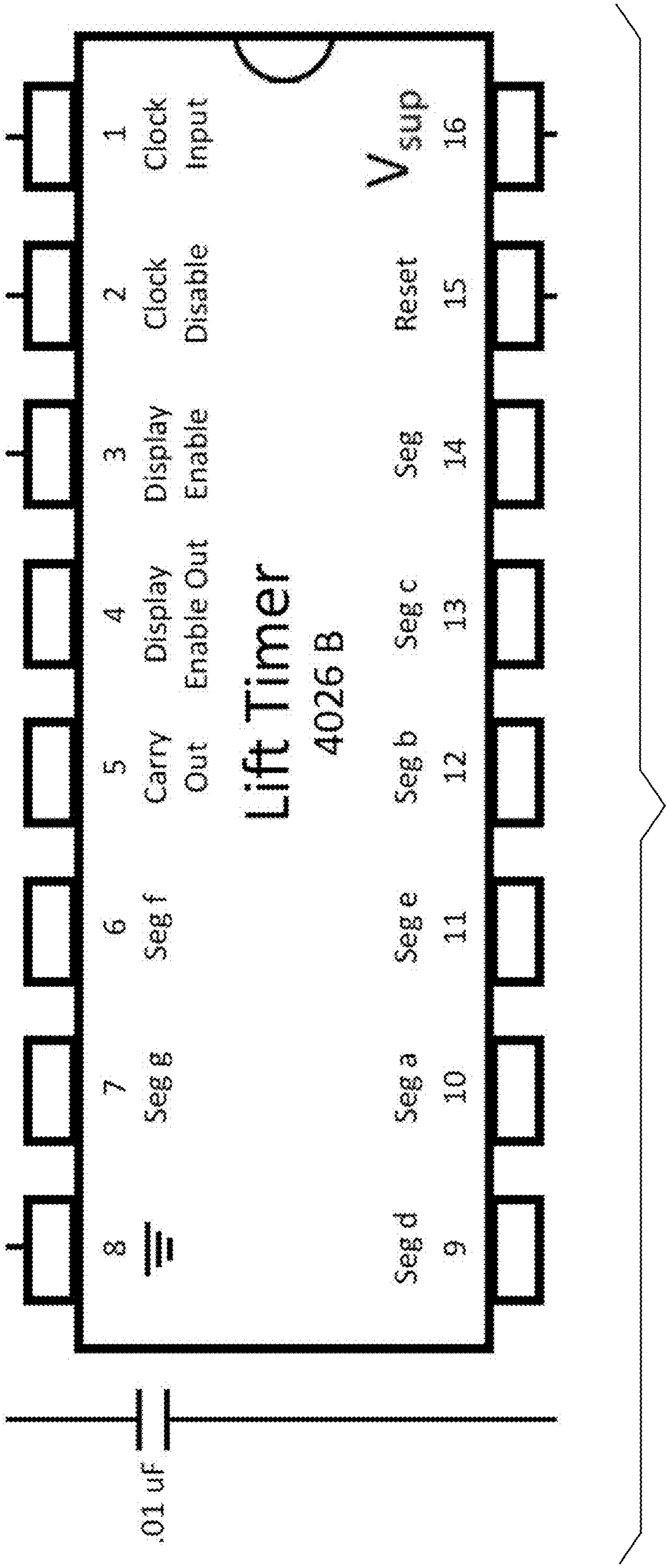
Figure 13C:
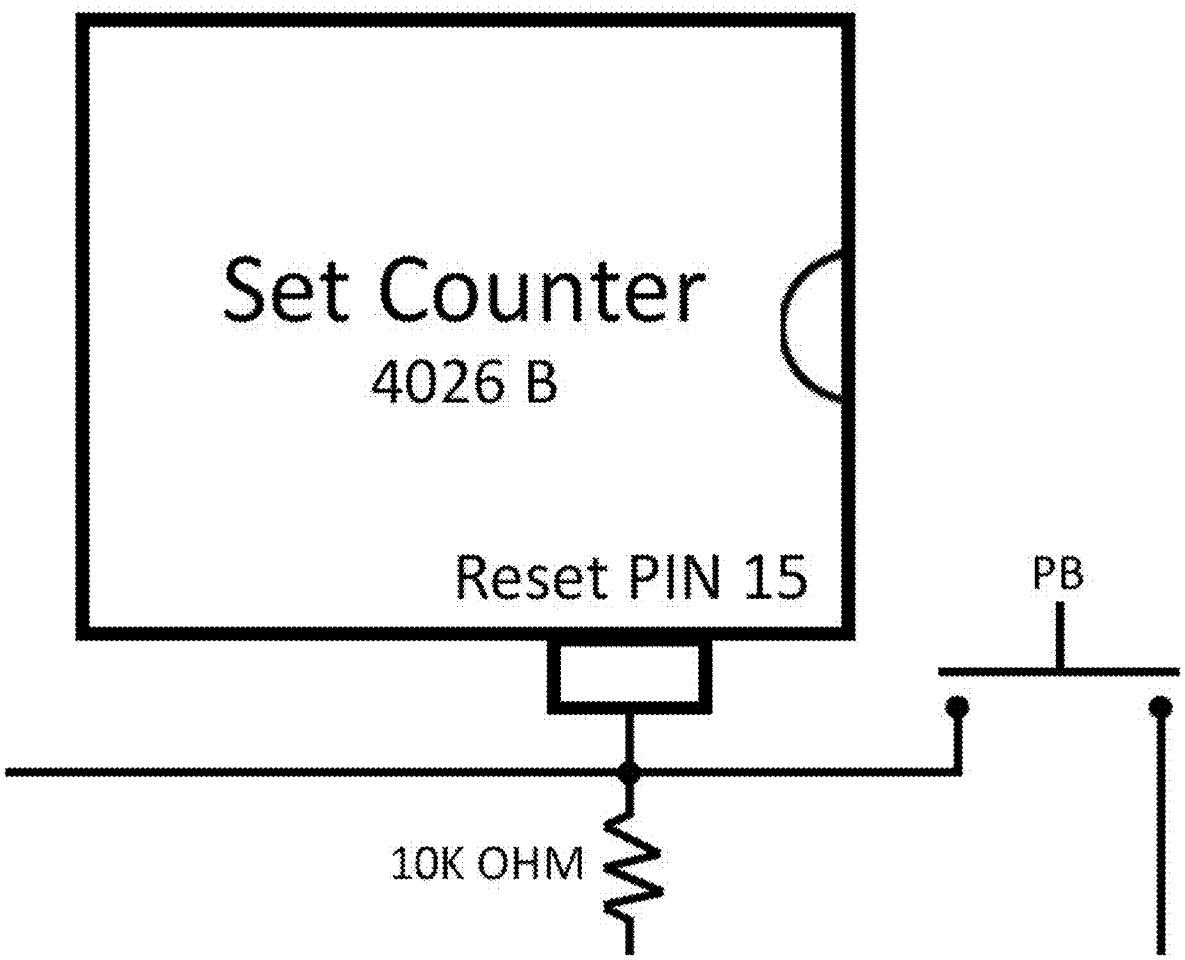
Figure 13D:
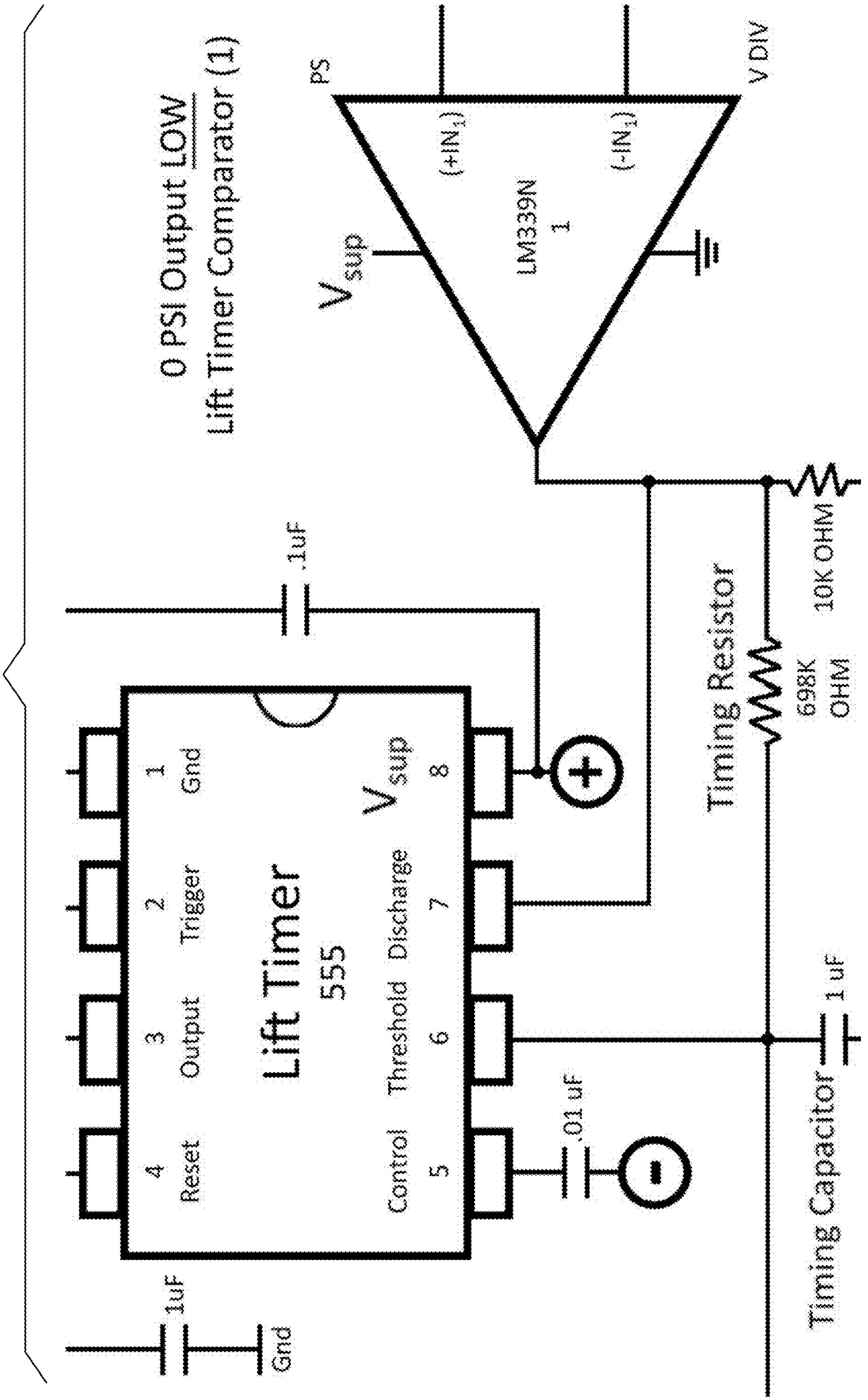
Figure 13E:
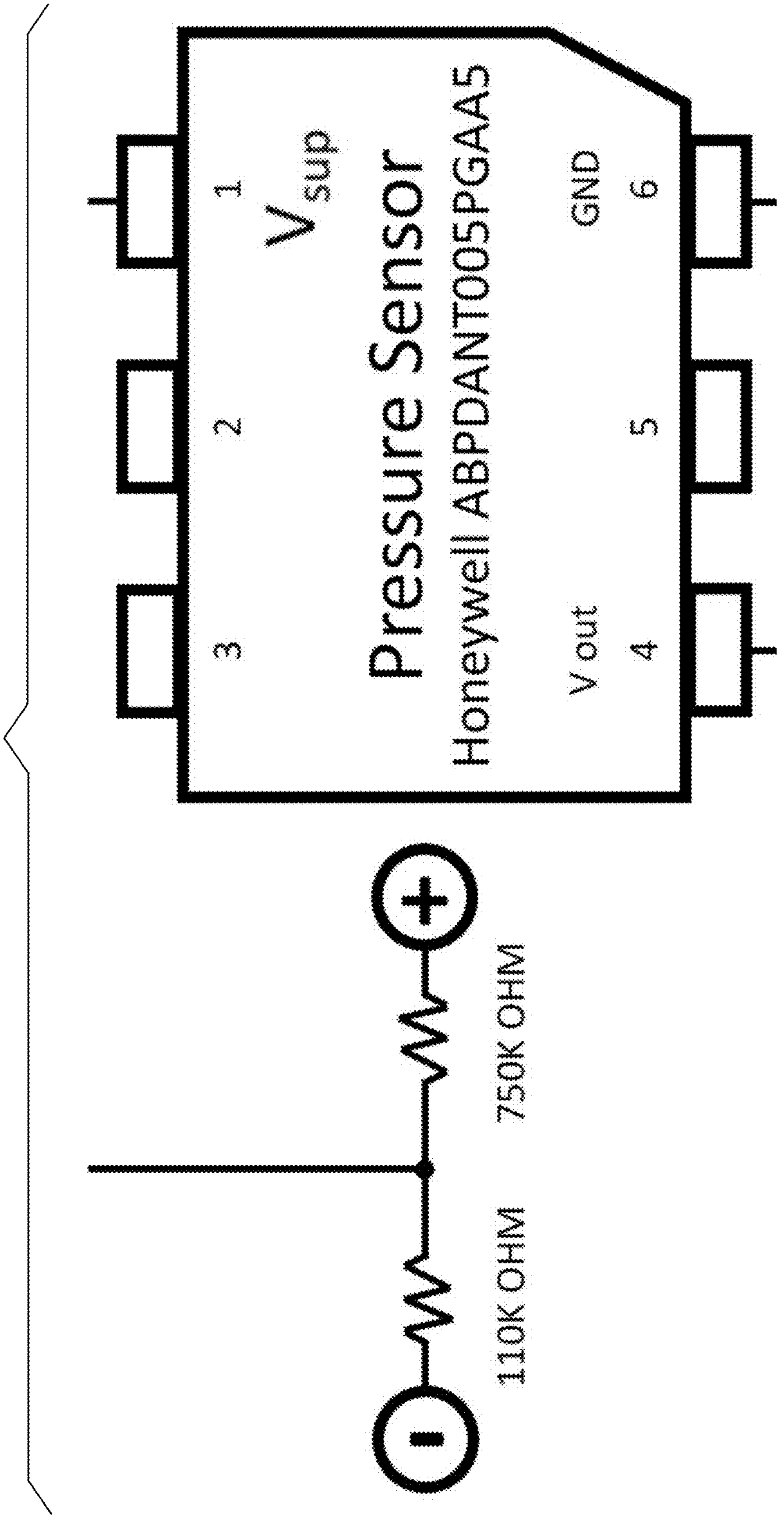
Figure 14:
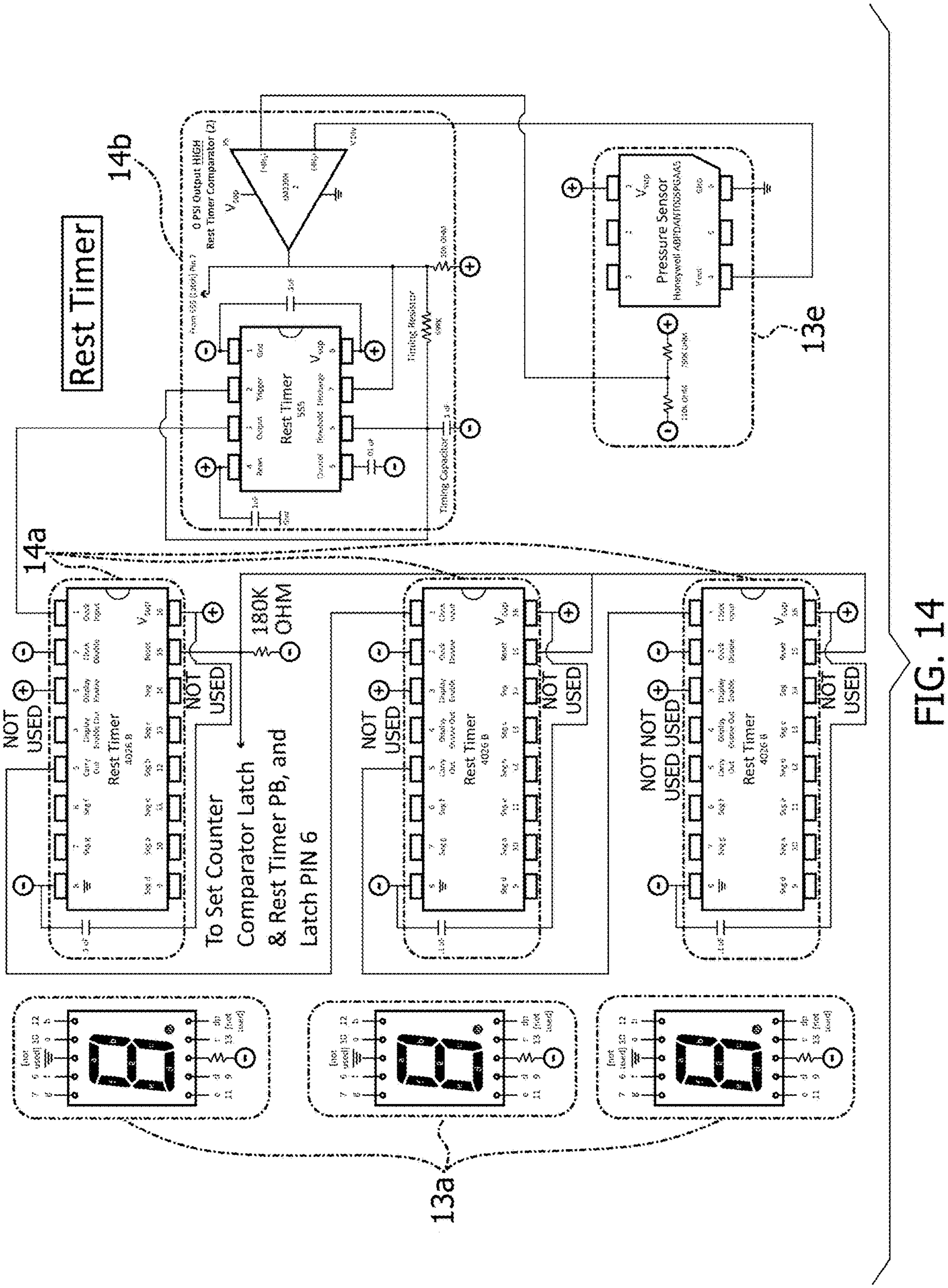
FIG. 14 is an embodiment of the rest timer of the invention and the 7 segment LEDs.
Figure 14A:
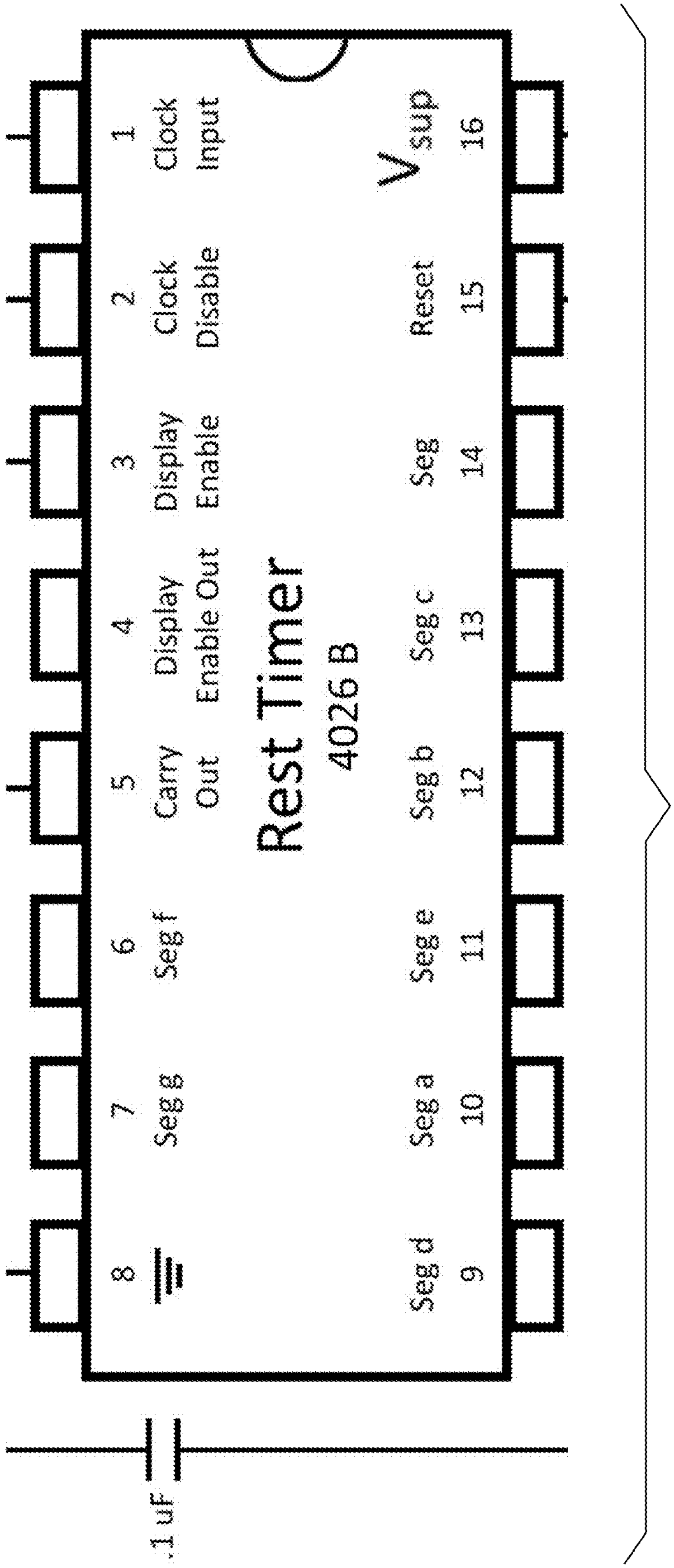
Figure 14B:
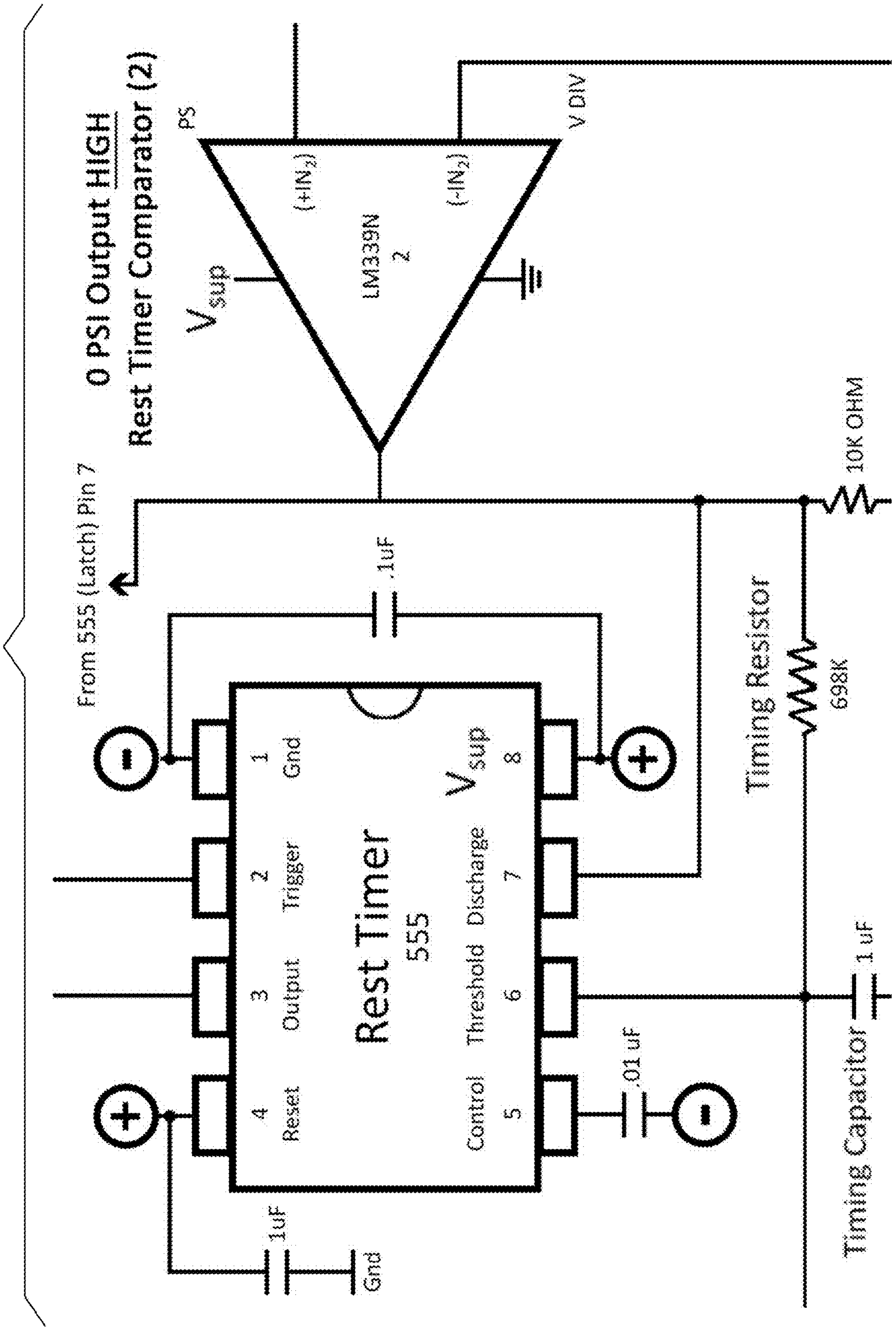
Figure 15:
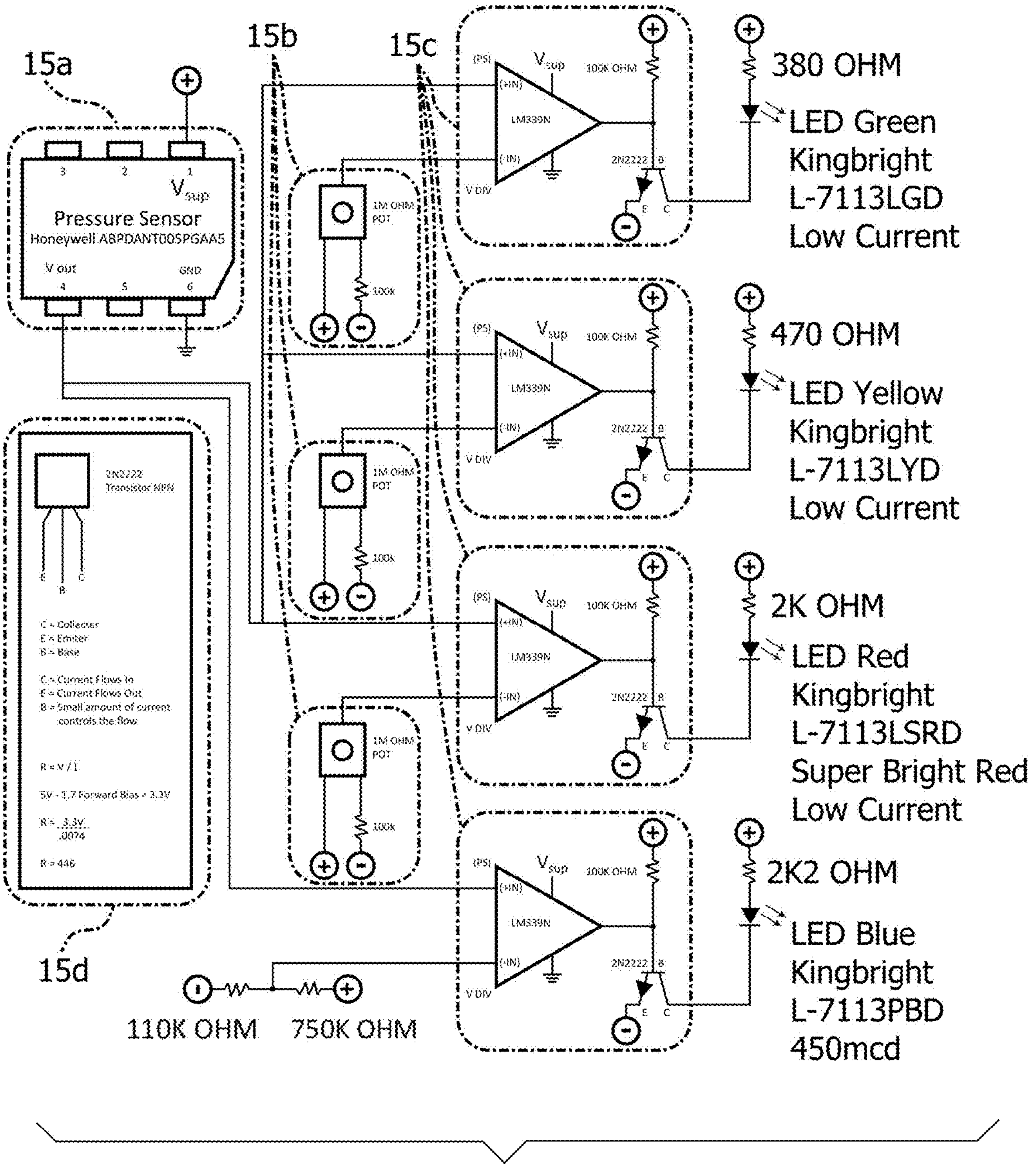
FIG. 15 is an example of the pressure sensor and the LEDs/displays for the virtual inserts of the invention; and, FIG. 16 is an alternative embodiment of the invention integrated into a lung training and breathing technique device.
Figure 15A:
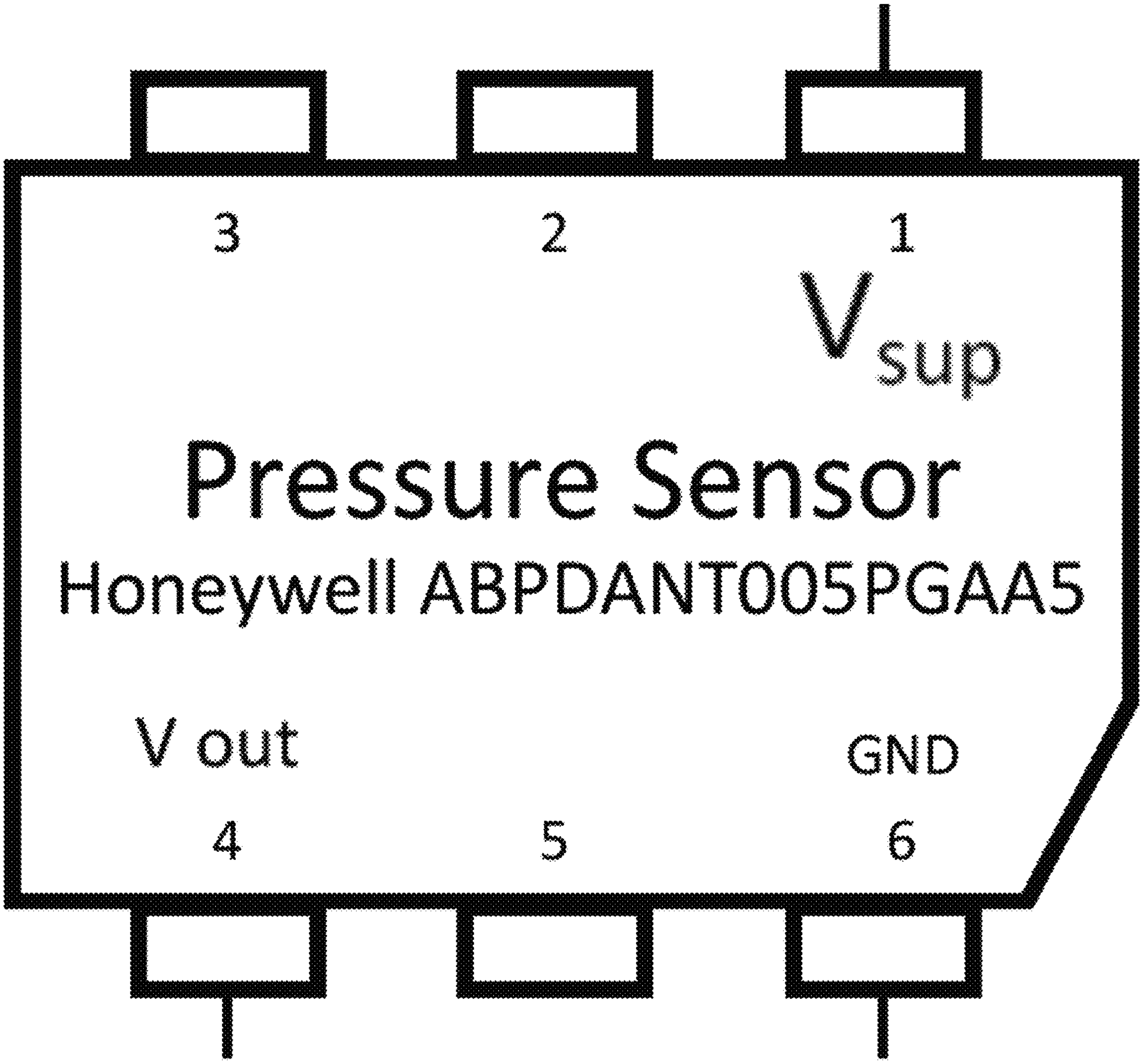
Figure 15B:
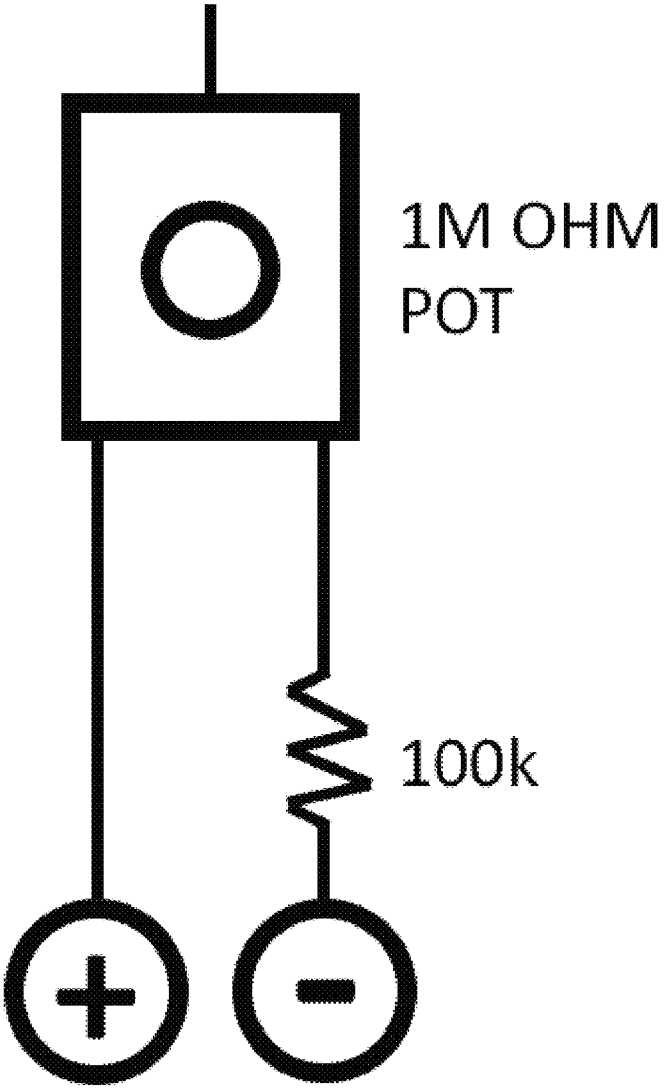
Figure 15C:
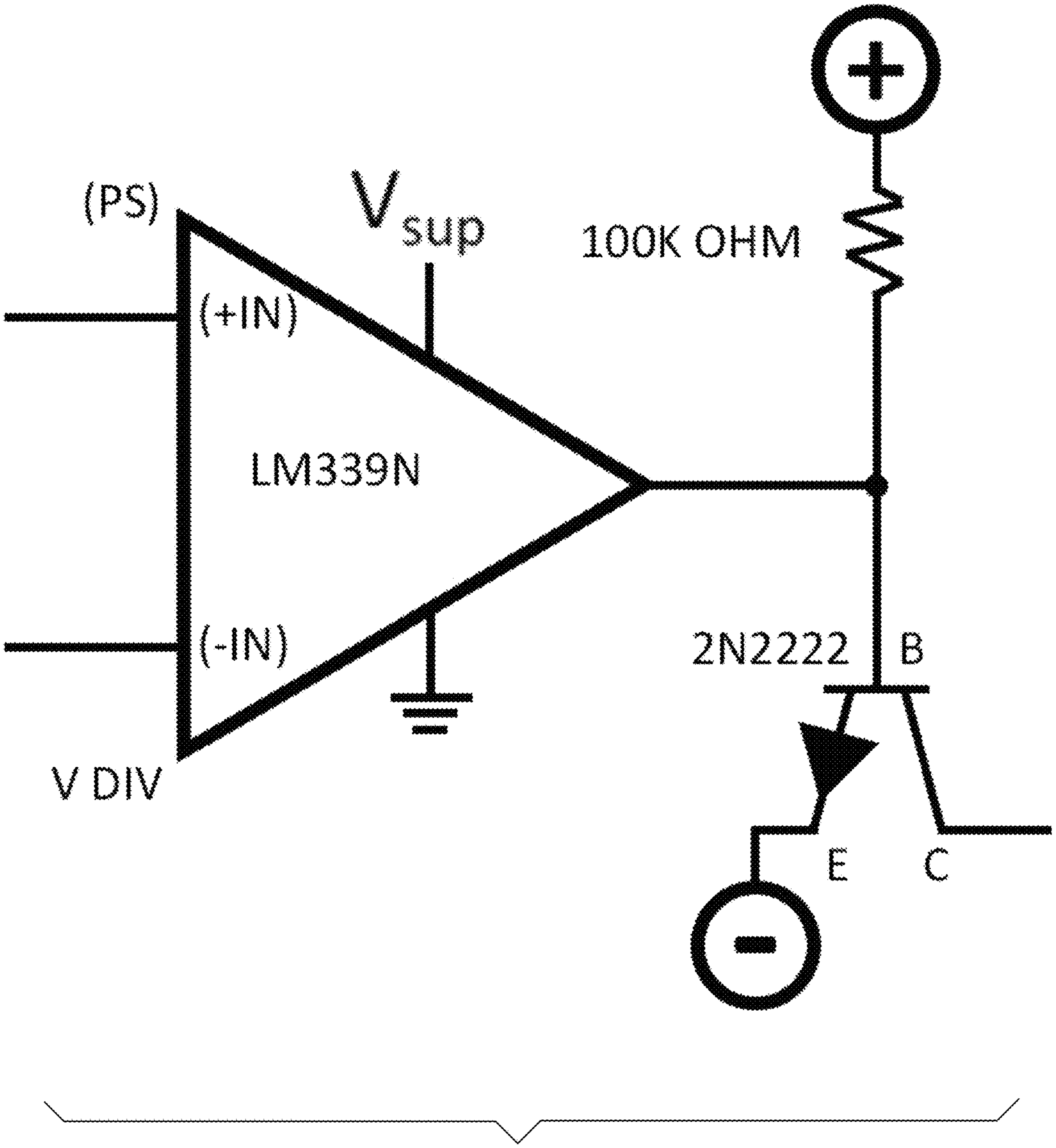
Figure 15D:
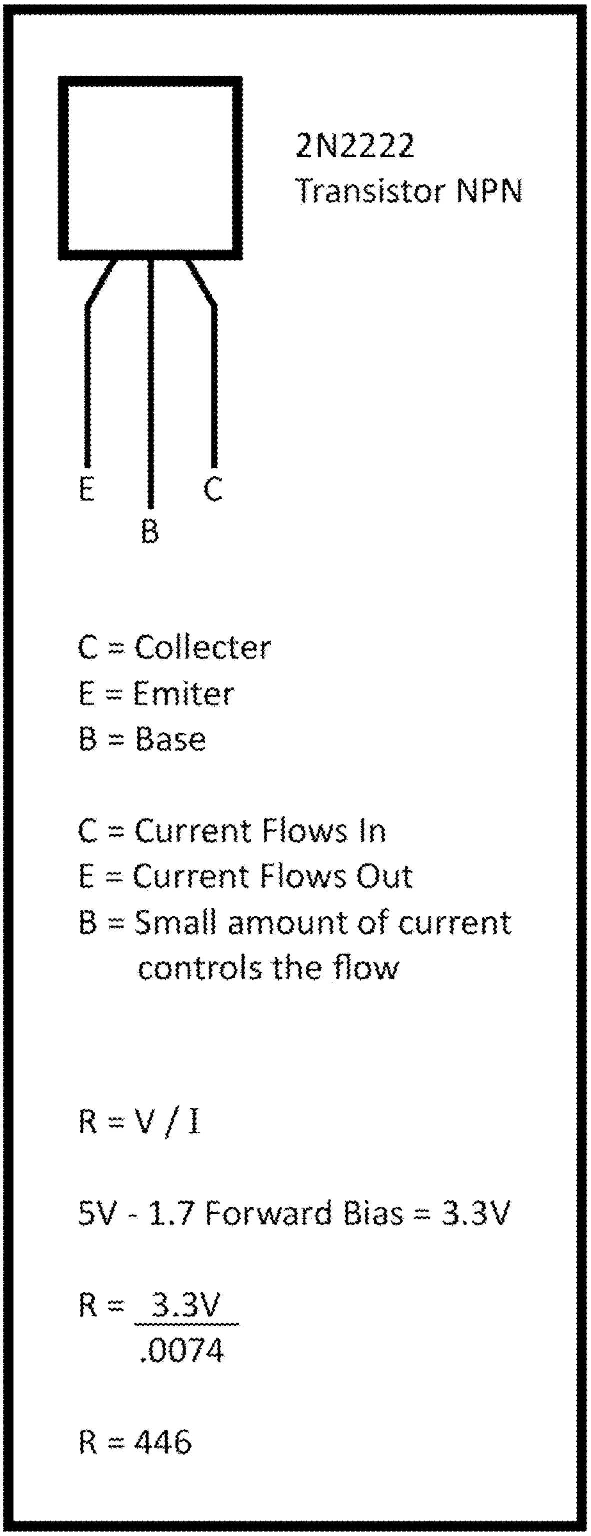

In FIG. 2 is shown display embodiment 10000, inner display 10100, set display 10200, lift display 10300, rest display 10400, virtual weight display 10500, power button 10600, run button 10700, review button 10800, reserved button 10900, stop/clear button 11000, reset set counter button 11100, reset lift timer button 11200, and graph button 11300.

FIGS. 2-6 illustrate the flow of the process and computer programs for when the invention is implemented on arduino or a similar open-source electronics platform, while FIGS. 7-15 show electrical schematics of an exemplary embodiment of the invention.

Figure 16:
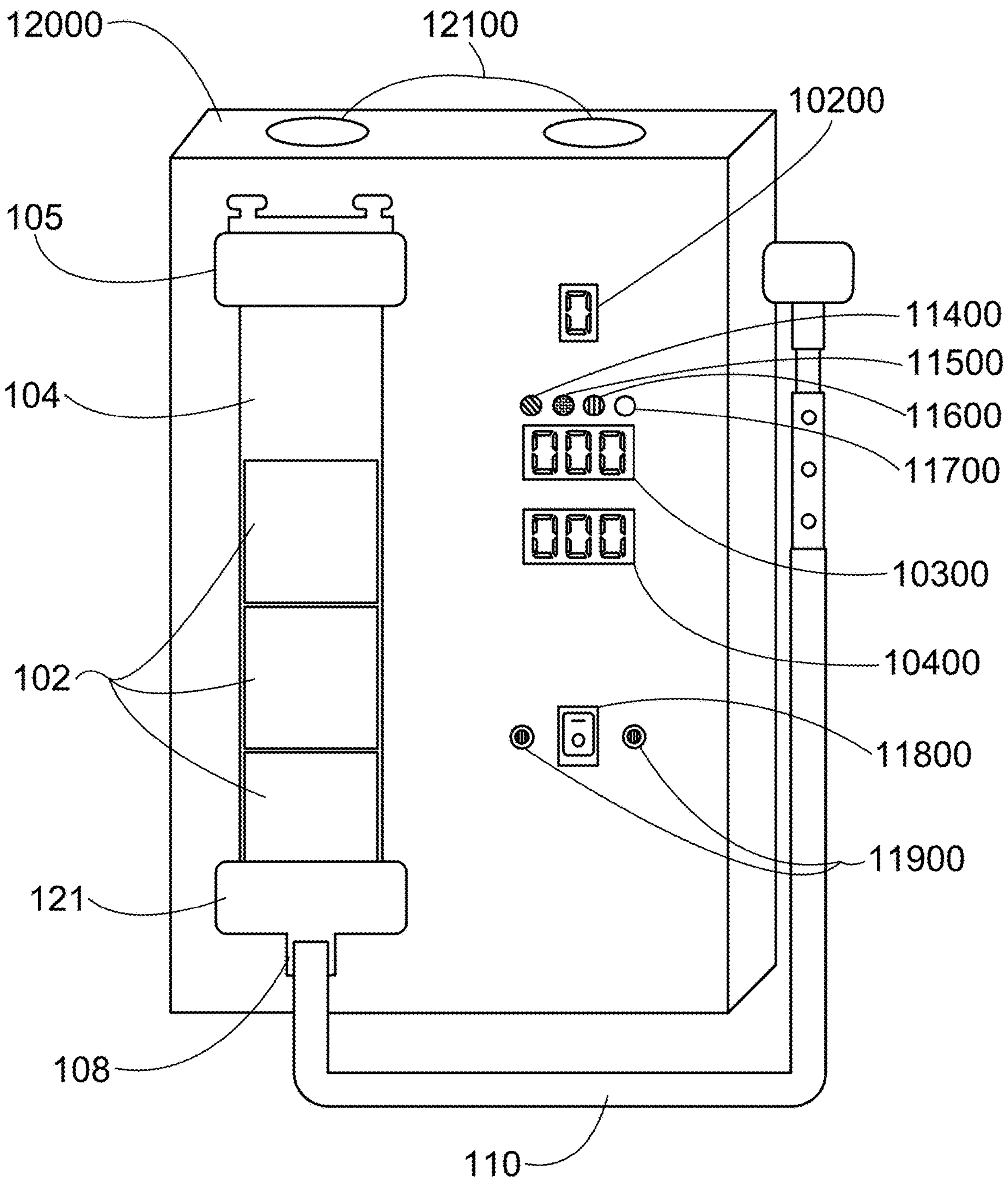

In FIG. 16 also are shown first virtual weight indicator 11400, second virtual weight indicator 11400, third virtual weight indicator 11600, fourth virtual weight indicator 11700, on off switch 11800, other indicators 11900, lung exercise measurement device 12000, and holders 12100.

The capacitors and resistors and voltage may vary depending on application and model. The examples used herein are only some embodiments of the invention. The comparators, displays, pressure sensors, integrated circuits and timers are for example only. Other comparators, displays, sensors and circuits may be used. Also, the invention is also implemented through computer program code stored in one or more memories and/or non-transitory computer readable medium and executed by one or more processors.

Thus, it is seen that the objects of the present invention are efficiently obtained, although modifications and changes to the invention should be readily apparent to those having ordinary skill in the art, which modifications are intended to be within the spirit and scope of the invention as claimed. It is also understood that the foregoing description is illustrative of the present invention and should not be considered as limiting. Therefore, other embodiments of the present invention are possible without departing from the spirit and scope of the present invention.

What we claim is:

1. A lung exercise measurement device, comprising:

one or more chambers;

one or more displays providing a lift time display, said lift time display communicatively associated with one or more lift timers, the one or more lift timers comprising:

a lift counter that cumulates a lift time that air pressure in the one or more chambers exceeds a lift threshold; and, a lift counter reset that sets the lift time to zero the one or more displays providing a rest time display, said rest time display communicatively associated with one or more rest timers, the one or more rest timers comprising:

a latch that initiates a rest counter; and, the rest counter cumulates a rest time that air pressure in the one or more chambers is below at or below a rest threshold;

the one or more displays providing a set counter display, said set counter display communicatively associated with one or more set counters, the one or more set counters comprising a set counter comparator communicatively associated with one or more pressure sensors, the set counter comparator providing a set count of transitions from an initialization pressure to an exhalation pressure, and the set counter display showing the set count wherein the one or more rest timers further comprise a rest timer reset that sets the rest timer to zero.

2. The lung exercise measurement device of claim 1 wherein the rest timer reset uses the set counter comparator to trigger the rest timer reset.

3. The lung exercise measurement device of claim 2 further comprising:

a voltage divider communicatively associated the set counter comparator and the rest timer reset.

4. The lung exercise measurement device of claim 3 further comprising:

one or more virtual inserts indicated on a virtual insert display comprising one or more light emitting devices triggered by the pressure sensor.

5. The lung exercise measurement device of claim 4 wherein the pressure sensor is an analog amplified pressure sensor communicatively associated with one or more voltage comparators.

6. The lung exercise measurement device of claim 5 wherein the one or more voltage comparators are a low voltage quad comparator providing a total of four independent voltage comparators used to activate the one or more light emitting devices at different air pressures.

7. The lung exercise measurement device of claim 6 wherein the display provides the lift time display, rest time display and set counter display simultaneously and adjacent to the virtual insert display.

8. The lung exercise measurement device of claim 7 wherein the display comprises one or more light emitting diodes.

9. A non-transitory computer-readable medium including one or more sequences of instructions that, when executed by one or more processors, cause the one or more processors to:

cumulate a lift time that air pressure in one or more chambers exceeds a lift threshold;

cumulate a rest time that air pressure in the one or more chambers is below at or below a rest threshold;

cumulate a set count of transitions from an initialization pressure to an exhalation pressure;

count virtual inserts with a pressure sensor communicatively associated with one or more voltage comparators; and, cause one or more displays to simultaneously provide:

a rest time display showing the rest time;

a lift time display showing the lift time;

a set counter display showing the set count;

and, a virtual insert display showing a representation of the count of virtual inserts;

wherein the one or more sequences of instructions further cause the one or more processors to: set the rest time to zero;

set the set count to zero;

set the lift time to zero;

to initiate the rest timer after the pressure sensor detects an increase in air pressure in the one or more chambers from the initialization pressure to the exhalation pressure followed by a pressure below the rest threshold;

and, to increase the count of virtual inserts for each increase in air pressure by one-half pound per square inch.

10. The non-transitory computer-readable medium of claim 9 wherein the one or more sequences of instructions further cause the one or more processors to decrease the count of virtual inserts for each decrease in air pressure by approximately one-half pound per square inch.

11. The non-transitory computer-readable medium of claim 10 wherein the one or more sequences of instructions further cause the count of virtual inserts to begin increasing only when the air pressure exceeds the pounds per square inch to lift one or more physical weighted inserts enclosed within the one or more chambers.

* * * * *